US011972132B2

(12) United States Patent
Noguera Serra et al.

(10) Patent No.: US 11,972,132 B2
(45) Date of Patent: Apr. 30, 2024

(54) DATA PROCESSING ENGINE ARRANGEMENT IN A DEVICE

(71) Applicant: Xilinx, Inc., San Jose, CA (US)

(72) Inventors: Juan J. Noguera Serra, San Jose, CA (US); Goran H K Bilski, Molndal (SE); Jan Langer, Chemnitz (DE); Baris Ozgul, Dublin (IE); Richard L. Walke, Edinburgh (GB); Ralph D. Wittig, Menlo Park, CA (US); Kornelis A. Vissers, Sunnyvale, CA (US); Tim Tuan, San Jose, CA (US); David Clarke, Dublin (IE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/145,810

(22) Filed: Dec. 22, 2022

(65) Prior Publication Data
US 2023/0131698 A1    Apr. 27, 2023

Related U.S. Application Data

(60) Continuation of application No. 17/097,917, filed on Nov. 13, 2020, now Pat. No. 11,573,726, which is a
(Continued)

(51) Int. Cl.
G06F 3/06      (2006.01)
G06F 13/16     (2006.01)
(Continued)

(52) U.S. Cl.
CPC ............ *G06F 3/0647* (2013.01); *G06F 3/061* (2013.01); *G06F 3/0683* (2013.01);
(Continued)

(58) Field of Classification Search
None
See application file for complete search history.

(56) References Cited

U.S. PATENT DOCUMENTS 3,776,137 A    12/1973   Abbott
4,876,641 A    10/1989   Cowley
(Continued)

FOREIGN PATENT DOCUMENTS

CN      105608490 A    5/2016
CN      105718392 A    6/2016
(Continued)

OTHER PUBLICATIONS

Agarwal, Tile Processor, Case Study of Contemporary Multicore, Massachusetts Institute of Technology, Fall 2010, http://web.mit.edu/6.173/www/currentsemester/handouts/L18-tilera-multicore.pdf (Year: 2010).*
(Continued)

*Primary Examiner* — Arpan P. Savla
*Assistant Examiner* — Edmund H Kwong
(74) *Attorney, Agent, or Firm* — Kevin T. Cuenot

(57) ABSTRACT

A device includes a data processing engine array having a plurality of data processing engines organized in a grid having a plurality of rows and a plurality of columns. Each data processing engine includes a core, a memory module including a memory and a direct memory access engine. Each data processing engine includes a stream switch connected to the core, the direct memory access engine, and the stream switch of one or more adjacent data processing engines. Each memory module includes a first memory interface directly coupled to the core in the same data processing engine and one or more second memory interfaces directly coupled to the core of each of the one or more adjacent data processing engines.

19 Claims, 25 Drawing Sheets

Related U.S. Application Data division of application No. 15/944,160, filed on Apr. 3, 2018, now Pat. No. 10,866,753.

(51) Int. Cl.
  *G06F 15/173* (2006.01)
  *G06F 15/78* (2006.01)

(52) U.S. Cl.
  CPC .... *G06F 13/1663* (2013.01); *G06F 15/17331* (2013.01); *G06F 15/7807* (2013.01)

(56) References Cited

U.S. PATENT DOCUMENTS

| | | |
|---|---|---|
| 6,091,263 A | 7/2000 | New et al. |
| 6,150,839 A | 11/2000 | New |
| 6,204,687 B1 | 3/2001 | Schultz et al. |
| 6,462,579 B1 | 10/2002 | Camilleri et al. |
| 6,526,557 B1 | 2/2003 | Young et al. |
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |
| 7,224,184 B1 | 5/2007 | Levi et al. |
| 7,302,625 B1 | 11/2007 | Payakapan et al. |
| 7,394,288 B1 | 7/2008 | Agarwal |
| 7,477,072 B1 | 1/2009 | Kao et al. |
| 7,478,357 B1 | 1/2009 | Mason et al. |
| 7,482,836 B2 | 1/2009 | Levi et al. |
| 7,509,617 B1 | 3/2009 | Young |
| 7,518,396 B1 | 4/2009 | Kondapalli et al. |
| 7,539,845 B1 | 5/2009 | Wentzlaff et al. |
| 7,546,572 B1 | 6/2009 | Ballagh et al. |
| 7,619,442 B1 | 11/2009 | Mason et al. |
| 7,640,527 B1 | 12/2009 | Dorairaj et al. |
| 7,724,815 B1 | 5/2010 | Raha et al. |
| 7,746,099 B1 | 6/2010 | Chan et al. |
| 8,045,546 B1 | 10/2011 | Bao |
| 8,102,188 B1 | 1/2012 | Chan et al. |
| 8,250,342 B1 | 8/2012 | Kostarnov |
| 8,359,448 B1 | 1/2013 | Neuendorffer |
| 8,415,974 B1 | 4/2013 | Lysaght |
| 8,719,750 B1 | 5/2014 | Balzli, Jr. |
| 8,796,539 B2 | 8/2014 | Asaumi |
| 8,928,351 B1 | 1/2015 | Konduru |
| 9,081,634 B1 | 7/2015 | Simkins |
| 9,436,785 B1 | 9/2016 | Javre |
| 9,652,410 B1 | 5/2017 | Schelle et al. |
| 9,722,613 B1 | 8/2017 | Schultz et al. |
| 9,990,241 B2 | 6/2018 | Dobbs |
| 10,635,622 B2 | 4/2020 | Bilski et al. |
| 10,866,753 B2 | 12/2020 | Noguera Serra et al. |
| 2004/0015341 A1 | 1/2004 | Ferris |
| 2008/0082759 A1 | 4/2008 | Pong |
| 2012/0331268 A1 | 12/2012 | Konig et al. |
| 2014/0006751 A1* | 1/2014 | Aliseychik .............. G06F 15/76 712/30 |
| 2014/0267334 A1 | 9/2014 | Duluk, Jr. |
| 2015/0302219 A1 | 10/2015 | Lahteenmaki |
| 2016/0011996 A1 | 1/2016 | Asaad |
| 2016/0188222 A1 | 6/2016 | Miller et al. |
| 2017/0004098 A1 | 1/2017 | Das Sharma |
| 2017/0220499 A1 | 8/2017 | Gray |
| 2017/0315944 A1 | 11/2017 | Mayer |
| 2018/0012637 A1 | 1/2018 | Verma |
| 2019/0004994 A1* | 1/2019 | Fleming .............. G06F 15/8023 |
| 2019/0303311 A1 | 10/2019 | Bilski |
| 2019/0303328 A1 | 10/2019 | Balski |

FOREIGN PATENT DOCUMENTS

| | | |
|---|---|---|
| CN | 107291209 A | 10/2017 |
| CN | 104798062 A | 11/2017 |
| JP | H01-500306 A | 10/1987 |
| JP | H01-263858 A | 7/1991 |
| JP | H08-286908 | 11/1996 |
| JP | 10-129012 A | 5/1998 |
| JP | 2001-312481 A | 11/2001 |
| JP | 2001-117893 A | 10/2002 |
| JP | 2003-534596 A | 11/2003 |
| JP | 2008-250846 A | 10/2008 |
| JP | 2009-515160 A | 4/2009 |
| JP | 2014-515843 A | 7/2014 |
| JP | 2017-199371 A | 11/2017 |
| WO | 8706039 A1 | 10/1987 |
| WO | 2008/013098 A1 | 12/2009 |

OTHER PUBLICATIONS

Kistler, Michael, et al. Cell Multiprocessor Communication Network: Built for Speed, IEEE Micro, 2006 (Year: 2006).*

Doud, Bob, "Accelerating the Data Plane with the Tile-Mx Manycore Processor," Feb. 25, 2015, 19 pp., Linley Data Center Conference, EZchip Semiconductor, Inc., San Jose, California, USA.

EZchip, "Tile-Gx72 Processor," PB041, Feb. 14, 2015, 2 pp., EZchip Semiconductor, Inc., San Jose, California, USA.

Kalray, "Kalray NVMe-oF Target Controller Solutions," Dec. 18, 2017, 14 pp., Kalray Inc., Los Altos, California, USA.

Kalray, "MPPA Processors for Autonomous Driving," May 25, 2017, 18 pp., Kalray Inc., Los Altos, California, USA.

Mellanox, "BlueField Multicore System on Chip," copyright 2017, 4 pp., Mellanox Technologies, Sunnyvale, California, USA.

Mellanox, "NP-5 Network Processor," copyright 2107, 2 pp., Mellanox Technologies, Sunnyvale, California, USA.

Mellanox, "Tile-Gx672 Processor," PB041, Feb. 14, 2015, 2 pp., Mellanox Technologies, Sunnyvale, California, USA.

Schooler, Richard, "Tile Processors: Many-Core for Embedded and Cloud Computing," Sep. 15, 2010, 35 pp., 14th Annual Workshop on High Performance Embedded Computing (HPEC 10).

Wentzlaff, David et al., "On-Chip Interconnection Architecture of the Tile Processor," IEEE Micro, Nov. 12, 2007, pp. 15-31, vol. 27, Issue 5, IEEE Computer Society Press, Los Alamitos, California, USA.

Xilinx, UltraScale Architecture DSP Slice, UG579, Oct. 18, 2017, 74 pp., Xilinx, Inc., San Jose, California, USA.

Xilinx, Inc., "AXI4-Stream Internconnect v1.1, LogiCORE IP Product Guide," PG035, Vivado Design Suite,Chap. 2: Product Specification, Chap. 3: Designing With the Core, Oct. 4, 2017, 44 pg., Xilinx, Inc., San Jose, California, USA.

Stocksdale et al., Architecting H BM as a High Bandwidth, High Capacity, Self-Managed Last-Level Cache, Nov. 2017, PDSW-DSICS' 17 Denver, Co, USA (Year: 2017).

Xilinx, "LogiCORE IP AXI Interconnect (v1.06.a)", Dec. 18, 2012 (Dec. 18, 2012), XP055598000, URL: https://www.xilinx.com/support/documentation/ip_documentation/axi_interconnect/v1_06_a/ds768_axi_interconnect.pdf.

Schooler R. "Tile processors: Many-core for embedded and cloud computing" In Workshop on High Performance Embedded Computing Sep. 15, 2010 35 pg.

* cited by examiner

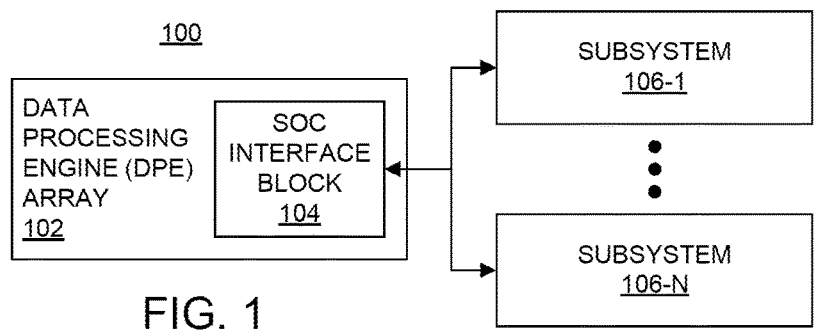
FIG. 1
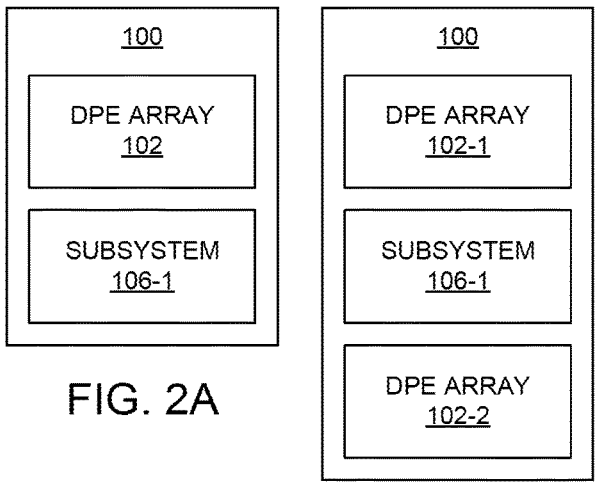
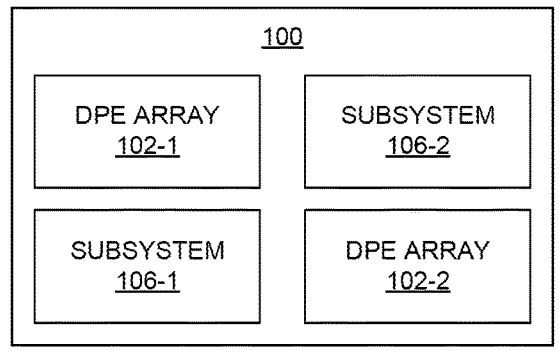
FIG. 2A
FIG. 2B
FIG. 2C
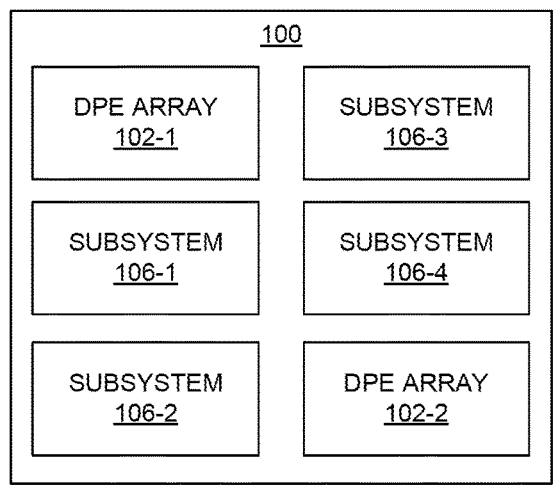
FIG. 2D

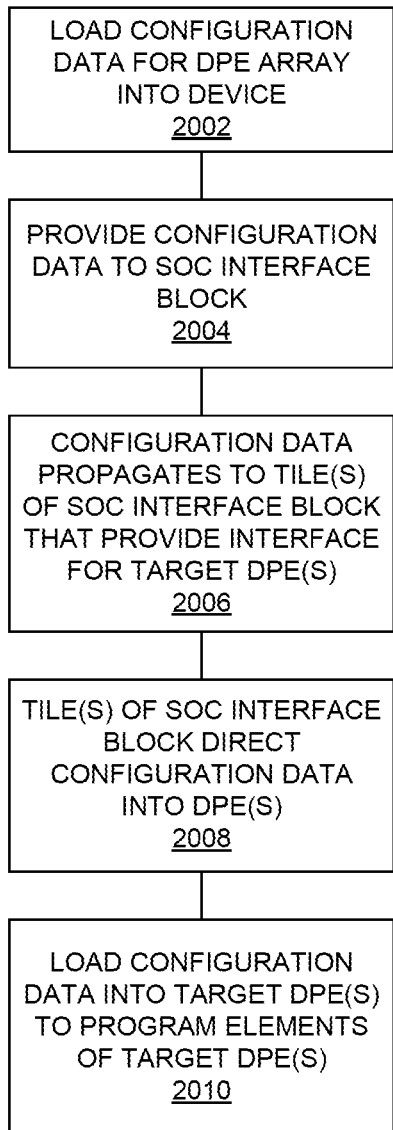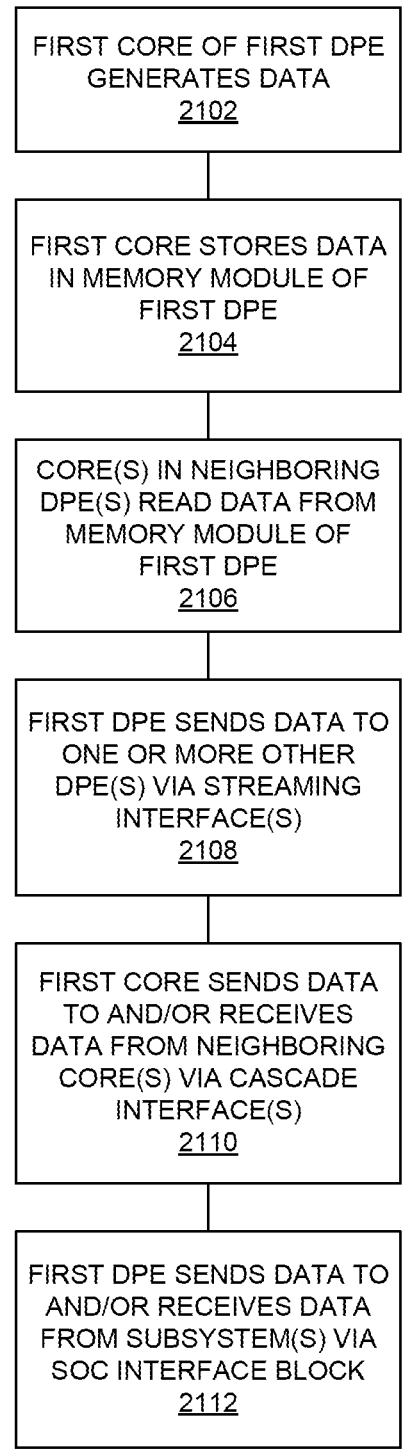
FIG. 20
FIG. 21

DATA PROCESSING ENGINE ARRANGEMENT IN A DEVICE

This application is a continuation of U.S. application Ser. No. 17/097,917, filed on Nov. 13, 2020, which is fully incorporated herein by reference in its entirety, which is a divisional of U.S. application Ser. No. 15/944,160, filed on Apr. 3, 2018, which is fully incorporated herein by reference in its entirety.

TECHNICAL FIELD

This disclosure relates to integrated circuit devices (devices) and, more particularly, to devices that include data processing engines and/or a data processing engine array.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

SUMMARY

In one or more embodiments, a device may include a plurality of data processing engines. Each data processing engine may include a core and a memory module. Each core may be configured to access the memory module in the same data processing engine and a memory module within at least one other data processing engine of the plurality of data processing engines.

In one or more embodiments, a method may include a first core of a first data processing engine generating data, the first core writing the data to a first memory module within the first data processing engine, and a second core of a second data processing engine reading the data from the first memory module.

In one or more embodiments, a device may include a plurality of data processing engines, a subsystem, and a System-on-Chip (SoC) interface block coupled to the plurality of data processing engines and the subsystem. The SoC interface block may be configured to exchange data between the subsystem and the plurality of data processing engines.

In one or more embodiments, a tile for an SoC interface block may include a memory mapped switch configured to provide a first portion of configuration data to a neighboring tile and to provide a second portion of the configuration data to a data processing engine of a plurality of data processing engines. The tile may include a stream switch configured to provide first data to at least one neighboring tile and to provide second data to the data processing engine of the plurality of data processing engines. The tile may include event broadcast circuitry configured to receive events generated within the tile and events from circuitry external to the tile, wherein the event broadcast circuitry is programmable to provide selected ones of the events to selected destinations. The tile may include interface circuitry that couples the memory mapped switch, the stream switch, and the event broadcast circuitry to a subsystem of a device including the tile.

In one or more embodiments, a device may include a plurality of data processing engines. Each of the data processing engines may include a core and a memory module. The plurality of data processing engines may be organized in a plurality of rows. Each core may be configured to communicate with other neighboring data processing engines of the plurality of data processing engines by shared access to the memory modules of the neighboring data processing engines.

In one or more embodiments, a device may include a plurality of data processing engines. Each of the data processing engines may include a memory pool having a plurality of memory banks, a plurality of cores each coupled to the memory pool and configured to access the plurality of memory banks, a memory mapped switch coupled to the memory pool and a memory mapped switch of at least one neighboring data processing engine, and a stream switch coupled to each of the plurality of cores and to a stream switch of the at least one neighboring data processing engine.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 1 illustrates an example of a device including a data processing engine (DPE) array.

FIGS. 2A, 2B, 2C, and 2D illustrate example architectures for a device having one or more DPE arrays.

FIG. 20 illustrates an example method of configuring a DPE array.

FIG. 21 illustrates an example method of operation of a DPE array.

DETAILED DESCRIPTION

Figure 3:
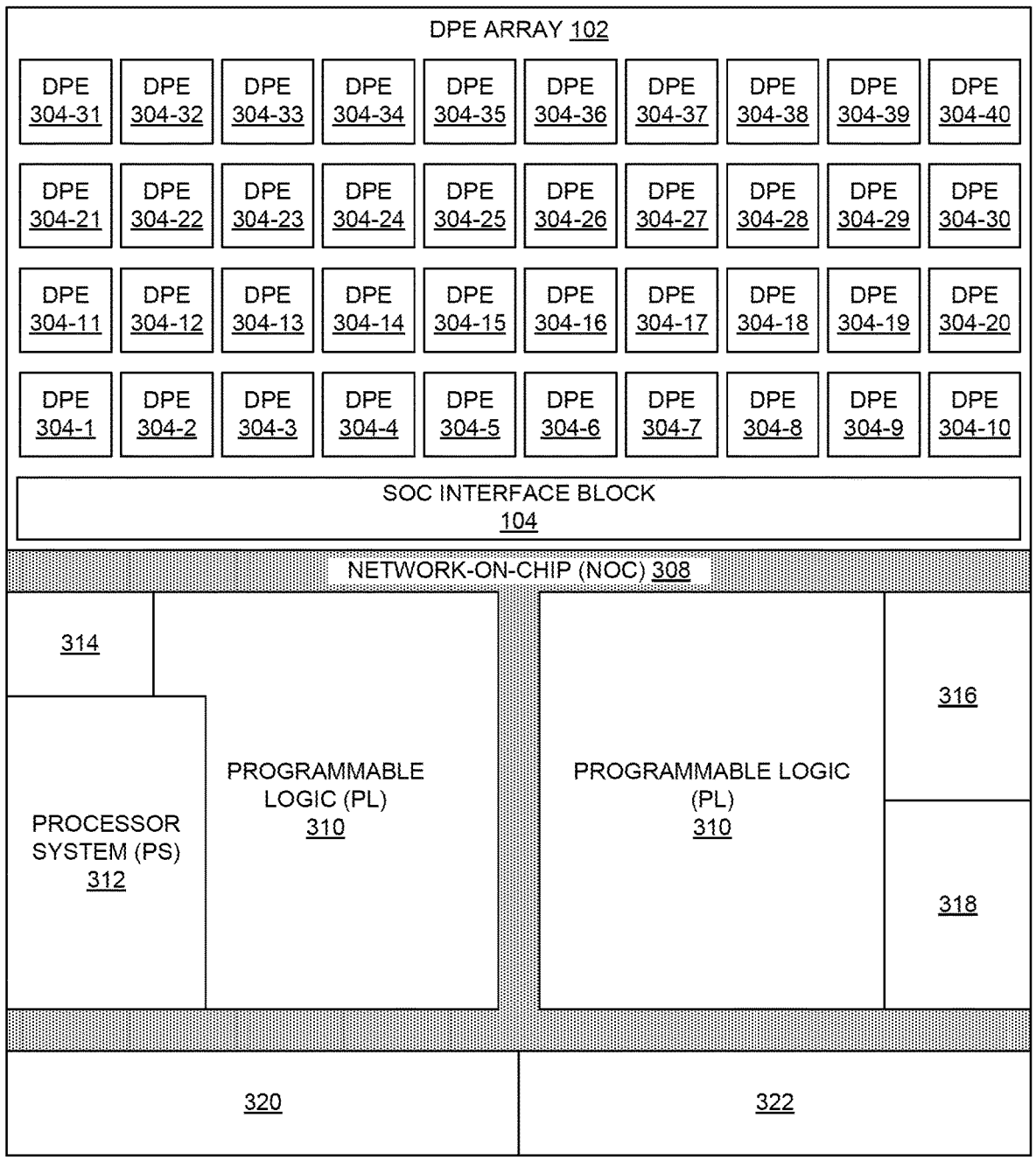
FIG. 3 illustrates another example architecture for a device including a DPE array.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuit devices (devices) that include one or more data processing engines (DPEs) and/or DPE arrays. A DPE array refers to a plurality of hardwired circuit blocks. The plurality of circuit blocks may be programmable. A DPE array may include a plurality of DPEs and a System-on-Chip (SoC) interface block. In general, a DPE includes a core that is capable of providing data processing capabilities. A DPE further includes a memory module that is accessible by the core or cores in the DPE. In particular embodiments, the memory module of a DPE may also be accessed by one or more other cores in different DPEs of the DPE array.

A DPE further may include a DPE interconnect. The DPE interconnect refers to circuitry that is capable of implementing communications with other DPEs of a DPE array and/or communication with different subsystems of the device including the DPE array. The DPE interconnect further may support configuration of the DPE. In particular embodiments, the DPE interconnect is capable of conveying control data and/or debugging data.

A DPE array may be organized using any of a variety of different architectures. In one or more embodiments, a DPE array may be organized in one or more rows and in one or more columns. In some cases, the columns and/or rows of DPEs are aligned. In some embodiments, each DPE may include a single core coupled to a memory module. In other embodiments, one or more or each DPE of a DPE array may be implemented to include two or more cores coupled to a memory module.

In one or more embodiments, the DPE array is implemented as a homogeneous structure where each DPE is the same as each other DPE. In other embodiments, the DPE array is implemented as a heterogeneous structure where the DPE array includes two or more different types of DPEs. For example, a DPE array may include DPEs with single cores, DPEs with multiple cores, DPEs with differing types of cores included therein, and/or DPEs having different physical architectures.

DPE arrays may be implemented with varying sizes. For example, a DPE array may be implemented to span the entire width and/or length of a die of a device. In another example, a DPE array may be implemented to span a fraction of the entire width and/or length of such a die. In further embodiments, more than one DPE array may be implemented within a die, where different ones of the DPE arrays are distributed to different regions on the die, have different sizes, have different shapes, and/or have different architectures as described herein (e.g., aligned rows and/or columns, homogeneous, and/or heterogeneous). Further, DPE arrays may include different numbers of rows of DPEs and/or different numbers of columns of DPEs.

A DPE array may be utilized with, and coupled to, any of a variety of different subsystems within the device. Such subsystems may include, but are not limited to, processors and/or processor systems, programmable logic, and/or a Network-on-Chip (NoC). In particular embodiments, the NoC may be programmable. Further examples of subsystems that may be included in a device and coupled to a DPE array may include, but are not limited to, an application-specific integrated circuit (ASIC), hardwired circuit blocks, analog and/or mixed signal circuitry, graphics processing units (GPUs), and/or general-purpose processors (e.g., central processing units or CPUs). An example of a CPU is a processor having an x86 type of architecture. Within this specification, the term "ASIC" may refer to an IC, a die, and/or a portion of a die that includes application-specific circuitry in combination with another type or types of circuitry; and/or to an IC and/or die that is formed entirely of application-specific circuitry.

In particular embodiments, a device including one or more DPE arrays may be implemented using a single die architecture. In that case, the DPE array(s) and any other subsystems utilized with the DPE array(s) is/are implemented on the same die of the device. In other embodiments, a device including one or more DPE arrays may be implemented as a multi-die device that includes two or more dies. In some multi-die devices, the DPE array or DPE arrays may be implemented on one die, while one or more other subsystems are implemented in one or more other dies. In other multi-die devices, a DPE array or DPE arrays may be implemented in one or more dies in combination with one or more other subsystems of the multi-die device (e.g., where the DPE array is implemented in a same die as at least one subsystem).

A DPE array as described within this disclosure is capable of implementing an optimized digital signal processing (DSP) architecture. The DSP architecture is capable of efficiently performing any of a variety of different operations. Examples of the types of operations that may be performed by the architecture include, but are not limited to, operations relating to wireless radio, decision feedback equalization (DFE), 5G/baseband, wireless backhaul, machine learning, automotive driver assistance, embedded vision, cable access, and/or radar. A DPE array as described herein is capable of performing such operations while consuming less power than other solutions that utilize conventional programmable (e.g., FPGA type) circuitry. Further, a DPE array-based solution may be implemented using less area of a die than other solutions that utilize conventional programmable circuitry. The DPE array is further capable of performing operations as described herein while meeting predictable and guaranteed data throughput and latency metrics.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a device 100 including a DPE array 102. In the example of FIG. 1, DPE array 102 includes an SoC interface block 104. Device 100 also includes one or more subsystems 106-1 through 106-N. In one or more embodiments, device 100 is implemented as a System-on-Chip (SoC) type of device. In general, an SoC refers to an IC that includes two or more subsystems capable of interacting with one another. As an example, an SoC may include a processor that executes program code and one or more other circuits. The other circuits may be implemented as hardwired circuitry, programmable circuitry, other subsystems, and/or any combination thereof. The circuits may operate cooperatively with one another and/or with the processor.

DPE array 102 is formed of a plurality of interconnected DPEs. Each of the DPEs is a hardwired circuit block. Each DPE may be programmable. SoC interface block 104 may include one or more tiles. Each of the tiles of SoC interface block 104 may be hardwired. Each tile of SoC interface block 104 may be programmable. SoC interface block 104 provides an interface between DPE array 102, e.g., the DPEs, and other portions of an SoC such as subsystems 106 of device 100. Subsystems 106-1 through 106-N may represent, for example, one or more or any combination of processors and/or processor systems (e.g., CPUs, general-purpose processors, and/or GPUs), programmable logic, a NoC, ASICs, analog and/or mixed signal circuitry, and/or hardwired circuit blocks.

In one or more embodiments, device 100 is implemented using a single die architecture. In that case, DPE array 102 and at least one subsystem 106 may be included or implemented in a single die. In one or more other embodiments, device 100 is implemented using a multi-die architecture. In that case, DPE array 102 and subsystems 106 may be implemented across two or more dies. For example, DPE array 102 may be implemented in one die while subsystems 106 are implemented in one or more other dies. In another example, SoC interface block 104 may be implemented in a different die than the DPEs of DPE array 102. In yet another example, DPE array 102 and at least one subsystem 106 may be implemented in a same die while other subsystems and/or other DPE arrays are implemented in other dies. Further examples of single die and multi-die architectures are described herein in greater detail below in connection with FIGS. 2, 3, 4, and 5.

FIGS. 2A, 2B, 2C, and 2D (referred to collectively as "FIG. 2") illustrate example architectures for a device including one or more DPE arrays 102. More particularly, FIG. 2 illustrates examples of single-die architectures for device 100. For purposes of illustration, SoC interface block 104 is not shown in FIG. 2.

FIG. 2A illustrates an example architecture for device 100 that includes a single DPE array. In the example of FIG. 2A, DPE array 102 is implemented in device 100 with subsystem 106-1. DPE array 102 and subsystem 106-1 are implemented in a same die. DPE array 102 may extend across the entire width of the die of device 100 or extend partially across the die of device 100. As pictured, DPE array 102 is implemented in a top region of device 100. It should be appreciated, however, that DPE array 102 may be implemented in another region of device 100. As such, the placement and/or size of DPE array 102 in FIG. 2A is not intended as a limitation. DPE array 102 may be coupled to subsystem 106-1 by SoC interface block 104 (not shown).

FIG. 2B illustrates an example architecture for device 100 that includes a plurality of DPE arrays. In the example of FIG. 2B, multiple DPE arrays are implemented and depicted as DPE array 102-1 and DPE array 102-2. FIG. 2B illustrates that multiple DPE arrays may be implemented in a same die of device 100 along with a subsystem 106-1. DPE array 102-1 and/or DPE array 102-2 may extend across the entire width of the die of device 100 or only partially across the die of device 100. As pictured, DPE array 102-1 is implemented in a top region of device 100 while DPE array 102-2 is implemented in a bottom region of device 100. As noted, the placement and/or size of DPE arrays 102-1 and 102-2 in FIG. 2B are not intended as limitations.

In one or more embodiments, DPE array 102-1 and DPE array 102-2 may be substantially similar or the same. For example, DPE array 102-1 may be the same as DPE array 102-2 in terms of size, shape, number of DPEs, and whether the DPEs are homogeneous or are of like type and sequence in each respective DPE array. In one or more other embodiments, DPE array 102-1 may be different from DPE array 102-2. For example, DPE array 102-1 may differ from DPE array 102-2 in terms of size, shape, number of DPEs, type of cores, and whether the DPEs are homogeneous or are of different type and/or sequence in each respective DPE array.

In one or more embodiments, each of DPE array 102-1 and DPE array 102-2 is coupled to subsystem 106-1 via its own SoC interface block (not shown). For example, a first SoC interface block may be included and used to couple DPE array 102-1 to subsystem 106-1, while a second SoC interface block may be included and used to couple DPE array 102-2 to subsystem 106-1. In another embodiment, a single SoC interface block may be used to couple both of DPE array 102-1 and DPE array 102-2 to subsystem 106-1. In the latter case, for example, one of the DPE arrays may not include an SoC interface block. The DPEs in that array may couple to subsystem 106-1 using the SoC interface block of the other DPE array.

FIG. 2C illustrates an example architecture for device 100 that includes a plurality of DPE arrays and a plurality of subsystems. In the example of FIG. 2C, multiple DPE arrays are implemented and depicted as DPE array 102-1 and DPE array 102-2. FIG. 2C illustrates that multiple DPE arrays may be implemented in a same die of device 100 and that the placement or location of DPE arrays 102 may vary. Further, DPE arrays 102-1 and 102-2 are implemented in the same die as subsystems 106-1 and 106-2.

In the example of FIG. 2C, DPE array 102-1 and DPE array 102-2 do not extend across the entire width of the die of device 100. Rather, each of DPE arrays 102-1 and 102-2 extends partially across the die of device 100 and, as such is implemented in a region that is a fraction of the width of the die of device 100. Like the example of FIG. 2B, DPE array 102-1 and DPE array 102-2 of FIG. 2C may be substantially similar or the same or may be different.

In one or more embodiments, each of DPE array 102-1 and DPE array 102-2 is coupled to subsystem 106-1 and/or to subsystem 106-2 via its own SoC interface block (not shown). In an illustrative and non-limiting example, a first SoC interface block may be included and used to couple DPE array 102-1 to subsystem 106-1, while a second SoC interface block may be included and used to couple DPE array 102-2 to subsystem 106-2. In that case, each DPE array communicates with a subset of the available subsystems of device 100. In another example, a first SoC interface block may be included and used to couple DPE array 102-1 to subsystems 106-1 and 106-2, while a second SoC interface block may be included and used to couple DPE array 102-2 and subsystems 106-1 and 106-2. In yet another example, a single SoC interface block may be used to couple both of DPE array 102-1 and DPE array 102-2 to subsystem 106-1 and/or subsystem 106-2. As noted, the placement and/or size of DPE arrays 102-1 and 102-2 in FIG. 2C is not intended as a limitation.

FIG. 2D illustrates another example architecture for device 100 that includes a plurality of DPE arrays and a plurality of subsystems. In the example of FIG. 2D, multiple DPE arrays are implemented and depicted as DPE array 102-1 and DPE array 102-2. FIG. 2D also illustrates that multiple DPE arrays may be implemented in a same die of device 100 and that the placement and/or location of DPE arrays 102 may vary. In the example of FIG. 2D, DPE array 102-1 and DPE array 102-2 do not extend across the entire width of the die of device 100. Rather, each of DPE arrays 102-1 and 102-2 is implemented in a region that is a fraction of the width of the die of device 100. Further, device 100 of FIG. 2D includes subsystems 106-1, 106-2, 106-3, and 106-4 within the same die as DPE arrays 102-1 and 102-2. Like the example of FIG. 2B, DPE array 102-1 and DPE array 102-2 of FIG. 2D may be substantially similar or the same or may be different.

Connectivity among DPE arrays and the subsystems in the example of FIG. 2D may vary. In some cases, DPE arrays may be coupled to only a subset of available subsystems in device 100. In other cases, DPE arrays may be coupled to more than one subsystem or to each subsystem in device 100.

The examples of FIG. 2 are provided for purposes of illustration and not limitation. A device having a single die may include one or more different DPE arrays located in different regions of the die. The number, placement, and/or size of DPE arrays may vary. Further, the DPE arrays may be the same or different. One or more DPE arrays may be implemented in combination with one or more and/or any combination of the different types of subsystems described within this disclosure.

In one or more embodiments, two or more DPE arrays may be configured to communicate directly with one another. For example, DPE array 102-1 may be capable of communicating directly with DPE array 102-2 and/or with additional DPE arrays. In particular embodiments, DPE array 102-1 may communicate with DPE array 102-2 and/or with other DPE arrays through one or more SoC interface blocks.

FIG. 3 illustrates another example architecture for device 100. In the example of FIG. 3, DPE array 102 is implemented as a two-dimensional array of DPEs 304 that includes SoC interface block 104. DPE array 102 may be implemented using any of a variety of different architectures to be described herein in greater detail below. For purposes of illustration and not limitation, FIG. 3 illustrates DPEs 304 arranged in aligned rows and aligned columns as described in greater detail connection with FIG. 19. In other embodiments, however, DPEs 304 may be arranged where DPEs in selected rows and/or columns are horizontally inverted or flipped relative to DPEs in adjacent rows and/or columns. An example of horizontal inversion of DPEs is described in connection with FIG. 18. In one or more other embodiments, rows and/or columns of DPEs may be offset relative to adjacent rows and/or columns. One or more or all DPEs 304 may be implemented to include a single core as generally described in connection with FIGS. 6 and 8 or to include two or more cores as generally described in connection with FIG. 12.

SoC interface block 104 is capable of coupling DPEs 304 to one or more other subsystems of device 100. In one or more embodiments, SoC interface block 104 is coupled to adjacent DPEs 304. For example, SoC interface block 104 may be directly coupled to each DPE 304 in the bottom row of DPEs in DPE array 102. In illustration, SoC interface block 104 may be directly connected to DPE 304-1, 304-2, 304-3, 304-4, 304-5, 304-6, 304-7, 304-8, 304-9, and 304-10.

FIG. 3 is provided for purposes of illustration. In other embodiments, SoC interface block 104 may be located at the top of DPE array 102, to the left of DPE array 102 (e.g., as a column), to the right of DPE array 102 (e.g., as a column), or at multiple locations in and around DPE array 102 (e.g., as one or more intervening rows and/or columns within DPE array 102). Depending upon the layout and location of SoC interface block 104, the particular DPEs coupled to SoC interface block 104 may vary.

For purposes of illustration and not limitation, if SoC interface block 104 is located to the left of DPEs 304, SoC interface block 104 may be directly coupled to the left column of DPEs including DPE 304-1, DPE 304-11, DPE 304-21, and DPE 304-31. If SoC interface block 104 is located to the right of DPEs 304, SoC interface block 104 may be directly coupled to the right column of DPEs including DPE 304-10, DPE 304-20, DPE 304-30, and DPE 304-40. If SoC interface block 104 is located at the top of DPEs 304, SoC interface block 104 may be coupled to the top row of DPEs including DPE 304-31, DPE 304-32, DPE 304-33, DPE 304-34, DPE 304-35, DPE 304-36, DPE 304-37, DPE 304-38, DPE 304-39, and DPE 304-40. If SoC interface block 104 is located at multiple locations, the particular DPEs that are directly connected to SoC interface block 104 may vary. For example, if SoC interface block is implemented as a row and/or column within DPE array 102, the DPEs that are directly coupled to SoC interface block 104 may be those that are adjacent to SoC interface block 104 on one or more or each side of SoC interface block 104.

DPEs 304 are interconnected by DPE interconnects (not shown), which, when taken collectively, form a DPE interconnect network. As such, SoC interface block 104 is capable of communicating with any DPE 304 of DPE array 102 by communicating with one or more selected DPEs 304 of DPE array 102 directly connected to SoC interface block 104 and utilizing the DPE interconnect network formed of DPE interconnects implemented within each respective DPE 304.

SoC interface block 104 is capable of coupling each DPE 304 within DPE array 102 with one or more other subsystems of device 100. For purposes of illustration, device 100 includes subsystems (e.g., subsystems 106) such as a NoC 308, programmable logic (PL) 310, a processor system (PS) 312, and/or any of hardwired circuit blocks 314, 316, 318, 320, and/or 322. For example, SoC interface block 104 is capable of establishing connections between selected DPEs 304 and PL 310. SoC interface block 104 is also capable of establishing connections between selected DPEs 304 and NoC 308. Through NoC 308, the selected DPEs 304 are capable of communicating with PS 312 and/or hardwired circuit blocks 320 and 322. Selected DPEs 304 are capable of communicating with hardwired circuit blocks 314-318 via SoC interface block 104 and PL 310. In particular embodiments, SoC interface block 104 may be coupled directly to one or more subsystems of device 100. For example, SoC interface block 104 may be coupled directly to PS 312 and/or to other hardwired circuit blocks. In particular embodiments, hardwired circuit blocks 314-322 may be considered examples of ASICs.

In one or more embodiments, DPE array 102 includes a single clock domain. Other subsystems such as NoC 308, PL 310, PS 312, and the various hardwired circuit blocks may be in one or more separate or different clock domain(s). Still, DPE array 102 may include additional clocks that may be used for interfacing with other ones of the subsystems. In particular embodiments, SoC interface block 104 includes a clock signal generator that is capable of generating one or more clock signals that may be provided or distributed to DPEs 304 of DPE array 102.

DPE array 102 may be programmed by loading configuration data into internal configuration memory cells (also referred to herein as "configuration registers") that define connectivity among DPEs 304 and SoC interface block 104 and how DPEs 304 and SoC interface block 104 operate. For example, for a particular DPE 304 or group of DPEs 304 to communicate with a subsystem, the DPE(s) 304 and SoC interface block 104 are programmed to do so. Similarly, for one or more particular DPEs 304 to communicate with one or more other DPEs 304, the DPEs are programmed to do so. DPE(s) 304 and SoC interface block 104 may be programmed by loading configuration data into configuration registers within DPE(s) 304 and SoC interface block 104, respectively. In another example, the clock signal generator, being part of SoC interface block 104, may be programmable using configuration data to vary the clock frequencies provided to DPE array 102.

NoC 308 provides connectivity to PL 310, PS 312, and to selected ones of the hardwired circuit blocks (e.g., circuit blocks 320 and 322). In the example of FIG. 3, NoC 308 is programmable. In the case of a programmable NoC used with other programmable circuitry, the nets that are to be routed through NoC 308 are unknown until a user circuit design is created for implementation within device 100. NoC 308 may be programmed by loading configuration data into internal configuration registers that define how elements within NoC 308 such as switches and interfaces are configured and operate to pass data from switch to switch and among the NoC interfaces.

NoC 308 is fabricated as part of device 100 and while not physically modifiable, may be programmed to establish connectivity between different master circuits and different slave circuits of a user circuit design. In this regard, NoC 308 is capable of adapting to different circuit designs, where each different circuit design has different combinations of master circuits and slave circuits implemented at different locations in device 100 that may be coupled by NoC 308. NoC 308 may be programmed to route data, e.g., application data and/or configuration data, among the master and slave circuits of the user circuit design. For example, NoC 308 may be programmed to couple different user-specified circuitry implemented within PL 310 with PS 312, with different ones of DPEs 304 via SoC interface block 104, with different hardwired circuit blocks, and/or with different circuits and/or systems external to device 100.

PL 310 is circuitry that may be programmed to perform specified functions. As an example, PL 310 may be implemented as field programmable gate array (FPGA) circuitry. PL 310 may include an array of programmable circuit blocks. Examples of programmable circuit blocks within PL 310 include, but are not limited to, input/output blocks (IOBs), configurable logic blocks (CLBs), dedicated random access memory blocks (BRAM), digital signal processing blocks (DSPs), clock managers, and/or delay lock loops (DLLs).

Each programmable circuit block within PL 310 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

In the example of FIG. 3, PL 310 is shown in two separate sections. In another example, PL 310 may be implemented as a unified region of programmable circuitry. In still another example, PL 310 may be implemented as more than two different regions of programmable circuitry. The particular organization of PL 310 is not intended as a limitation.

In the example of FIG. 3, PS 312 is implemented as hardwired circuitry that is fabricated as part of device 100. PS 312 may be implemented as, or include, any of a variety of different processor types. For example, PS 312 may be implemented as an individual processor, e.g., a single core capable of executing program code. In another example, PS 312 may be implemented as a multi-core processor. In still another example, PS 312 may include one or more cores, modules, co-processors, interfaces, and/or other resources. PS 312 may be implemented using any of a variety of different types of architectures. Example architectures that may be used to implement PS 312 may include, but are not limited to, an ARM processor architecture, an x86 processor architecture, a GPU architecture, a mobile processor architecture, a DSP architecture, or other suitable architecture that is capable of executing computer-readable instructions or program code.

Circuit blocks 314-322 may be implemented as any of a variety of different hardwired circuit blocks. Hardwired circuit blocks 314-322 may be customized to perform specialized functions. Examples of circuit blocks 314-322 include, but are not limited to, input/output blocks (IOBs), transceivers, or other specialized circuit blocks. As noted, circuit blocks 314-322 may be considered examples of ASICs.

The example of FIG. 3 illustrates an architecture that may be implemented in a device that includes a single die. While DPE array 102 is illustrated as occupying the entire width of device 100, in other embodiments, DPE array 102 may occupy less than the entire width of device 100 and/or be located in a different region of device 100. Further, the number of DPEs 304 included may vary. As such, the particular number of columns and/or rows of DPEs 304 may vary from that illustrated in FIG. 3.

In one or more other embodiments, a device such as device 100 may include two or more DPE arrays 102 located in different regions of device 100. For example, an additional DPE array may be located below circuit blocks 320 and 322.

As noted, FIGS. 2-3 illustrate example architectures for a device that includes a single die. In one or more other embodiments, device 100 may be implemented as a multi-die device including one or more DPE arrays 102.

Figure 4A:
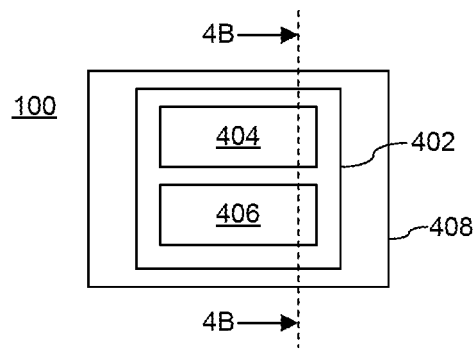
FIGS. 4A and 4B illustrate an example of a multi-die implementation of a device having one or more DPE arrays.
Figure 4B:
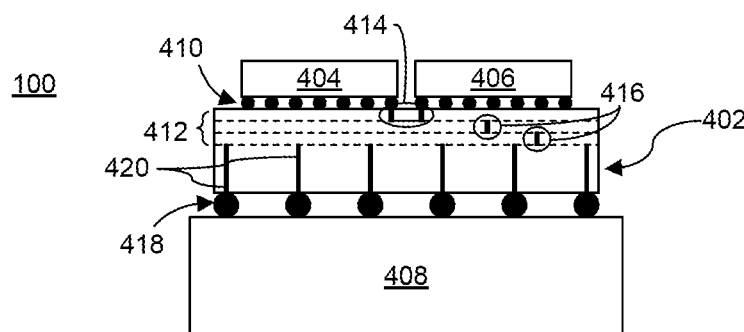

FIGS. 4A and 4B (referred to collectively as "FIG. 4") illustrate an example of a multi-die implementation of device 100. A multi-die device is a device, or an IC, that includes two or more dies within a single package.

FIG. 4A illustrates a topographical view of device 100. In the example of FIG. 4A, device 100 is implemented as a "stacked die" type of device formed by stacking multiple dies. Device 100 includes an interposer 402, a die 404, a die 406, and a substrate 408. Each of dies 404 and 406 is attached to a surface, e.g., a top surface, of interposer 402. In one aspect, dies 404 and 406 are attached to interposer 402 using flip-chip technology. Interposer 402 is attached to a top surface of substrate 408.

In the example of FIG. 4A, interposer 402 is a die having a planar surface on which dies 404 and 406 are horizontally stacked. As shown, dies 404 and 406 are located on the planar surface of interposer 402 side-by-side. The number of dies shown on interposer 402 in FIG. 4A is for purposes of illustration and not limitation. In other embodiments, more than two dies may be mounted on interposer 402.

Interposer 402 provides a common mounting surface and electrical coupling for each of dies 404 and 406. The manufacturing of interposer 402 may include one or more process steps that allow the deposition of one or more conductive layers that are patterned to form wires. These conductive layers may be formed of aluminum, gold, copper, nickel, various silicides, and/or other suitable material. Interposer 402 may be manufactured using one or more additional process steps that allow the deposition of one or more dielectric or insulating layer(s) such as, for example, silicon dioxide. Interposer 402 also may include vias and through vias (TVs). TVs may be through silicon vias (TSVs), through glass vias (TGVs), or other via structures depending upon the particular materials used to implement interposer 402 and the substrate thereof. If interposer 402 is implemented as a passive die, interposer 402 may only have various types of solder bumps, vias, wires, TVs, and under bump metallization (UBM). If implemented as an active die, interposer 402 may include additional process layers forming one or more active devices in reference to electrical devices such as transistors, diodes, etc., that include P-N junctions.

Each of dies 404 and 406 may be implemented as a passive die or an active die including one or more active devices. For example, one or more DPE arrays may be implemented in one or both of dies 404 and/or 406 when implemented as active dies. In one or more embodiments, die 404 may include one or more DPE arrays while die 406 implements any of the different subsystems described herein. The examples provided herein are for purposes of illustration and are not intended to be limiting. For example, device 100 may include more than two dies where the dies are of different types and/or functions.

FIG. 4B is a cross-sectional side view of device 100 of FIG. 4A. FIG. 4B illustrates a view of device 100 from FIG. 4A taken along cut-line 4B-4B. Each of dies 404 and 406 is electrically and mechanically coupled to a first planar surface of interposer 402 via solder bumps 410. In one example, solder bumps 410 are implemented as micro-bumps. Still, any of a variety of other techniques may be used to attach dies 404 and 406 to interposer 402. For example, bond wires or edge wires may be used to mechanically and electrically attach dies 404 and 406 to interposer 402. In another example, an adhesive material may be used to mechanically attach dies 404 and 406 to interposer 402. The attachment of dies 404 and 406 to interposer 402 using solder bumps 410, as illustrated within FIG. 4B, is provided for purposes of illustration and is not intended as a limitation.

Interposer 402 includes one or more conductive layers 412 illustrated as dashed or dotted lines in interposer 402. Conductive layers 412 are implemented using any of a variety of metal layers as previously described. Conductive layers 412 are processed to form patterned metal layers that implement wires 414 of interposer 402. A wire implemented within interposer 402 that couples at least two different dies, e.g., dies 404 and 406, is referred to as an inter-die wire. FIG. 4B shows wires 414 that are considered inter-die wires for purposes of illustration. Wires 414 pass inter-die signals between dies 404 and 406. For example, each of wires 414 couples a solder bump 410 beneath die 404 with a solder bump 410 beneath die 406, thereby allowing the exchange of inter-die signals between dies 404 and 406. Wires 414 may be data wires or power wires. A power wire may be a wire carrying a voltage potential or a wire having a ground or reference voltage potential.

Different ones of conductive layers 412 may be coupled together using vias 416. In general, a via structure is used to implement a vertical conductive path (e.g., a conductive path perpendicular to a process layer of the device). In this regard, the vertical portions of wires 414 that contact solder bumps 410 are implemented as vias 416. The use of multiple conductive layers to implement interconnects within interposer 402 allows a greater number of signals to be routed and more complex routing of signals to be achieved within interposer 402.

Solder bumps 418 can be used to mechanically and electrically couple a second planar surface of interposer 402 to substrate 408. In particular embodiments, solder bumps 418 are implemented as controlled collapse chip connection (C4) balls. Substrate 408 includes conductive paths (not shown) that couple different ones of solder bumps 418 to one or more nodes beneath substrate 408. Accordingly, one or more of solder bumps 418 couple circuitry within interposer 402 to nodes external to device 100 through circuitry or wiring within substrate 408.

TVs 420 are vias that form an electrical connection that vertically transverses, e.g., extends through a substantial portion, if not the entirety of, interposer 402. TVs 420, like wires and vias, may be formed of any of a variety of different conductive materials including, but not limited to, copper, aluminum, gold, nickel, various silicides, and/or other suitable materials. As pictured, each of TVs 420 extends from a bottom surface of interposer 402 up to a conductive layer 412 of interposer 402. TVs 420 further may be coupled to a solder bump 410 through one or more of conductive layers 412 in combination with one or more vias 416.

FIGS. 5A, 5B, 5C, 5D, 5E, 5F, and 5G (referred to collectively as "FIG. 5") illustrate example multi-die implementations of device 100. The examples of FIG. 5 may be implemented as described in connection with FIG. 4.

Figure 5A:
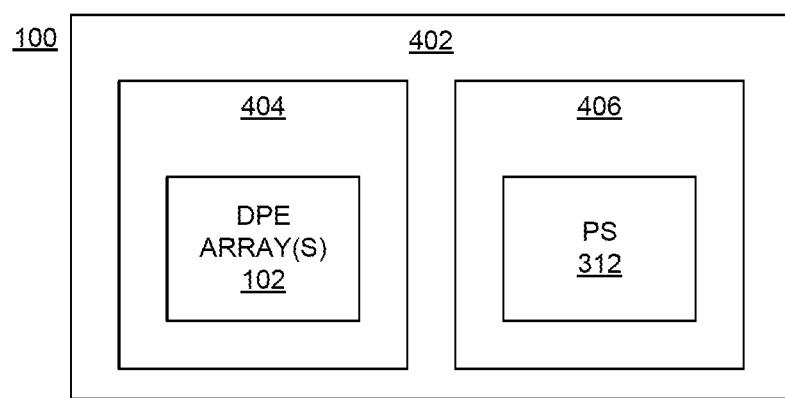
FIGS. 5A, 5B, 5C, 5D, 5E, 5F, and 5G illustrate example multi-die implementations of a device having a DPE array.

Referring to FIG. 5A, die 404 includes one or more DPE arrays 102, while die 406 implements PS 312.

Figure 5B:
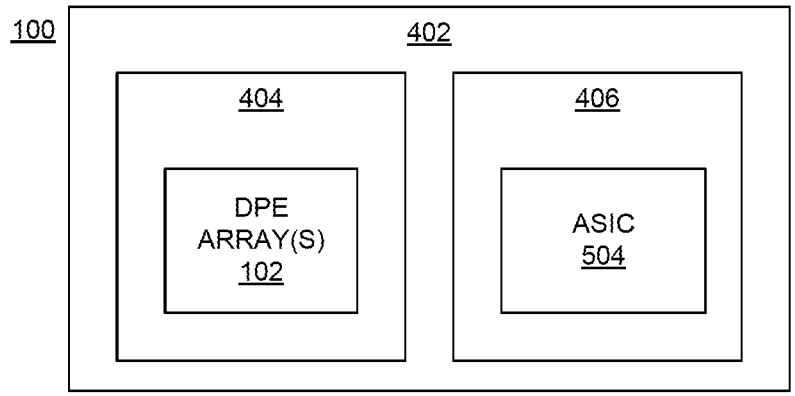

Referring to FIG. 5B, die 404 includes one or more DPE arrays 102, while die 406 implements ASIC 504. ASIC 504 may be implemented as any of a variety of different customized circuits suited for performing particular or specialized operations.

Figure 5C:
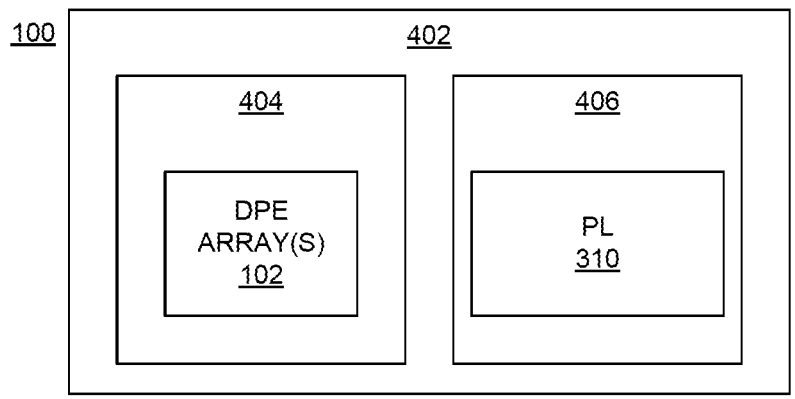

Referring to FIG. 5C, die 404 includes one or more DPE arrays 102, while die 406 implements PL 310.

Figure 5D:
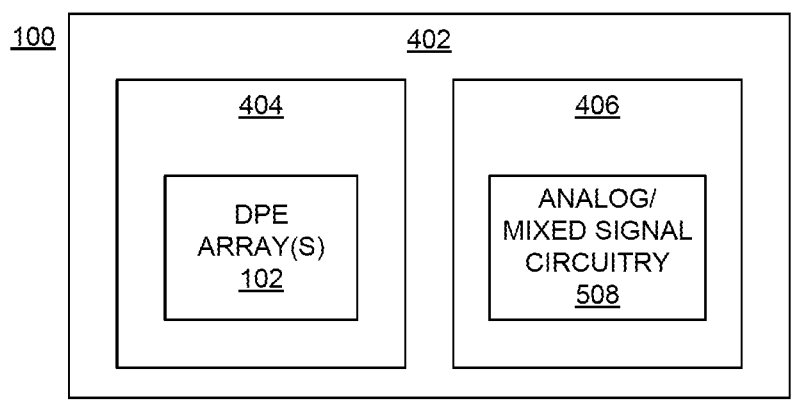

Referring to FIG. 5D, die 404 includes one or more DPE arrays 102, while die 406 implements analog and/or mixed (analog/mixed) signal circuitry 508. Analog/mixed signal circuitry 508 may include one or more wireless receivers, wireless transmitters, amplifiers, analog-to-digital converters, digital-to-analog converters, or other analog and/or digital circuitry.

Figure 5E:
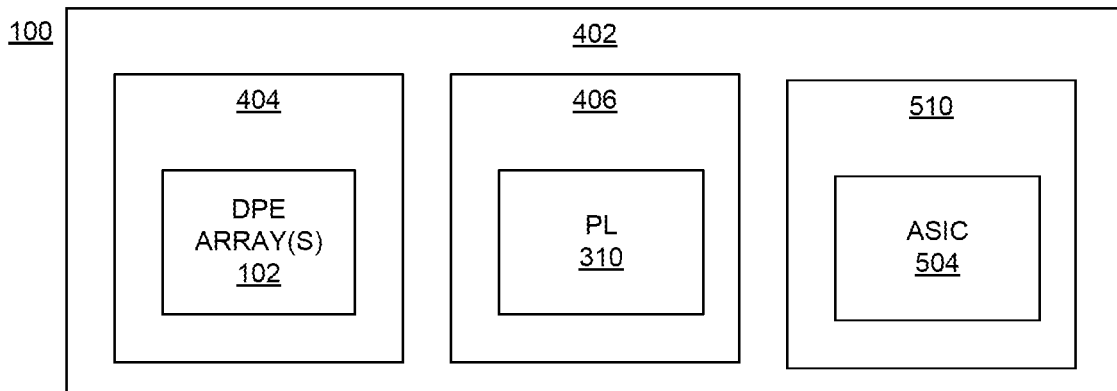
Figure 5F:
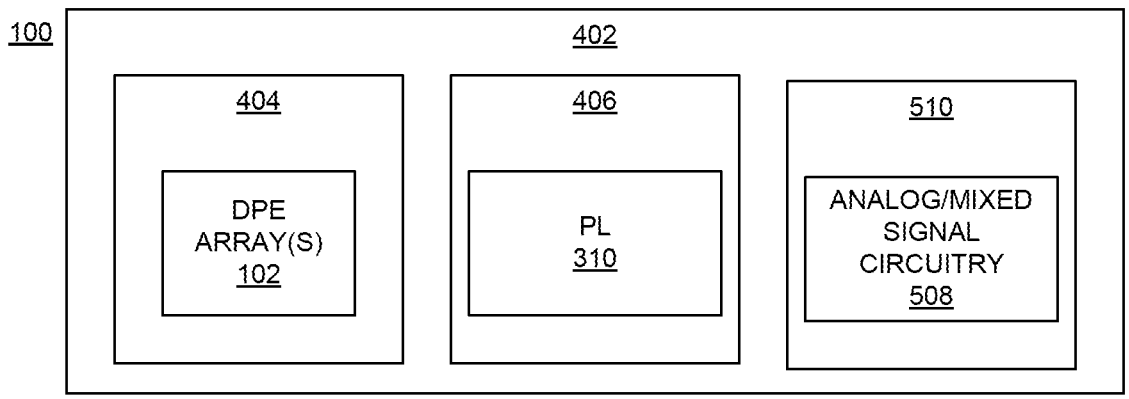
Figure 5G:
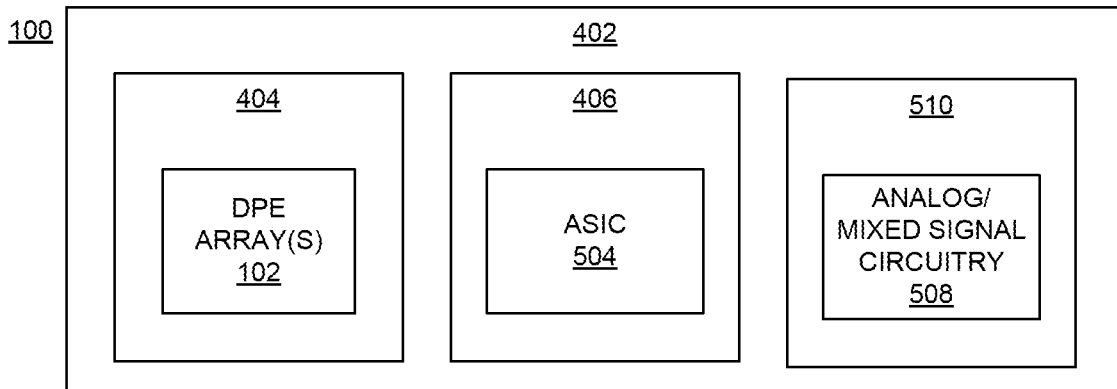

FIGS. 5E, 5F, and 5G illustrate examples of device 100 having three dies 404, 406, and 510. Referring to FIG. 5E, device 100 includes dies 404, 406, and 510. Die 404 includes one or more DPE arrays 102. Die 406 includes PL 310. Die 510 includes ASIC 504.

Referring to FIG. 5F, die 404 includes one or more DPE arrays 102. Die 406 includes PL 310. Die 510 includes analog/mixed signal circuitry 508.

Referring to FIG. 5G, die 404 includes one or more DPE arrays 102. Die 406 includes ASIC 504. Die 510 includes analog/mixed signal circuitry 508. In one or more embodiments, a PS (e.g., PS 312) is an example of an ASIC.

In the examples of FIG. 5, each of dies 406 and/or 510 is depicted as including a particular type of subsystem. In other embodiments, die 404, 406, and/or 510 may include one or more subsystems in combination with one or more DPE arrays 102. Further, dies 404, 406, and/or 510 may include two or more different types of subsystems. As such, any one or more of dies 404, 406, and/or 510 may include one or more DPE arrays 102 in combination with one or more subsystems in any combination.

In one or more embodiments, interposer 402 and dies 404, 406, and/or 510 may be implemented using a same IC fabrication technology (e.g., feature size). In one or more other embodiments, interposer 402 may be implemented using a particular IC fabrication technology while dies 404, 406, and/or 510 are implemented using a different IC fabrication technology. In still other embodiments, dies 404, 406, and/or 510 may be implemented using different IC fabrication technologies that may be the same or different as the IC fabrication technology used to implement interposer 402. By using different IC fabrication technologies for different dies and/or interposers, less costly and/or more reliable IC fabrication technologies may be used for certain dies, while other IC fabrication technologies capable of producing smaller feature sizes may be used for other dies. For example, more mature fabrication technologies may be used to implement interposer 402, while other technologies capable of forming smaller feature sizes may be used to implement active dies and/or dies including DPE array(s) 102.

The examples of FIG. 5 illustrate multi-die implementations of device 100 that include two or more dies mounted on an interposer. The number of dies shown is for purposes of illustration and not limitation. In other embodiments, device 100 may include more than three dies mounted on interposer 402.

In one or more other embodiments, a multi-die version of device 100 may be implemented using an architecture other than the stacked die architecture of FIG. 4. For example, device 100 may be implemented as a Multi-Chip Module (MCM). An MCM implementation of device 100 may be implemented using one or more pre-packaged ICs mounted on a circuit board where the circuit board has a form factor and/or footprint intended to mimic an existing chip package. In another example, an MCM implementation of device 100 may be implemented by integrating two or more dies on a high-density interconnection substrate. In still another example, an MCM implementation of device 100 may be implemented as a "chip-stack" package.

Using a DPE array as described herein in combination with one or more other subsystems, whether implemented in a single die device or a multi-die device, increases the processing capabilities of the device while keeping area usage and power consumption low. For example, one or more DPE array(s) may be used to hardware accelerate particular operations and/or to perform functions offloaded from one or more of the subsystems of the device described herein. When used with a PS, for example, the DPE array may be used as a hardware accelerator. The PS may offload operations to be performed by the DPE array or a portion thereof. In other examples, the DPE array may be used to perform computationally resource intensive operations such as generating digital pre-distortion to be provided to analog/mixed signal circuitry.

It should be appreciated that any of the various combinations of DPE array(s) and/or other subsystems described herein in connection with FIGS. 1, 2, 3, 4 and/or 5 may be implemented in either a single die type of device or a multi-die type of device.

In the various examples described herein, the SoC interface block is implemented within the DPE array. In one or more other embodiments, the SoC interface block may be implemented external to the DPE array. For example, the SoC interface block may be implemented as a circuit block, e.g., a standalone circuit block, that is separate from the circuit block implementing the plurality of DPEs.

Figure 6:
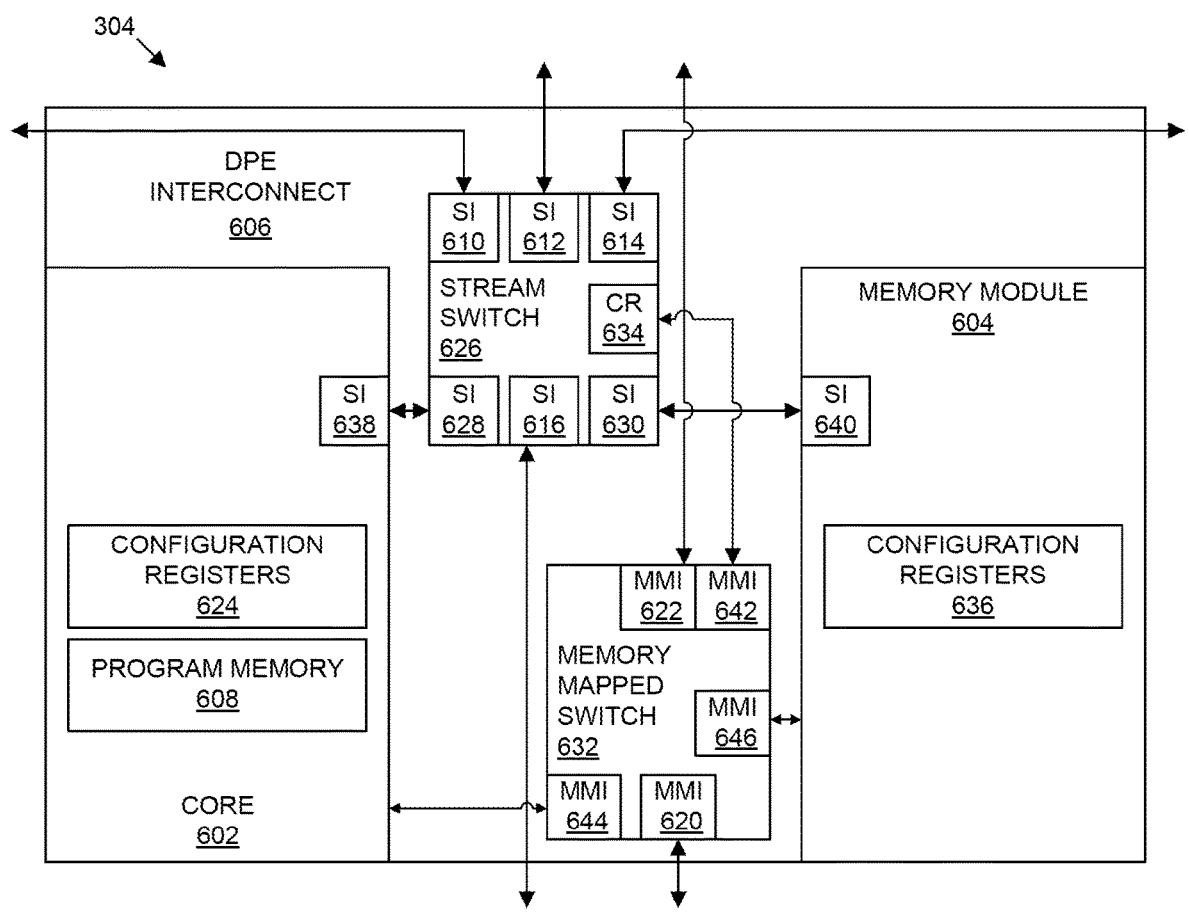
FIG. 6 illustrates an example architecture for a DPE of a DPE array.

FIG. 6 illustrates an example architecture for a DPE 304 of DPE array 102. In the example of FIG. 6, DPE 304 includes a core 602, a memory module 604, and DPE interconnect 606.

Core 602 provides the data processing capabilities of DPE 304. Core 602 may be implemented as any of a variety of different processing circuits. In the example of FIG. 6, core 602 includes an optional program memory 608. In one or more embodiments, core 602 is implemented as a processor that is capable of executing program code, e.g., computer readable instructions. In that case, program memory 608 is included and is capable of storing instructions that are executed by core 602. Core 602, for example, may be implemented as a CPU, a GPU, a DSP, a vector processor, or other type of processor that is capable of executing instructions. The core may be implemented using any of the various CPU and/or processor architectures described herein. In another example, core 602 is implemented as a very long instruction word (VLIW) vector processor or DSP.

In particular embodiments, program memory 608 is implemented as a dedicated program memory that is private to core 602. Program memory 608 may only be used by the core of the same DPE 304. Thus, program memory 608 may only be accessed by core 602 and is not shared with any other DPE or component of another DPE. Program memory 608 may include a single port for read and write operations. Program memory 608 may support program compression and is addressable using the memory mapped network portion of DPE interconnect 606 described in greater detail below. Via the memory mapped network of DPE interconnect 606, for example, program memory 608 may be loaded with program code that may be executed by core 602.

In one or more embodiments, program memory 608 is capable of supporting one or more error detection and/or error correction mechanisms. For example, program memory 608 may be implemented to support parity checking through the addition of parity bits. In another example, program memory 608 may be error-correcting code (ECC) memory that is capable of detecting and correcting various types of data corruption. In another example, program memory 608 may support both ECC and parity checking. The different types of error detection and/or error correction described herein are provided for purposes illustration and are not intended to be limiting of the embodiments described. Other error detection and/or error correction technologies may be used with program memory 608 other than those listed.

In one or more embodiments, core 602 may have a customized architecture to support an application-specific instruction set. For example, core 602 may be customized for wireless applications and be configured to execute wireless-specific instructions. In another example, core 602 may be customized for machine learning and be configured to execute machine learning-specific instructions.

In one or more other embodiments, core 602 is implemented as hardwired circuitry such as a hardened Intellectual Property (IP) core that is dedicated for performing a particular operation or operations. In that case, core 602 may not execute program code. In embodiments where core 602 does not execute program code, program memory 608 may be omitted. As an illustrative and non-limiting example, core 602 may be implemented as a hardened forward error correction (FEC) engine or other circuit block.

Core 602 may include configuration registers 624. Configuration registers 624 may be loaded with configuration data to control operation of core 602. In one or more embodiments, core 602 may be activated and/or deactivated based upon configuration data loaded into configuration registers 624. In the example of FIG. 6, configuration registers 624 are addressable (e.g., may be read and/or written) via the memory mapped network of DPE interconnect 606 described in greater detail below.

In one or more embodiments, memory module 604 is capable of storing data that is used by and/or generated by core 602. For example, memory module 604 is capable of storing application data. Memory module 604 may include a read/write memory such as a random-access memory. Accordingly, memory module 604 is capable of storing data that may be read and consumed by core 602. Memory module 604 is also capable of storing data (e.g., results) that are written by core 602.

In one or more other embodiments, memory module 604 is capable of storing data, e.g., application data, that may be used by and/or generated by one or more other cores of other DPEs within the DPE array. One or more other cores of DPEs may also read from and/or write to memory module 604. In particular embodiments, the other cores that may read from and/or write to memory module 604 may be cores of one or more neighboring DPEs. Another DPE that shares a border or boundary with DPE 304 (e.g., that is adjacent) is said to be a "neighboring" DPE relative to DPE 304. By allowing core 602 and one or more other cores from neighboring DPEs to read and/or write to memory module 604, memory module 604 implements a shared memory that supports communication among the different DPEs and/or cores capable of accessing memory module 604.

Referring to FIG. 3, for example, DPEs 304-14, 304-16, 304-5, and 304-25 are considered neighboring DPEs of DPE 304-15. In one example, the core within each of DPEs 304-16, 304-5, and 304-25 is capable of reading and writing to the memory module within DPE 304-15. In particular embodiments, only those neighboring DPEs that are adjacent to the memory module may access the memory module of DPE 304-15. For example, DPE 304-14, while adjacent to DPE 304-15, may not be adjacent to the memory module of DPE 304-15 since the core of DPE 304-15 may be located between the core of DPE 304-14 and the memory module of DPE 304-15. As such, in particular embodiments, the core of DPE 304-14 may not access the memory module of DPE 304-15.

In particular embodiments, whether a core of a DPE is able to access the memory module of another DPE depends upon the number of memory interfaces included in the memory module and whether such cores are connected to an available one of the memory interfaces of the memory module. In the example above, the memory module of DPE 304-15 includes four memory interfaces, where the core of each of DPEs 304-16, 304-5, and 304-25 is connected to such a memory interface. Core 602 within DPE 304-15 itself is connected to the fourth memory interface. Each memory interface may include one or more read and/or write channels. In particular embodiments, each memory interface includes multiple read channels and multiple write channels so that the particular core attached thereto is capable of reading and/or writing to multiple banks within memory module 604 concurrently.

In other examples, more than four memory interfaces may be available. Such other memory interfaces may be used to allow DPEs on a diagonal to DPE 304-15 to access the memory module of DPE 304-15. For example, if the cores in DPEs such as DPEs 304-14, 304-24, 304-26, 304-4, and/or 304-6 are also coupled to an available memory interface of the memory module in DPE 304-15, such other DPEs would also be capable of accessing the memory module of DPE 304-15.

Memory module 604 may include configuration registers 636. Configuration registers 636 may be loaded with configuration data to control operation of memory module 604. In the example of FIG. 6, configuration registers 636 (and 624) are addressable (e.g., may be read and/or written) via the memory mapped network of DPE interconnect 606 described in greater detail below.

In the example of FIG. 6, DPE interconnect 606 is specific to DPE 304. DPE interconnect 606 facilitates various operations including communication between DPE 304 and one or more other DPEs of DPE array 102 and/or communication with other subsystems of device 100. DPE interconnect 606 further enables configuration, control, and debugging of DPE 304.

In particular embodiments, DPE interconnect 606 is implemented as an on-chip interconnect. An example of an on-chip interconnect is an Advanced Microcontroller Bus Architecture (AMBA) eXtensible Interface (AXI) bus (e.g., or switch). An AMBA AXI bus is an embedded microcontroller bus interface for use in establishing on-chip connections between circuit blocks and/or systems. An AXI bus is provided herein as an example of interconnect circuitry that may be used with the inventive arrangements described within this disclosure and, as such, is not intended as a limitation. Other examples of interconnect circuitry may include other types of buses, crossbars, and/or other types of switches.

In one or more embodiments, DPE interconnect 606 includes two different networks. The first network is capable of exchanging data with other DPEs of DPE array 102 and/or other subsystems of device 100. For example, the first network is capable of exchanging application data. The second network is capable of exchanging data such as configuration, control, and/or debugging data for the DPE(s).

In the example of FIG. 6, the first network of DPE interconnect 606 is formed of stream switch 626 and one or more stream interfaces. As pictured, stream switch 626 includes a plurality of stream interfaces (abbreviated as "SI" in FIG. 6). In one or more embodiments, each stream interface may include one or more masters (e.g., master interfaces or outputs) and/or one or more slaves (e.g., slave interfaces or inputs). Each master may be an independent output having a particular bit-width. For example, each master included in a stream interface may be an independent AXI master. Each slave may be an independent input having a particular bit-width. For example, each slave included in a stream interface may be an independent AXI slave.

Stream interfaces 610-616 are used to communicate with other DPEs in DPE array 102 and/or with SoC interface block 104. For example, each of stream interfaces 610, 612, 614, and 616 is capable of communicating in a different cardinal direction. In the example of FIG. 6, stream interface 610 communicates with a DPE to the left (West). Stream interface 612 communicates with a DPE above (North). Stream interface 614 communicates with a DPE to the right (East). Stream interface 616 communicates with a DPE or SoC interface block 104 below (South).

Stream interface 628 is used to communicate with core 602. Core 602, for example, includes a stream interface 638 that connects to stream interface 628 thereby allowing core 602 to communicate directly with other DPEs 304 via DPE interconnect 606. For example, core 602 may include instructions or hardwired circuitry that enable core 602 to send and/or receive data directly via stream interface 638. Stream interface 638 may be blocking or non-blocking. In one or more embodiments, in cases where core 602 attempts to read from an empty stream or write to a full stream, core 602 may stall. In other embodiments, attempting to read from an empty stream or write to a full stream may not cause core 602 to stall. Rather, core 602 may continue execution or operation.

Stream interface 630 is used to communicate with memory module 604. Memory module 604, for example, includes a stream interface 640 that connects to stream interface 630 thereby allowing other DPEs 304 to communicate with memory module 604 via DPE interconnect 606. Stream switch 626 is capable of allowing non-neighboring DPEs and/or DPEs that are not coupled to a memory interface of memory module 604 to communicate with core 602 and/or memory module 604 via the DPE interconnect network formed by the DPE interconnects of the respective DPEs 304 of DPE array 102.

Referring again to FIG. 3 and using DPE 304-15 as a point of reference, stream interface 610 is coupled to, and capable of, communicating with another stream interface located in the DPE interconnect of DPE 304-14. Stream interface 612 is coupled to, and capable of, communicating with another stream interface located in the DPE interconnect of DPE 304-25. Stream interface 614 is coupled to, and capable of, communicating with another stream interface located in the DPE interconnect of DPE 304-16. Stream interface 616 is coupled to, and capable of, communicating with another stream interface located in the DPE interconnect of DPE 304-5. As such, core 602 and/or memory module 604 are also capable of communicating with any of the DPEs within DPE array 102 via the DPE interconnects in the DPEs.

Stream switch 626 may also be used to interface to subsystems such as PL 310 and/or NoC 308. In general, stream switch 626 may be programmed to operate as a circuit-switching stream interconnect or a packet-switched stream interconnect. A circuit-switching stream interconnect is capable of implementing point-to-point, dedicated streams that are suitable for high-bandwidth communication among DPEs. A packet-switching stream interconnect allows streams to be shared to time-multiplex multiple logical streams onto one physical stream for medium bandwidth communication.

Stream switch 626 may include configuration registers (abbreviated as "CR" in FIG. 6) 634. Configuration data may be written to configuration registers 634 by way of the memory mapped network of DPE interconnect 606. The configuration data loaded into configuration registers 634 dictates which other DPEs and/or subsystems (e.g., NoC 308, PL 310, and/or PS 312) DPE 304 will communicate with and whether such communications are established as circuit-switched point-to-point connections or as packet-switched connections.

It should be appreciated that the number of stream interfaces illustrated in FIG. 6 is for purposes of illustration and not limitation. In other embodiments, stream switch 626 may include fewer stream interfaces. In particular embodiments, stream switch 626 may include more stream interfaces that facilitate connections to other components and/or subsystems in the device. For example, additional stream interfaces may couple to other non-neighboring DPEs such as DPEs 304-24, 304-26, 304-4, and/or 304-6. In one or more other embodiments, stream interfaces may be included to couple a DPE such as DPE 304-15 to other DPEs located one or more DPEs away. For example, one or more stream interfaces may be included that allow DPE 304-15 to couple directly to a stream interface in DPE 304-13, in DPE 304-16, or other non-neighboring DPE.

The second network of DPE interconnect 606 is formed of memory mapped switch 632. Memory mapped switch 632 includes a plurality of memory mapped interfaces (abbreviated as "MMI" in FIG. 6). In one or more embodiments, each memory mapped interface may include one or more masters (e.g., master interfaces or outputs) and/or one or more slaves (e.g., slave interfaces or inputs). Each master may be an independent output having a particular bit-width. For example, each master included in a memory mapped interface may be an independent AXI master. Each slave may be an independent input having a particular bit-width. For example, each slave included in a memory mapped interface may be an independent AXI slave.

In the example of FIG. 6, memory mapped switch 632 includes memory mapped interfaces 620, 622, 642, 644, and 646. It should be appreciated that memory mapped switch 632 may include additional or fewer memory mapped interfaces. For example, for each component of a DPE that may be read and/or written using memory mapped switch 632, memory mapped switch 632 may include a memory mapped interface coupled to such component. Further, the component itself may include a memory mapped interface coupled to the corresponding memory mapped interface in memory mapped switch 632 to facilitate reading and/or writing of memory addresses.

Memory mapped interfaces 620 and 622 may be used to exchange configuration, control, and debugging data for DPE 304. In the example of FIG. 6, memory mapped interface 620 is capable of receiving configuration data that is used to configure DPE 304. Memory mapped interface 620 may receive configuration data from a DPE located below of DPE 304 and/or from SoC interface block 104. Memory mapped interface 622 is capable of forwarding configuration data received by memory mapped interface 620 to one or more other DPEs above DPE 304, to core 602 (e.g., to program memory 608 and/or to configuration registers 624), to memory module 604 (e.g., to memory within memory module 604 and/or to configuration registers 636), and/or to configuration registers 634 within stream switch 626.

In particular embodiments, memory mapped interface 620 communicates with a DPE or tile of SoC interface block 104 below to be described herein. Memory mapped interface 622 communicates with a DPE above. Referring again to FIG. 3 and using DPE 304-15 as a point of reference, memory mapped interface 620 is coupled to, and capable of, communicating with another memory mapped interface located in the DPE interconnect of DPE 304-5. Memory mapped interface 622 is coupled to, and capable of, communicating with another memory mapped interface located in the DPE interconnect of DPE 304-25. In one or more embodiments, memory mapped switch 632 conveys control, and/or debug data from South to North. In other embodiments, memory mapped switch 632 is also capable of passing data from North to South.

Memory mapped interface 646 may be coupled to a memory mapped interface (not shown) in memory module 604 to facilitate reading and/or writing of configuration registers 636 and/or memory within memory module 604. Memory mapped interface 644 may be coupled to a memory mapped interface (not shown) in core 602 to facilitate reading and/or writing of program memory 608 and/or configuration registers 624. Memory mapped interface 642 may be coupled to configuration registers 634 to read and/or write to configuration register 634.

In the example of FIG. 6, memory mapped switch 632 is capable of communicating with circuitry above (e.g., to the North) and below (e.g., to the South). In one or more other embodiments, memory mapped switch 632 includes additional memory mapped interfaces that are coupled to memory mapped interfaces of memory mapped switches of DPEs to the left and/or to the right. Using DPE 304-15 as a point of reference, such additional memory mapped interfaces may connect to memory mapped switches located in DPE 304-14 and/or DPE 304-16 thereby facilitating communication of configuration, control, and debug data among DPEs in the horizontal direction as well as the vertical direction.

In other embodiments, memory mapped switch 632 may include additional memory mapped interfaces connected to memory mapped switches in DPEs that are diagonal relative to DPE 304. For example, using DPE 304-15 as a point of reference, such additional memory mapped interfaces may be coupled to memory mapped switches located in DPE 304-24, 304-26, 304-4, and/or 304-6 thereby facilitating communication of configuration, control, and debug information among DPEs diagonally.

DPE interconnect 606 is coupled to the DPE interconnect of each neighboring DPE and/or SoC interface block 104 depending upon the location of DPE 304. Taken collectively, DPE interconnects of DPEs 304 form a DPE interconnect network (which may include the stream network and/or the memory mapped network). The configuration registers of the stream switches of each DPE may be programmed by loading configuration data through the memory mapped switches. Through configuration, the stream switches and/or stream interfaces are programmed to establish connections, whether packet-switched or circuit-switched, with other endpoints, whether in one or more other DPEs 304 and/or in SoC interface block 104.

In one or more embodiments, DPE array 102 is mapped to the address space of a processor system such as PS 312. Accordingly, any configuration registers and/or memories within DPE 304 may be accessed via a memory mapped interface. For example, memory in memory module 604, program memory 608, configuration registers 624 in core 602, configuration registers 636 in memory module 604, and/or configuration registers 634 may be read and/or written via memory mapped switch 632.

In the example of FIG. 6, memory mapped interfaces are capable of receiving configuration data for DPE 304. The configuration data may include program code that is loaded into program memory 608 (if included), configuration data for loading into configuration registers 624, 634, and/or 636, and/or data to be loaded into memory (e.g., memory banks) of memory module 604. In the example of FIG. 6, configuration registers 624, 634, and 636 are shown as being located within the particular circuit structures that the configuration registers are intended to control, e.g., core 602, stream switch 626, and memory module 604. The example of FIG. 6 is for purposes of illustration only and illustrates that elements within core 602, memory module 604, and/or stream switch 626 may be programmed by way of loading configuration data into the corresponding configuration registers. In other embodiments, the configuration registers may be consolidated within a particular region of DPE 304 despite controlling operation of components distributed throughout DPE 304.

Accordingly, stream switch 626 may be programmed by loading configuration data into configuration registers 634. The configuration data programs stream switch 626 and/or stream interfaces 610-616 and/or 628-630 to operate as circuit-switching stream interfaces between two different DPEs and/or other subsystems or as packet-switching stream interfaces coupled to selected DPEs and/or other subsystems. Thus, connections established by stream switch 626 to other stream interfaces are programmed by loading suitable configuration data into configuration registers 634 to establish actual connections or application data paths within DPE 304, with other DPEs, and/or with other subsystems of device 100.

Figure 7:
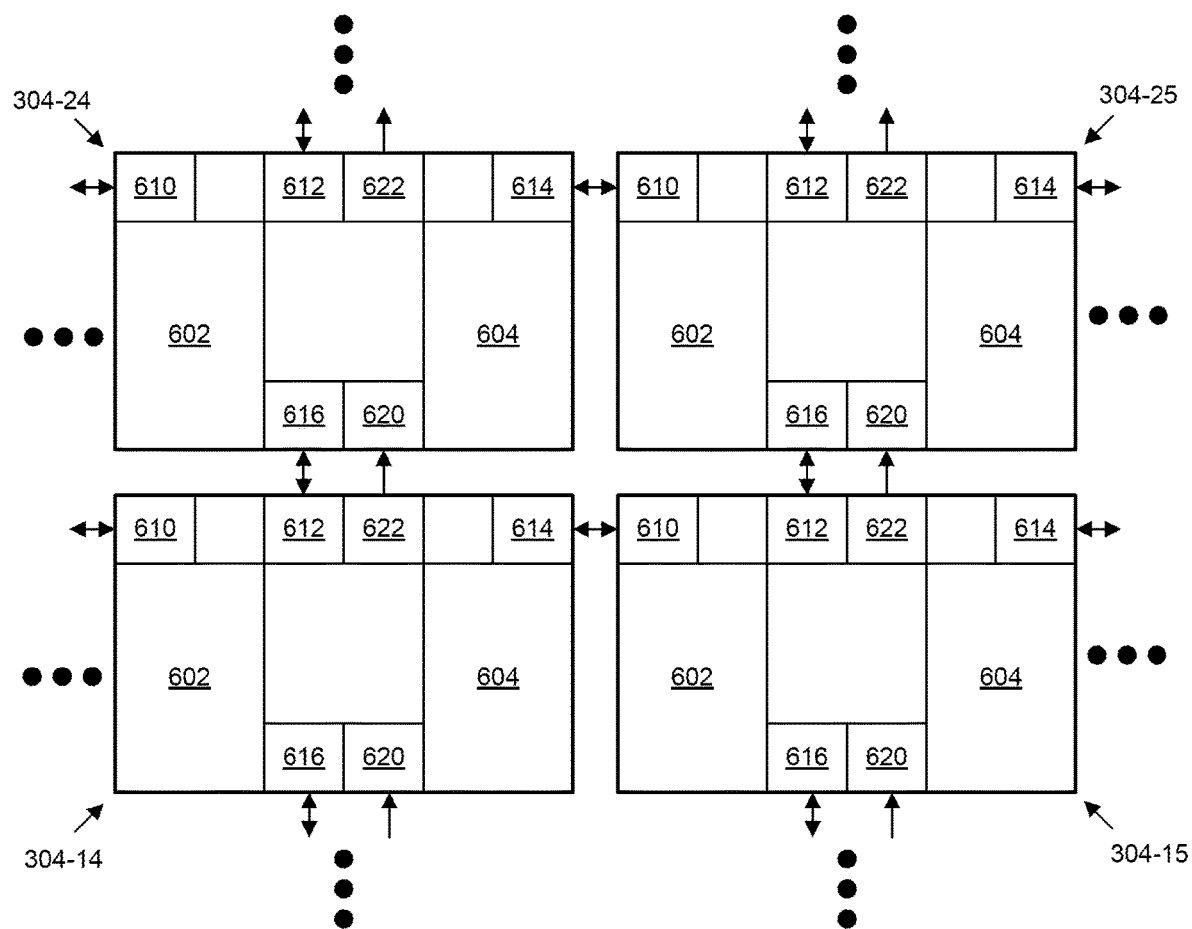
FIG. 7 illustrates example connectivity between multiple DPEs.

FIG. 7 illustrates example connectivity between multiple DPEs 304. In the example of FIG. 7, the architecture illustrated in FIG. 6 is used to implement each of DPEs 304-14, 304-15, 304-24, and 304-25. FIG. 7 illustrates an embodiment where stream interfaces are interconnected among neighboring DPEs (on each side and above and below) and where memory mapped interfaces are connected to DPEs above and below. For purposes of illustration, the stream switches and the memory mapped switches are not shown.

As noted, in other embodiments, additional memory mapped interfaces may be included to couple DPEs in the vertical direction as pictured and in the horizontal direction. Further, memory mapped interfaces may support bi-directional communication in the vertical and/or horizontal directions.

Memory mapped interfaces 620 and 622 are capable of implementing a shared, transaction switched network where transactions propagate from memory mapped switch to memory mapped switch. Each of the memory mapped switches, for example, is capable of dynamically routing transactions based upon addresses. Transactions may be stalled at any given memory mapped switch. Memory mapped interfaces 620 and 622 allow other subsystems of device 100 to access resources (e.g., components) of DPEs 304.

In particular embodiments, subsystems of device 100 are capable of reading the internal state of any register and/or memory element of a DPE via memory mapped interfaces 620 and/or 622. Through memory mapped interfaces 620 and/or 622, subsystems of device 100 are capable of reading and/or writing to program memory 608 and to any configuration registers within DPEs 304.

Stream interfaces 610-616 (e.g., stream switch 626) are capable of providing deterministic throughput with a guaranteed and fixed latency from source to destination. In one or more embodiments, stream interfaces 610 and 614 are capable of receiving four 32-bit streams and outputting four 32-bit streams. In one or more embodiments, stream interface 614 is capable of receiving four 32-bit streams and outputting six 32-bit streams. In particular embodiments, stream interface 616 is capable of receiving four 32-bit streams and outputting four 32-bit streams. The numbers of streams and sizes of the streams of each stream interface are provided for purposes of illustration and are not intended as limitations.

Figure 8:
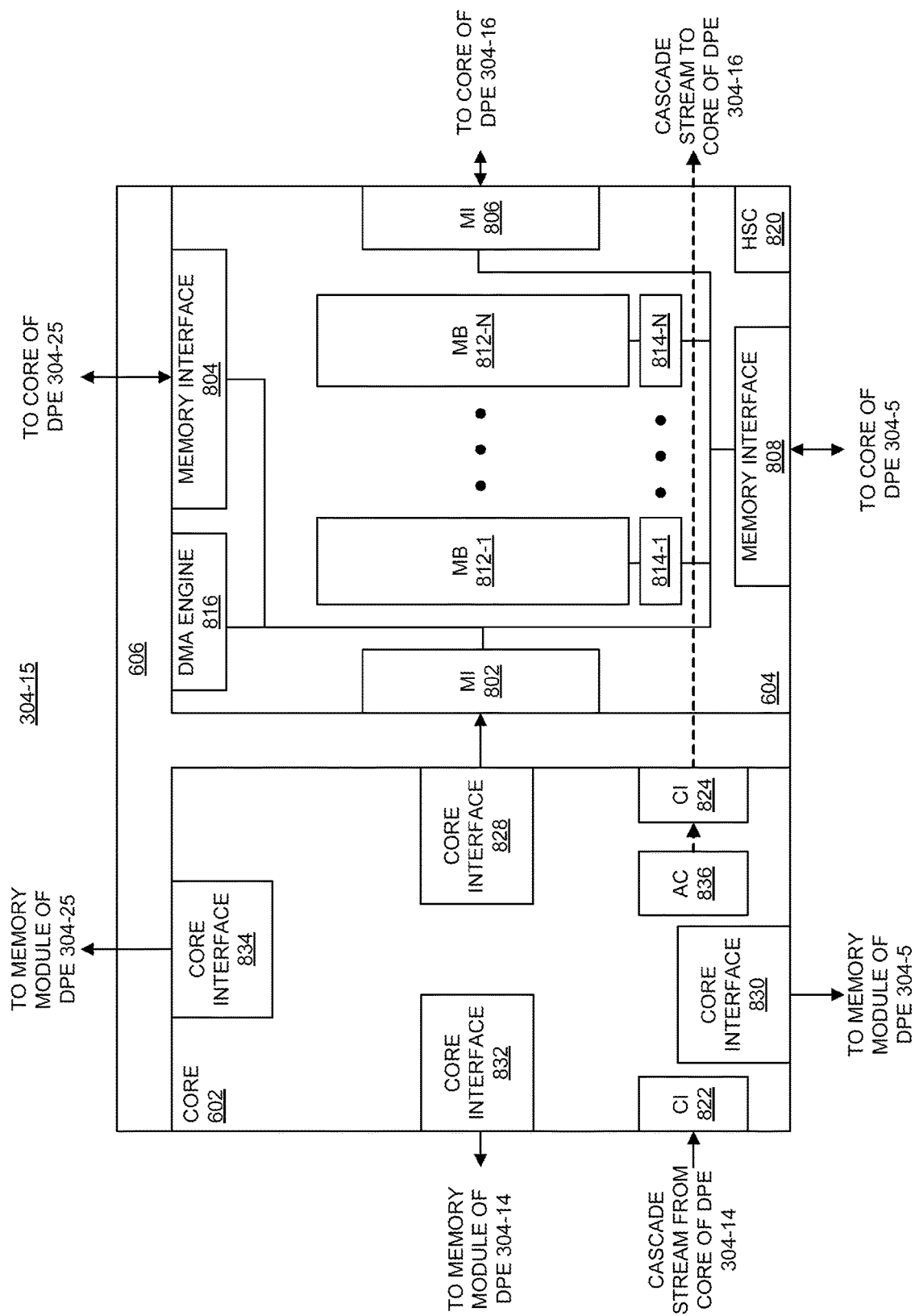
FIG. 8 illustrates further aspects of the example DPE architecture of FIG. 6.

FIG. 8 illustrates further aspects of the example architecture of FIG. 6. In the example of FIG. 8, details relating to DPE interconnect 606 are not shown. FIG. 8 illustrates connectivity of core 602 with other DPEs through shared memory. FIG. 8 also illustrates additional aspects of memory module 604. For purposes of illustration, FIG. 8 refers to DPE 304-15.

As pictured, memory module 604 includes a plurality of memory interfaces 802, 804, 806, and 808. Within FIG. 8, memory interfaces 802 and 808 are abbreviated as "MI." Memory module 604 further includes a plurality of memory banks 812-1 to 812-N. In particular embodiments, memory module 604 includes eight memory banks. In other embodiments, memory module 604 may include fewer or more memory banks 812. In one or more embodiments, each memory bank 812 is single-ported thereby allowing up to one access to each memory bank each clock cycle. In the case where memory module 604 includes eight memory banks 812, such a configuration supports eight parallel accesses each clock cycle. In other embodiments, each memory bank 812 is dual-ported or multi-ported thereby allowing a larger number of parallel accesses each clock cycle.

In one or more embodiments, memory module 604 is capable of supporting one or more error detection and/or error correction mechanisms. For example, memory banks 812 may be implemented to support parity checking through the addition of parity bits. In another example, memory banks 812 may be ECC memory that are capable of detecting and correcting various types of data corruption. In another example, memory banks 812 may support both ECC and parity checking. The different types of error detection and/or error correction described herein are provided for purposes illustration and are not intended to be limiting of the embodiments described. Other error detection and/or error correction technologies may be used with memory module 604 other than those listed.

In one or more other embodiments, error detection and/or error correction mechanisms may be implemented on a per-memory bank 812 basis. For example, one or more of memory banks 812 may include parity checking, while one or more other ones of memory banks 812 may be implemented as ECC memory. Still, other ones of memory banks 812 may support both ECC and parity checking. As such, different combinations of error detection and/or error correction may be supported by different memory banks 812 and/or combinations of memory banks 812.

In the example of FIG. 8, each of memory banks 812-1 through 812-N has a respective arbiter 814-1 through 814-N. Each of as 814 is capable of generating a stall signal in response to detecting conflicts. Each arbiter 814 may include arbitration logic. Further, each arbiter 814 may include a crossbar. Accordingly, any master is capable of writing to any particular one or more of memory banks 812. As noted in connection with FIG. 6, memory module 604 may include a memory mapped interface (not shown) that communicates with memory mapped interface 646 of memory mapped switch 632. The memory mapped interface in memory module 604 may be connected to the communication lines in memory module 604 that couple DMA engine 816, memory interfaces 802, 804, 806, and 808, and arbiters 814 in order to read and/or write to memory bank 812.

Memory module 604 further includes a direct memory access (DMA) engine 816. In one or more embodiments, DMA engine 816 includes at least two interfaces. For example, one or more interfaces are capable of receiving input data streams from DPE interconnect 606 and writing the received data to memory banks 812. One or more other interfaces are capable of reading data from memory banks 812 and sending the data out via a stream interface of DPE interconnect 606. For example, DMA engine 816 may include stream interface 640 of FIG. 6.

Memory module 604 is capable of operating as a shared memory that may be accessed by a plurality of different DPEs. In the example of FIG. 8, memory interface 802 is coupled to core 602 via core interface 828 included in core 602. Memory interface 802 provides core 602 with access to memory banks 812 through arbiters 814. Memory interface 804 is coupled to the core of DPE 304-25. Memory interface 804 provides the core of DPE 304-25 with access to memory banks 812. Memory interface 806 is coupled to the core of DPE 304-16. Memory interface 806 provides the core of DPE 304-16 with access to memory banks 812. Memory interface 808 is coupled to the core of DPE 304-5. Memory interface 808 provides the core of DPE 304-5 with access to memory banks 812. Accordingly, in the example of FIG. 8, each DPE that has a shared boundary with memory module 604 of DPE 304-15 is capable of reading and writing to memory banks 812. In the example of FIG. 8, the core of DPE 304-14 does not have direct access to memory module 604 of DPE 304-15.

Memory mapped switch 632 is capable of writing data to memory banks 812. For example, memory mapped switch 632 may be coupled to a memory mapped interface (not shown) located in memory module 604 that is in turn coupled to arbiters 814. As such, the particular data stored in memory module 604 may be controlled, e.g., written, as part of a configuration, control, and/or debugging process.

Core 602 is capable of accessing memory modules of other neighboring DPEs via core interfaces 830, 832, and 834. In the example of FIG. 8, core interface 834 is coupled to a memory interface of DPE 304-25. Accordingly, core 602 is capable of accessing the memory module of DPE 304-25 via core interface 834 and the memory interface contained within the memory module of DPE 304-25. Core interface 832 is coupled to a memory interface of DPE 304-14. Accordingly, core 602 is capable of accessing the memory module of DPE 304-14 via core interface 832 and the memory interface contained within the memory module of DPE 304-14. Core interface 830 is coupled to a memory interface within DPE 304-5. Accordingly, core 602 is capable of accessing the memory module of DPE 304-5 via core interface 830 and the memory interface contained within the memory module of DPE 304-5. As discussed, core 602 is capable of accessing memory module 604 within DPE 304-15 via core interface 828 and memory interface 802.

In the example of FIG. 8, core 602 is capable of reading and writing to any of the memory modules of DPEs that share a boundary with core 602 in DPE 304-15 (e.g., DPEs 304-25, 304-14, and 304-5). In one or more embodiments, core 602 is capable of viewing the memory modules within DPEs 304-25, 304-15, 304-14, and 304-5 as a single, contiguous memory. Core 602 is capable of generating addresses for reads and writes presuming this contiguous memory model. Core 602 is capable of directing the read and/or write requests to the appropriate core interface 828, 830, 832, and/or 834 based upon the addresses that are generated.

In one or more other embodiments, memory module 604 includes additional memory interfaces that may be coupled to other DPEs. For example, memory module 604 may include memory interfaces that are coupled to cores of DPEs 304-24, 304-26, 304-4, and/or 304-5. In one or more other embodiments, memory module 604 may include one or more memory interfaces that are used to connect to cores of DPEs that are not neighboring DPEs. For example, such additional memory interface(s) may be connected to cores of DPEs separated from DPE 304-15 by one or more other DPEs in a same row, in a same column, or in a diagonal direction. As such, the number of memory interfaces in memory module 604 and the particular DPEs to which such memory interfaces are connected as illustrated in FIG. 8 are for purposes of illustration and not limitation.

As noted, core 602 is capable of mapping read and/or write operations in the correct direction through core interface 828, 830, 832, and/or 834 based upon the addresses of such operations. When core 602 generates an address for a memory access, core 602 is capable of decoding the address to determine the direction (e.g., the particular DPE to be accessed) and forwards the memory operation to the correct core interface in the determined direction.

Accordingly, core 602 is capable of communicating with the core of DPE 304-25 via a shared memory which may be the memory module within DPE 304-25 and/or memory module 604 of DPE 304-15. Core 602 is capable of communicating with the core of DPE 304-14 via a shared memory which is the memory module within DPE 304-14. Core 602 is capable of communicating with the core of DPE 304-5 via a shared memory which may be the memory module within DPE 304-5 and/or memory module 604 of DPE 304-15. Further, core 602 is capable of communicating with the core of DPE 304-16 via a shared memory which is memory module 604 within DPE 304-15.

As discussed, DMA engine 816 may include one or more stream-to-memory interfaces (e.g., stream interface 640). Through DMA engine 816, application data may be received from other sources within device 100 and stored in memory module 604. For example, data may be received from other DPEs that do and/or do not share a boundary with DPE 304-15 by way of stream switch 626. Data may also be received from other subsystems of device 100 (e.g., NoC 308, hardwired circuit blocks, PL 310, and/or PS 312) by way of SoC interface block 104 through the stream switches of the DPEs. DMA engine 816 is capable of receiving such data from the stream switches and writing the data to an appropriate memory bank or memory banks 812 within memory module 604.

DMA engine 816 may include one or more memory-to-stream interfaces (e.g., stream interface 630). Through DMA engine 816, data may be read from memory bank or memory banks 812 of memory module 604 and sent to other destinations via the stream interfaces. For example, DMA engine 816 is capable of reading data from memory module 604 and sending such data to other DPEs that do and/or do not share a boundary with DPE 304-15 by way of the stream switches. DMA engine 816 is also capable of sending such data to other subsystems (e.g., NoC 308, hardwired circuit blocks, PL 310, and/or PS 312) by way of the stream switches and SoC interface block 104.

In one or more embodiments, DMA engine 816 may be programmed by memory mapped switch 632 within DPE 304-15. For example, DMA engine 816 may be controlled by configuration registers 636. Configuration registers 636 may be written using memory mapped switch 632 of DPE interconnect 606. In particular embodiments, DMA engine 816 may be controlled by the stream switch 626 within DPE 304-15. For example, DMA engine 816 may include control registers that may be written by stream switch 626 connected thereto (e.g., via stream interface 640). Streams received via stream switch 626 within DPE interconnect 606 may be connected to DMA engine 816 in memory module 604 and/or directly to core 602 depending upon the configuration data loaded into configuration registers 624, 634, and/or 636. Streams may be sent from DMA engine 816 (e.g., memory module 604) and/or core 602 depending upon the configuration data loaded into configuration registers 624, 634, and/or 636.

Memory module 604 further may include hardware synchronization circuitry 820 (abbreviated as "HSC" in FIG. 8). In general, hardware synchronization circuitry 820 is capable of synchronizing operation of different cores (e.g., cores of neighboring DPEs), core 602 of FIG. 8, DMA engine 816, and other external masters (e.g., PS 312) that may communicate via DPE interconnect 606. As an illustrative and non-limiting example, hardware synchronization circuitry 820 is capable of synchronizing two different cores in different DPEs accessing the same, e.g., a shared, buffer in memory module 604.

In one or more embodiments, hardware synchronization circuitry 820 may include a plurality of different locks. The particular number of locks included in hardware synchronization circuitry 820 may depend upon the number of entities able to access memory modules, but is not intended as a limitation. In particular embodiments, each different hardware lock may have an arbiter that is capable of handling simultaneous requests. Further, each hardware lock is capable of handling a new request each clock cycle. Hardware synchronization circuitry 820 may have a plurality of requestors such as core 602, the core from each of DPEs 304-25, 304-16, and 304-5, DMA engine 816, and/or a master that communicates via DPE interconnect 606. A requestor, for example, acquires a lock on a particular portion of memory in a memory module from the local hardware synchronization circuitry prior to accessing the portion of memory. The requestor may release the lock so that another requestor may acquire the lock prior to accessing the same portion of memory.

In one or more embodiments, hardware synchronization circuitry 820 is capable of synchronizing access by a plurality of cores to memory module 604 and, more particularly, to memory banks 812. For example, hardware synchronization circuitry 820 is capable of synchronizing access of core 602 illustrated in FIG. 8, the core of DPE 304-25, the core of DPE 304-16, and the core of DPE 304-5 to memory module 604 of FIG. 8. In particular embodiments, hardware synchronization circuitry 820 is capable of synchronizing access to memory banks 812 for any cores that are capable of directly accessing memory module 604 via memory interfaces 802, 804, 806, and/or 808. Each core that is capable of accessing memory module 604 (e.g., core 602 of FIG. 8 and the core of one or more of the neighboring DPEs), for example, may access hardware synchronization circuitry 820 to request and acquire a lock prior to accessing a particular portion of memory in memory module 604 and subsequently release the lock so as to allow another core to access the portion of memory once that core acquires a lock. In a similar manner, core 602 is capable of accessing hardware synchronization circuitry 820, the hardware synchronization circuitry within DPE 304-14, the hardware synchronization circuitry within DPE 304-25, and the hardware synchronization circuitry within DPE 304-5 to request and acquire a lock in order to access a portion of memory in the memory module of each respective DPE and subsequently release the lock. Hardware synchronization circuitry 820 effectively manages operation of the shared memory between DPEs by regulating and synchronizing access to the memory modules of the DPEs.

Hardware synchronization circuitry 820 may also be accessed via the memory mapped switch 632 of DPE interconnect 606. In one or more embodiments, a lock transaction is implemented as an atomic acquire (e.g., test if unlock and set lock) and release (e.g., unset lock) operation for a resource. Locks of hardware synchronization circuitry 820 provide a way to efficiently transfer ownership of a resource between two participants. The resource can be any of a variety of circuit components such as a buffer in local memory (e.g., a buffer in memory module 604).

While hardware synchronization circuitry 820 is capable of synchronizing access to memory to support communication through shared memory, hardware synchronization circuitry 820 is also capable of synchronizing any of a variety of other resources and/or agents including other DPEs and/or other cores. For example, since hardware synchronization circuitry 820 provides a shared pool of locks, the locks may be used by a DPE, e.g., a core of a DPE, to start and/or stop operation of another DPE or core. The locks of hardware synchronization circuitry 820 may be allocated, e.g., based upon configuration data, for different purposes such as synchronizing different agents and/or resources as may be required depending upon the particular application(s) implemented by DPE array 102.

In particular embodiments, DPE access and DMA access to the locks of hardware synchronization circuitry 820 are blocking. Such accesses are capable of stalling the requesting core or the DMA engine in cases where a lock cannot be immediately acquired. Once the hardware lock becomes available, the core or DMA engine acquires the lock and un-stalls automatically.

In an embodiment, memory mapped accesses may be non-blocking such that a memory mapped master is capable of polling the status of the locks of hardware synchronization circuitry 820. For example, a memory mapped switch can send a lock "acquire" request as a normal memory read operation to hardware synchronization circuitry 820. The read address may encode the identifier of the lock and other request data. The read data, e.g., response to the read request, may signal the success of the acquire request operation. The "acquire" sent as a memory read may be sent in a loop until successful. In another example, hardware synchronization circuitry 820 can issue an event such that the memory mapped master receives an interrupt when the status of the requested lock changes.

Accordingly, when two neighboring DPEs share a data buffer through memory module 604, hardware synchronization circuitry 820 within the particular memory module 604 that includes the buffer synchronizes the accesses. Typically, but not necessarily, the memory block may be double buffered to improve throughput.

In the case where two DPEs are not neighbors, the two DPEs do not have access to a common memory module. In that case, application data may be transferred via a data stream (the terms "data stream" and "stream" may be used interchangeably from time-to-time within this disclosure). As such, the local DMA engine is capable of converting the transfer from a local memory based transfer to a stream-based transfer. In that case, core 602 and DMA engine 816 are capable of synchronizing using hardware synchronization circuitry 820.

Core 602 further is capable of accessing hardware synchronization circuitry, e.g., locks of the hardware synchronization circuitry, of neighboring DPEs to facilitate communication by shared memories. As such, the hardware synchronization circuitry in such other or neighboring DPEs is capable of synchronizing access to resources, e.g., memory, between cores of neighboring DPEs.

PS 312 is capable of communicating with core 602 via memory mapped switch 632. PS 312, for example, is capable of accessing memory module 604 and hardware synchronization circuitry 820 by initiating memory reads and writes. In another embodiment, hardware synchronization circuitry 820 may also send an interrupt to PS 312 when status of a lock changes to avoid polling by PS 312 of hardware synchronization circuitry 820. PS 312 is also capable of communicating with DPE 304-15 via the stream interfaces.

The examples provided herein relating to entities sending memory mapped requests and/or transfers are for purposes of illustration and not limitation. In particular embodiments, any entity that is external to DPE array 102 is capable of sending memory mapped requests and/or transfers. For example, a circuit block implemented in PL 310, an ASIC, or other circuitry as described herein external to DPE array 102 is capable of sending memory mapped requests and/or transfers to DPEs 304 and accessing hardware synchronization circuitry of the memory module(s) within such DPEs.

In addition to communicating with neighboring DPEs through shared memory modules and neighboring and/or non-neighboring DPEs via DPE interconnect 606, core 602 may include cascade interfaces. In the example of FIG. 8, core 602 includes cascade interfaces 822 and 824 (abbreviated as "CI" in FIG. 8). Cascade interfaces 822 and 824 are capable of providing direct communication with other cores. As pictured, cascade interface 822 of core 602 receives an input data stream directly from the core of DPE 304-14. The data stream received via cascade interface 822 may be provided to the data processing circuitry within core 602. Cascade interface 824 of core 602 is capable of sending an output data stream directly to the core of DPE 304-16.

In the example of FIG. 8, each of cascade interface 822 and cascade interface 824 may include a first-in-first-out (FIFO) interface for buffering. In particular embodiments, cascade interfaces 822 and 824 are capable of conveying data streams that may be hundreds of bits in width. The particular bit width of cascade interfaces 822 and 824 is not intended as a limitation. In the example of FIG. 8, cascade interface 824 is coupled to an accumulator register 836 (abbreviated as "AC" within FIG. 8) within core 602. Cascade interface 824 is capable of outputting the contents of accumulator register 836 and may do so each clock cycle. Accumulation register 836 may store data that is generated and/or being operated upon by data processing circuitry within core 602.

In the example of FIG. 8, cascade interfaces 822 and 824 may be programmed based upon configuration data loaded into configuration registers 624. For example, based upon configuration registers 624, cascade interface 822 may be activated or deactivated. Similarly, based upon configuration registers 624, cascade interface 824 may be activated or deactivated. Cascade interface 822 may be activated and/or deactivated independently of cascade interface 824.

In one or more other embodiments, cascade interfaces 822 and 824 are controlled by core 602. For example, core 602 may include instructions to read/write to cascade interfaces 822 and/or 824. In another example, core 602 may include hardwired circuitry that is capable of reading and/or writing to cascade interfaces 822 and/or 824. In particular embodiments, cascade interfaces 822 and 824 may be controlled by an entity outside of core 602.

Within the embodiments described within this disclosure, DPEs 304 do not include cache memories. By omitting cache memories, DPE array 102 is capable of achieving predictable, e.g., deterministic, performance. Further, significant processing overhead is avoided since maintaining coherency among cache memories located in different DPEs is not required.

In accordance with one or more embodiments, cores 602 of DPEs 304 do not have input interrupts. Thus, cores 602 of DPEs 304 are capable of operating uninterrupted. Omitting input interrupts to cores 602 of DPEs 304 also allows DPE array 102 to achieve predictable, e.g., deterministic, performance.

In cases where one or more DPEs 304 communicate with an external agent implemented in PS 312, PL 310, a hardwired circuit block, and/or in another subsystem of device 100 (e.g., an ASIC) through a shared buffer in an external read-write (e.g., DDR) memory, coherency mechanisms may be implemented using a coherency interconnect in PS 312. In these scenarios, the application data transfer between DPE array 102 and the external agent may traverse both NoC 308 and/or PL 310.

In one or more embodiments, DPE array 102 may be functionally isolated into a plurality groups of one or more DPEs. For example, specific memory interfaces may be enabled and/or disabled via configuration data to create one or more groups of DPEs, where each group includes one or more (e.g., a subset) of DPEs of DPE array 102. In another example, the stream interfaces may be configured independently per group so as to communicate with other cores of DPEs in the group and/or with a designated input source and/or output destination.

In one or more embodiments, core 602 is capable of supporting debug functions via the memory mapped interfaces. As discussed, program memory 608, memory module 604, core 602, DMA engine 816, stream switch 626, and other components of DPEs are memory mapped. The memory mapped registers may be read and/or written by any source that can produce memory mapped requests such as, for example, PS 312, PL 310, and/or a platform management controller within the IC. The requests may travel through SoC interface block 104 to the intended, or target, DPE within DPE array 102.

Via the memory mapped switch within a DPE, functions such as suspending the core, resuming the core, single-stepping the core, and/or resetting the core may be performed. Further, such operations may be initiated for a plurality of different DPEs. Other example debug operations that may be performed include, for example, reading status and/or setting the state of hardware synchronization circuitry 820 and/or DMA engine 816 via the memory mapped interfaces described herein.

In one or more embodiments, the stream interfaces of DPEs are capable of generating trace information that may be output from DPE array 102. Stream interfaces, for example, may be configured to extract trace information from DPE array 102. Trace information may be generated as packet-switched streams that contain time-stamped data marking event occurrences and/or a limited branch trace of an execution flow. In one aspect, traces generated by DPEs may be pushed to a local trace buffer implemented in PL 310 or to an external RAM using SoC interface block 104 and NoC 308. In another aspect, traces generated by DPEs may be sent to a debugging subsystem implemented on-chip.

In particular embodiments, each core 602 and memory module 604 of each DPE may include an additional stream interface that is capable of outputting trace data directly to stream switch 626. The stream interfaces for trace data may be in addition to those already discussed. Stream switch 626 may be configured to direct trace data onto a packet-switched stream such that trace information from multiple cores and memory modules of different DPEs can travel on a single data stream. As noted, the stream portion of the DPE interconnect network can be configured to send trace data to an on-chip debugging system via PL 310, to external memory via SoC interface block 104, or directly to gigabit transceivers via NoC 308. Examples of different types of trace streams that may be generated include program counter (PC) trace streams that produce the PC value at branch instructions as opposed to each change in the PC and application data trace streams including intermediate results within DPEs (e.g., from cores and/or memory modules via the respective trace data streams).

Figure 9:
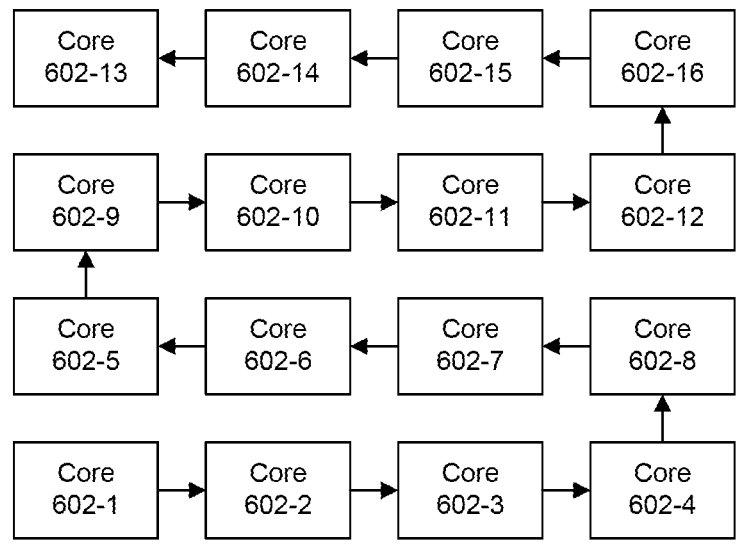
FIG. 9 illustrates example connectivity of cascade interfaces of cores of DPEs.

FIG. 9 illustrates example connectivity of cascade interfaces of cores in a plurality of DPEs. In the example of FIG. 9, only cores 602 of the DPEs are illustrated. The other portions of the DPEs such as the DPE interconnect and the memory module are omitted for purposes of illustration.

As pictured, cores are serially connected by way of the cascade interfaces described in connection with FIG. 8. Core 602-1 is coupled to core 602-2, which couples to core 602-3, which couples to core 602-4. Accordingly, application data is able to propagate directly from core 602-1, to core 602-2, to core 602-3, to core 602-4. Core 602-4 is coupled to core 602-8 in the next row up. Core 602-8 is coupled to core 602-7, which couples to core 602-6, which couples to core 602-5. Accordingly, application data is able to propagate directly from core 602-4, to core 608-8, to core 602-7, to core 602-6, to core 602-5. Core 602-5 couples to core 602-9 in the next row up. Core 602-9 couples to core 602-10, which couples to core 602-11, which couples to core 602-12. Accordingly, application data is able to propagate directly from core 602-5 to core 602-9, to core 602-10, to core 602-11, to core 602-12. Core 602-12 is coupled to core 602-16 in the next row up. Core 602-16 is coupled to core 602-15, which couples to core 602-14, which couples to core 602-13. Accordingly, application data is able to propagate directly from core 602-12, to core 608-16, to core 602-15, to core 602-14, to core 602-13.

FIG. 9 is intended to illustrate how cascade interfaces of cores of DPEs may be coupled from one row of DPEs to another row of DPEs within a DPE array. The particular number of columns and/or rows of cores (e.g., DPEs) shown is not intended as a limitation. FIG. 9 illustrates that connections between cores using cascade interfaces may be made at alternating ends of the rows of DPEs in an "S" or zig-zag pattern.

In embodiments where DPE array 102 implements two or more different clusters of DPEs 304, the first cluster of DPEs may not be coupled to the second cluster of DPEs through the cascade and/or stream interfaces. For example, if the first two rows of DPEs form a first cluster and the second two rows of DPEs form a second cluster, the cascade interface of core 602-5 may be programmed to be disabled so as not to pass data to the cascade input of core 602-9.

In the examples described in connection with FIGS. 8 and 9, each core is illustrated as having a cascade interface that operates as an input and a cascade interface that operates as an output. In one or more other embodiments, the cascade interfaces may be implemented as bidirectional interfaces. In particular embodiments, cores may include additional cascade interfaces so that cores may communicate directly with other cores above, below, to the left, and/or to the right via cascade interfaces. As noted, such interfaces may be unidirectional or bidirectional.

Figure 10A:
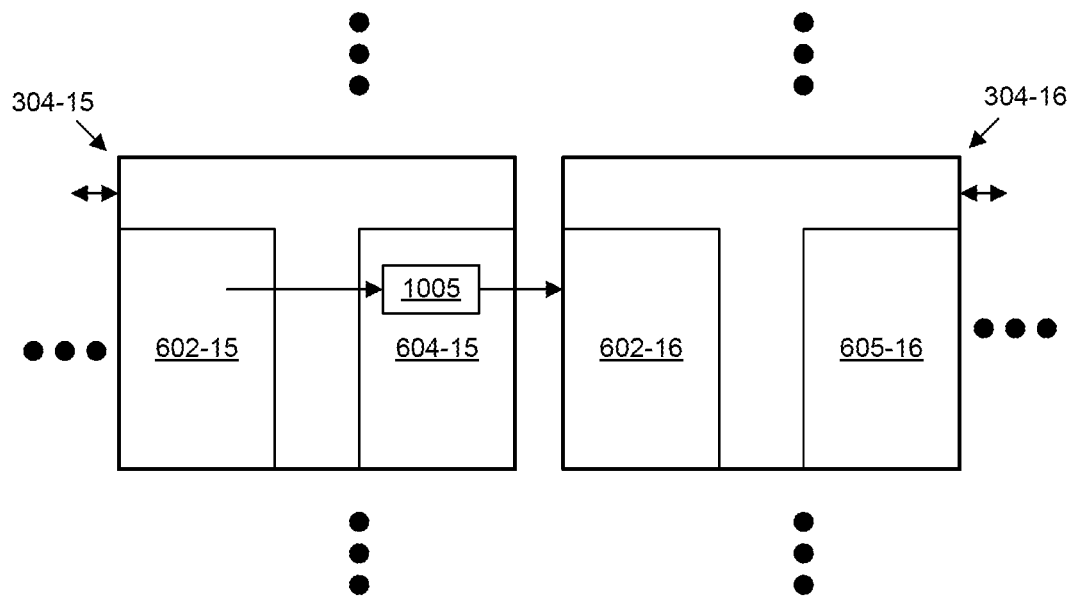
FIGS. 10A, 10B, 10C, 10D, and 10E illustrate examples of connectivity among DPEs.

FIGS. 10A, 10B, 10C, 10D, and 10E illustrate examples of connectivity among DPEs. FIG. 10A illustrates example connectivity among DPEs using shared memory. In the example of FIG. 10A, a function or kernel (e.g., a user circuit design implemented in the DPE and/or DPE array) implemented in core 602-15 operates and places data 1005, e.g., application data, in memory module 604-15 using the core interface and memory interface in DPE 304-15. DPE 304-15 and DPE 304-16 are neighboring DPEs. Accordingly, core 602-16 is capable of accessing data 1005 from memory module 604-15 based upon acquisition of a lock from the hardware synchronization circuitry (not shown) in memory module 604-15 for the buffer including data 1005. Shared access to memory module 604-15 by cores 602-15 and 602-16 facilitates high speed transaction processing since data need not be physically transferred from one memory to another for core 602-16 to operate on the application data.

Figure 10B:
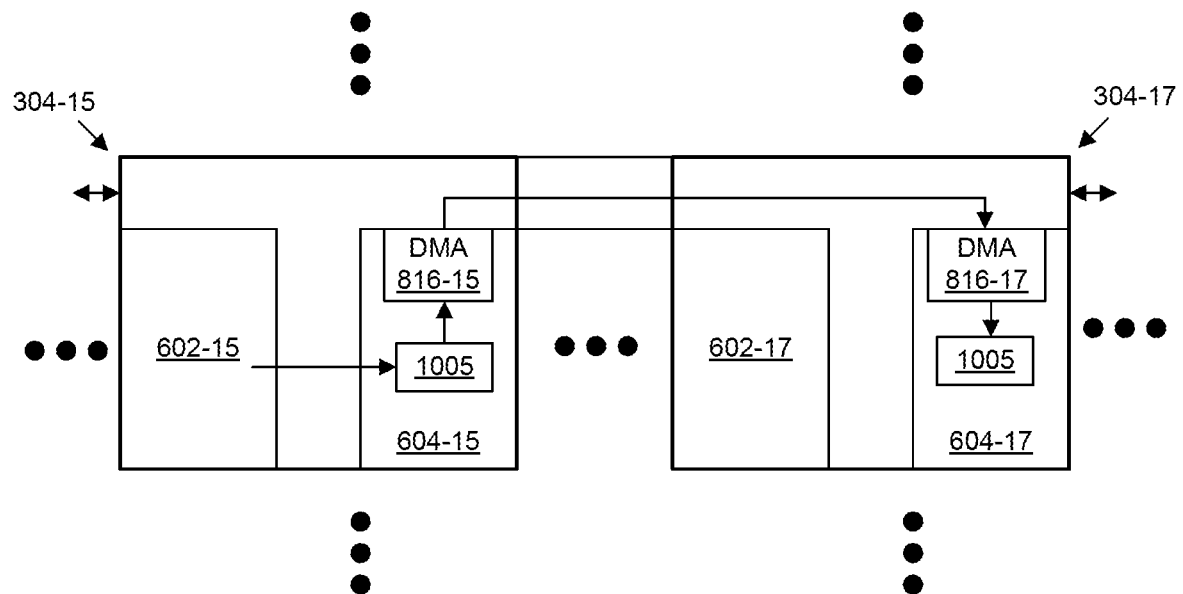

FIG. 10B illustrates example connectivity among DPEs using stream switches. In the example of FIG. 10B, DPE 304-15 and 304-17 are non-neighboring DPEs and, as such, are separated by one or more intervening DPEs. A function or kernel implemented in core 602-15 operates and places data 1005 in memory module 604-15. DMA engine 816-15 of memory module 604-15 retrieves data 1005 based upon acquisition of a lock for the buffer used to store data 1005 within memory module 604-15. DMA engine 816-15 sends data 1005 via the stream switches of the DPE interconnects to DPE 304-17. DMA engine 816-17 within memory module 604-17 is capable of retrieving data 1005 from the stream switch within DPE 304-17 and, after acquiring a lock from hardware synchronization circuitry in memory module 604-17 for a buffer within memory module 604-17, storing data 1005 within the buffer of memory module 604-17. The connectivity illustrated in FIG. 10B may be programmed by loading configuration data to configure the respective stream switches within DPEs 304-15 and 304-17 and DMA engines 816-15 and 816-17 to operate as described.

Figure 10C:
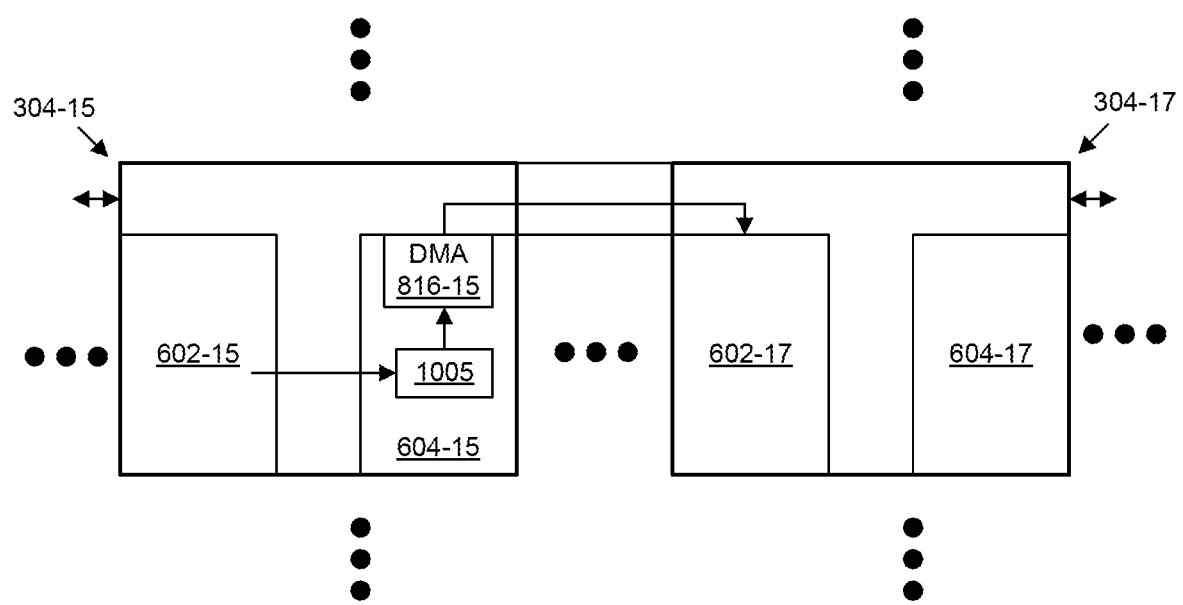

FIG. 10C illustrates another example of connectivity among DPEs using stream switches. In the example of FIG. 10C, DPE 304-15 and 304-17 are non-neighboring DPEs and, as such, are separated by one or more intervening DPEs. FIG. 10C illustrates that data 1005 may be provided from DMA 816-15 via a stream switch directly to a core of another DPE. As pictured, DMA 816-15 places data 1005 on the stream switch of DPE 304-15. Core 602-17 is capable of receiving data 1005 directly from the stream switch in DPE 304-17 using the stream interface included therein without data 1005 traversing into memory module 604-17. The connectivity illustrated in FIG. 10C may be programmed by way of loading configuration data to configure the respective stream switches of DPEs 304-15 and 304-17 and DMA 816-15 to operate as described.

In general, FIG. 10C illustrates an example of a DMA to core transfer of data. It should be appreciated that a core to DMA transfer of data may also be implemented. For example, core 602-17 is capable of sending data via the stream interface included therein and the stream switch of DPE 304-17 to DPE 304-15. DMA engine 816-15 is capable of pulling the data from the stream switch included in DPE 304-15 and storing the data in memory module 604-15.

Figure 10D:
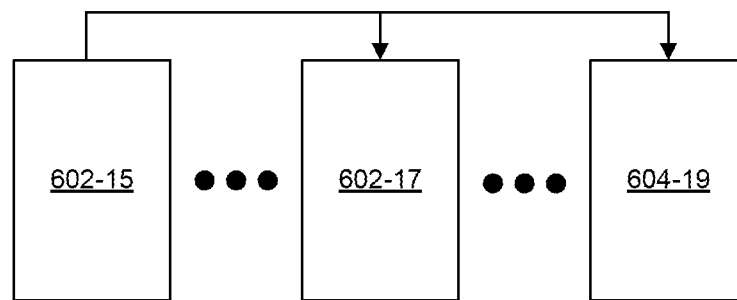

FIG. 10D illustrates another example of connectivity among DPEs using stream switches. Referring to FIG. 10D, cores 602-15, 602-17, and 602-19, each of different, non-neighboring DPEs, are capable of communicating with one another directly via the stream interface of each respective DPE. In the example of FIG. 10D, core 602-15 is capable of broadcasting the same data stream to core 602-17 and to core 602-19. The broadcast functionality of the stream interfaces within each respective DPE including cores 602-15, 602-17, and 602-19 may be programmed by way of loading configuration data to configure the respective stream switches and/or stream interfaces as described. In one or more other embodiments, core 602-15 is capable of multi-casting data to cores of other DPEs.

Figure 10E:
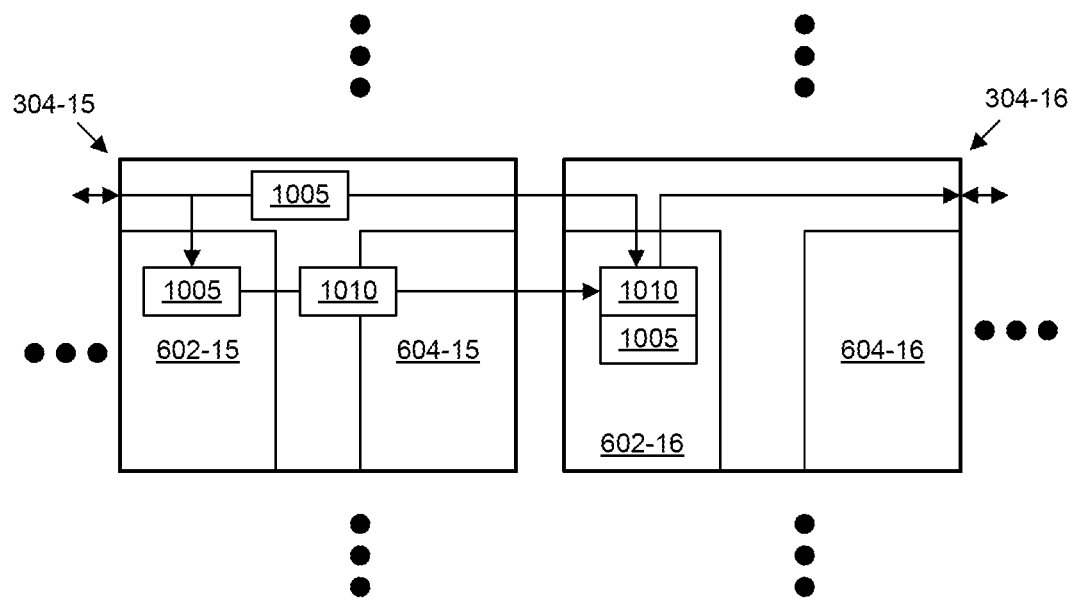

FIG. 10E illustrates an example of connectivity among DPEs using stream switches and cascade interfaces. Referring to FIG. 10E, DPE 304-15 and DPE 304-16 are neighboring DPEs. In some cases, a kernel may be split to run on multiple cores. In that case, the intermediate accumulation result of one sub-kernel may be transferred to the sub-kernel in the next core via the cascade interface.

In the example of FIG. 10E, core 602-15 receives data 1005 via a stream switch and operates on data 1005. Core 602-15 generates intermediate result data 1010 and outputs intermediate result data 1010 from an accumulation register therein through a cascade interface directly to core 602-16. In particular embodiments, the cascade interface of core 602-15 is capable of transferring an accumulator value each clock cycle of DPE 304-15. Data 1005 received by core 602-16 further propagates to core 602-16 via the stream switches in the DPE interconnects allowing core 602-16 to operate on both data 1005 (e.g., the original data) and the intermediate result data 1010 generated by core 602-15.

In the examples of FIG. 10, the sending of data streams, the broadcast of data streams, and/or the multi-cast of data streams is illustrated in the horizontal direction. It should be appreciated that data streams may be sent, broadcast, and/or multi-cast from a DPE to any other DPE in the DPE array. As such, a data stream may be sent, broadcast, or multi-cast to the left, to the right, up, down, and/or to DPEs diagonally as may be required to reach the intended destination DPE(s) based upon the configuration data loaded into each such DPE.

Figure 11:
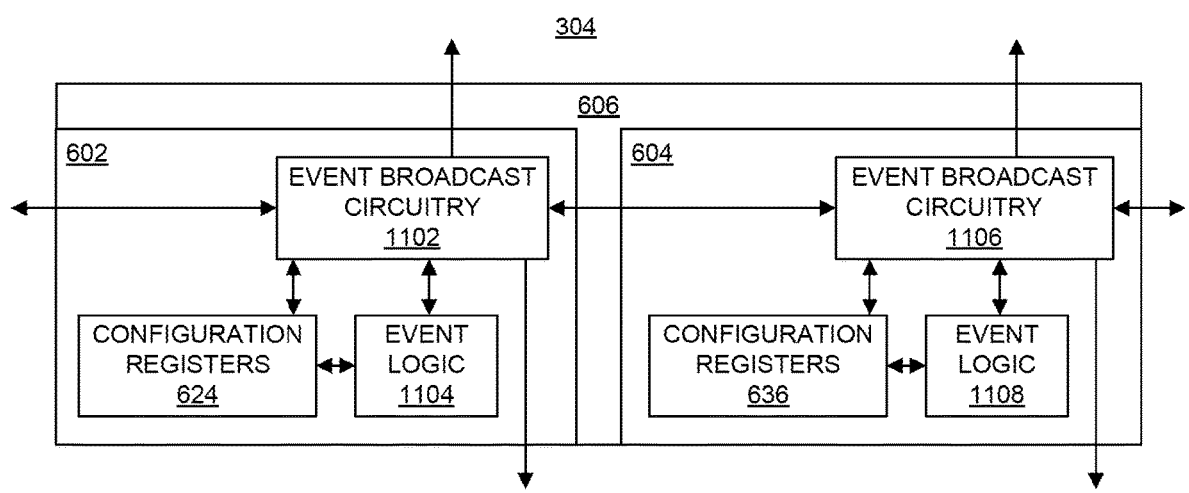
FIG. 11 illustrates an example of event processing circuitry within a DPE.

FIG. 11 illustrates an example of event processing circuitry within a DPE. DPEs may include event processing circuitry that is interconnected to event processing circuitry of other DPEs. In the example of FIG. 11, event processing circuitry is implemented in core 602 and within memory module 604. Core 602 may include event broadcast circuitry 1102 and event logic 1104. Memory module 604 may include separate event processing circuitry including event broadcast circuitry 1106 and event logic 1108.

Event broadcast circuitry 1102 may be connected to the event broadcast circuitry within each of the cores of the neighboring DPEs above and below the example DPE illustrated in FIG. 11. Event broadcast circuitry 1102 may also be connected to the event broadcast circuitry within the memory module of the neighboring DPE to the left of the example DPE illustrated in FIG. 11. As pictured, event broadcast circuitry 1102 is connected to event broadcast circuitry 1106. Event broadcast circuitry 1106 may be connected to the event broadcast circuitry within each of the memory modules of the neighboring DPEs above and below the example DPE illustrated in FIG. 11. Event broadcast circuitry 1106 may also be connected to the event broadcast circuitry within the core of the neighboring DPE to the right of the example DPE illustrated in FIG. 11.

In this manner, the event processing circuitry of the DPEs may form an independent event broadcast network within a DPE array. The event broadcast network within the DPE array may exist independently of the DPE interconnect network. Further, the event broadcast network may be individually configurable by loading suitable configuration data into configuration registers 624 and/or 636.

In the example of FIG. 11, event broadcast circuitry 1102 and event logic 1104 may be configured by configuration registers 624. Event broadcast circuitry 1106 and event logic 1108 may be configured by configuration registers 636. Configuration registers 624 and 636 may be written via memory mapped switches of DPE interconnect 606. In the example of FIG. 11, configuration registers 624 program event logic 1104 to detect particular types of events that occur within core 602. The configuration data loaded into configuration registers 624, for example, determines which of a plurality of different types of predetermined events are detected by event logic 1104. Examples of events may include, but are not limited to, starts and/or ends of read operations by core 602, starts and/or ends of write operations by core 602, stalls, and the occurrence of other operations performed by core 602. Similarly, configuration registers 636 program event logic 1108 to detect particular types of events that occur within memory module 604. Examples of events may include, but are not limited to, starts and/or ends of read operations by DMA engine 816, starts and/or ends of write operations by DMA engine 816, stalls, and the occurrence of other operations performed by memory module 604. The configuration data loaded into configuration registers 636, for example, determines which of a plurality of different types of predetermined events are detected by event logic 1108. It should be appreciated that event logic 1104 and/or event logic 1108 are capable of detecting events originating from and/or relating to DMA engine 816, memory mapped switch 632, stream switch 626, memory interfaces of memory module 604, core interfaces of core 602, cascade interfaces of core 602, and/or other components located in DPEs.

Configuration registers 624 further are capable of programming event broadcast circuitry 1102, while configuration registers 636 are capable of programming event broadcast circuitry 1106. For example, the configuration data loaded into configuration registers 624 may determine which of the events received by event broadcast circuitry 1102 from other event broadcast circuitries are propagated to yet other event broadcast circuitries and/or to SoC interface block 104. The configuration data may also specify which events generated internally by event logic 1104 are propagated to other event broadcast circuitries and/or to SoC interface block 104.

Similarly, the configuration data loaded into configuration registers 636 may determine which of the events received by event broadcast circuitry 1106 from other event broadcast circuitries are propagated to yet other event broadcast circuitries and/or to SoC interface block 104. The configuration data may also specify which events generated internally by event logic 1108 are propagated to other event broadcast circuitries and/or to SoC interface block 104.

Accordingly, events generated by event logic 1104 may be provided to event broadcast circuitry 1102 and may be broadcast to other DPEs. In the example of FIG. 11, event broadcast circuitry 1102 is capable of broadcasting events, whether internally generated or received from other DPEs, to the DPE above, to the DPE to the left, and to the DPE or SoC interface block 104 below. Event broadcast circuitry 1102 is also capable of broadcasting events to event broadcast circuitry 1106 within memory module 604.

Events generated by event logic 1108 may be provided to event broadcast circuitry 1106 and may be broadcast to other DPEs. In the example of FIG. 11, event broadcast circuitry 1106 is capable of broadcasting events, whether internally generated or received from other DPEs, to the DPE above, to the DPE to the right, and to the DPE or SoC interface block 104 below. Event broadcast circuitry 1106 is also capable of broadcasting events to event broadcast circuitry 1102 within core 602.

In the example of FIG. 11, event broadcast circuitries located in cores communicate vertically with event broadcast circuitries located in cores of neighboring DPEs above and/or below. In the case where a DPE is immediately above (or adjacent) SoC interface block 104, the event broadcast circuitry in the core of that DPE is capable of communicating with SoC interface block 104. Similarly, event broadcast circuitry located in memory modules communicate vertically with event broadcast circuitry located in memory modules of neighboring DPEs above and/or below. In the case where a DPE is immediately above (e.g., adjacent) SoC interface block 104, the event broadcast circuitry in the memory module of that DPE is capable of communicating with SoC interface block 104. Event broadcast circuitry is further capable of communicating with the event broadcast circuitry immediately to the left and/or to the right regardless of whether such event broadcast circuitry is located in another DPE and/or within a core or a memory module.

Once configuration registers 624 and 636 are written, event logic 1104 and 1108 is capable of operating in the background. In particular embodiments, event logic 1104 generates events only in response to detecting particular conditions within core 602; and, event logic 1108 generates events only in response to detecting particular conditions within memory module 604.

Figure 12:
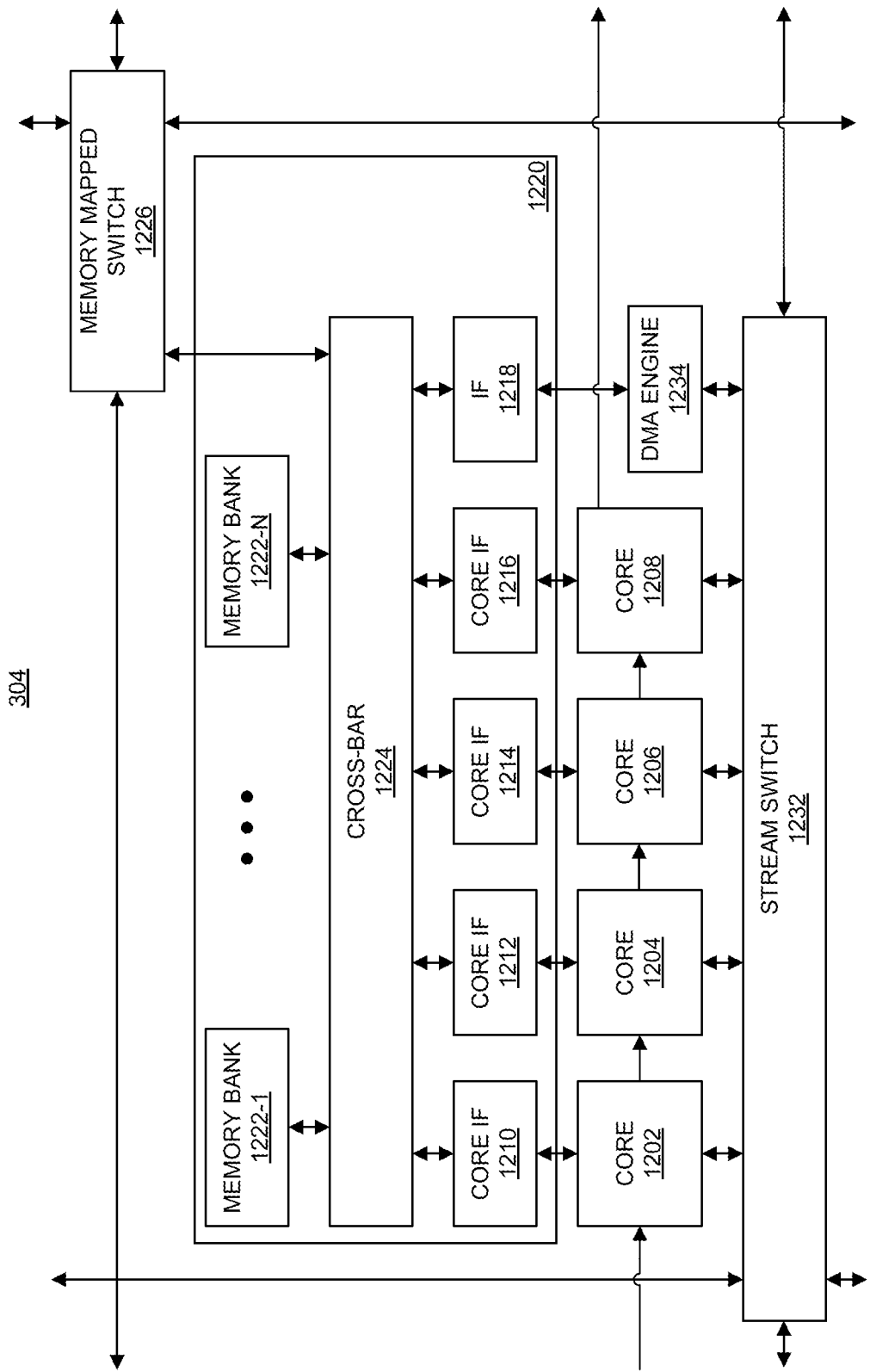
FIG. 12 illustrates another example architecture for a DPE.

FIG. 12 illustrates another example architecture for a DPE 304. In the example of FIG. 12, DPE 304 includes a plurality of different cores and may be referred to as a "cluster" type of DPE architecture. In FIG. 12, DPE 304 includes cores 1202, 1204, 1206, and 1208. Each of cores 1202-1208 is coupled to a memory pool 1220 through a core interface 1210, 1212, 1214, and 1216 (abbreviated as "core IF" in FIG. 12) respectively. Each of core interfaces 1210-1216 couples to a plurality of memory banks 1222-1 through 1222-N through a crossbar 1224. Through crossbar 1224, any one of cores 1202-1208 is capable of accessing any one of memory banks 1222-1 through 1222-N. As such, within the example architecture of FIG. 12, cores 1202-1208 are capable of communicating with one another via shared memory banks 1222 of memory pool 1220.

In one or more embodiments, memory pool 1220 may include 32 memory banks. The number of memory banks included in memory pool 1220 is provided for purposes of illustration and not limitation. In other embodiments, the number of memory banks included in memory pool 1220 may be more than 32 or less than 32.

In the example of FIG. 12, DPE 304 includes a memory mapped switch 1226. Memory mapped switch 1226 includes a plurality of memory mapped interfaces (not shown) capable of coupling to memory mapped switches within neighboring DPEs in each cardinal direction (e.g., North, South, West, and East) and to memory pool 1220. Each memory mapped interface may include one or more masters and one or more slaves. For example, memory mapped switch 1226 is coupled to crossbar 1224 through a memory mapped interface. Memory mapped switch 1226 is capable of conveying configuration, control, and debugging data as described in connection with other example DPEs within this disclosure. As such, memory mapped switch 1226 is capable of loading configuration registers (not shown) in DPE 304. In the example of FIG. 12, DPE 304 may include configuration registers for controlling operation of stream switch 1232, cores 1202-1208, and DMA engine 1234.

In the example of FIG. 12, memory mapped switch 1226 is capable of communicating in each of the four cardinal directions. In other embodiments, memory mapped switch 1226 is capable of communicating in only the North and South directions. In other embodiments, memory mapped switch 1226 may include additional memory mapped interfaces that allow memory mapped switch 1226 to communicate with more than four other entities thereby allowing communications with other DPEs in diagonal directions and/or other non-neighboring DPEs.

DPE 304 also includes a stream switch 1232. Stream switch 1232 includes a plurality of stream interfaces (not shown) capable of coupling to stream switches in neighboring DPEs in each cardinal direction (E.g., North, South, West, and East) and to cores 1202-1208. Each stream interface may include one or more masters and one or more slaves. Stream switch 1232 further includes a stream interface coupled to a DMA engine 1234.

DMA engine 1234 is coupled to crossbar 1224 through an interface 1218. DMA engine 1234 may include two interfaces. For example, DMA engine 1234 may include a memory-to-stream interface capable of reading data from one or more of memory banks 1222 and sending the data on stream switch 1232. DMA engine 1234 may also include a stream-to-memory interface capable of receiving data via stream switch 1232 and storing the data within one or more of memory banks 1222. Each of the interfaces, whether memory-to-stream or stream-to-memory, may support one input/output stream or multiple concurrent input/output streams.

The example architecture of FIG. 12 supports inter-DPE communication via both memory mapped switch 1226 and stream switch 1232. As pictured, memory mapped switch 1226 is capable of communicating with the memory mapped switch of the neighboring DPE above, below, to the left, and to the right. Similarly, stream switch 1232 is capable of communicating with the stream switch of the neighboring DPE above, below, to the left, and to the right.

In one or more embodiments, both memory mapped switch 1226 and stream switch 1232 are capable of supporting data transfers between cores of other DPEs (both neighboring and non-neighboring) to share application data. Memory mapped switch 1226 is further capable of supporting transfer of configuration, control, and debugging data for purposes of configuring DPE 304. In particular embodiments, stream switch 1232 supports the transfer of application data while memory mapped switch 1226 supports only the transfer of configuration, control, and debugging data.

In the example of FIG. 12, cores 1202-1208 are serially connected via cascade interfaces as previously described. Further, core 1202 is coupled to the cascade interface (e.g., output) of the right-most core in the neighboring DPE to the left of the DPE of FIG. 12, while core 1208 is coupled to the cascade interface (e.g., input) of the left-most core in the neighboring DPE to the right of the DPE of FIG. 12. Cascade interfaces of DPEs using a cluster architecture may be connected from row to row as illustrated in FIG. 9. In one or more other embodiments, one or more of cores 1202-1208 may be connected, via cascade interfaces, to cores in neighboring DPEs above and/or below in lieu of horizontal cascaded connections and/or in addition to horizontal cascaded connections.

The example architecture of FIG. 12 may be used to implement DPEs and form a DPE array as described herein. The example architecture of FIG. 12 makes an increased amount of memory available to the cores compared to the other example DPE architectures described within this disclosure. Thus, for applications where cores require access to larger amounts of memory, the architecture of FIG. 12, which clusters multiple cores together within a single DPE, may be used. For purposes of illustration, depending upon the configuration of DPE 304 of FIG. 12, not all cores need be used. Thus, one or more (e.g., fewer than all cores 1202-1208 of DPE 304) may access memory pool 1220 and have access to a larger amount of memory than would otherwise be the case based upon the configuration data loaded into configuration registers (not shown) in the example of FIG. 12.

Figure 13:
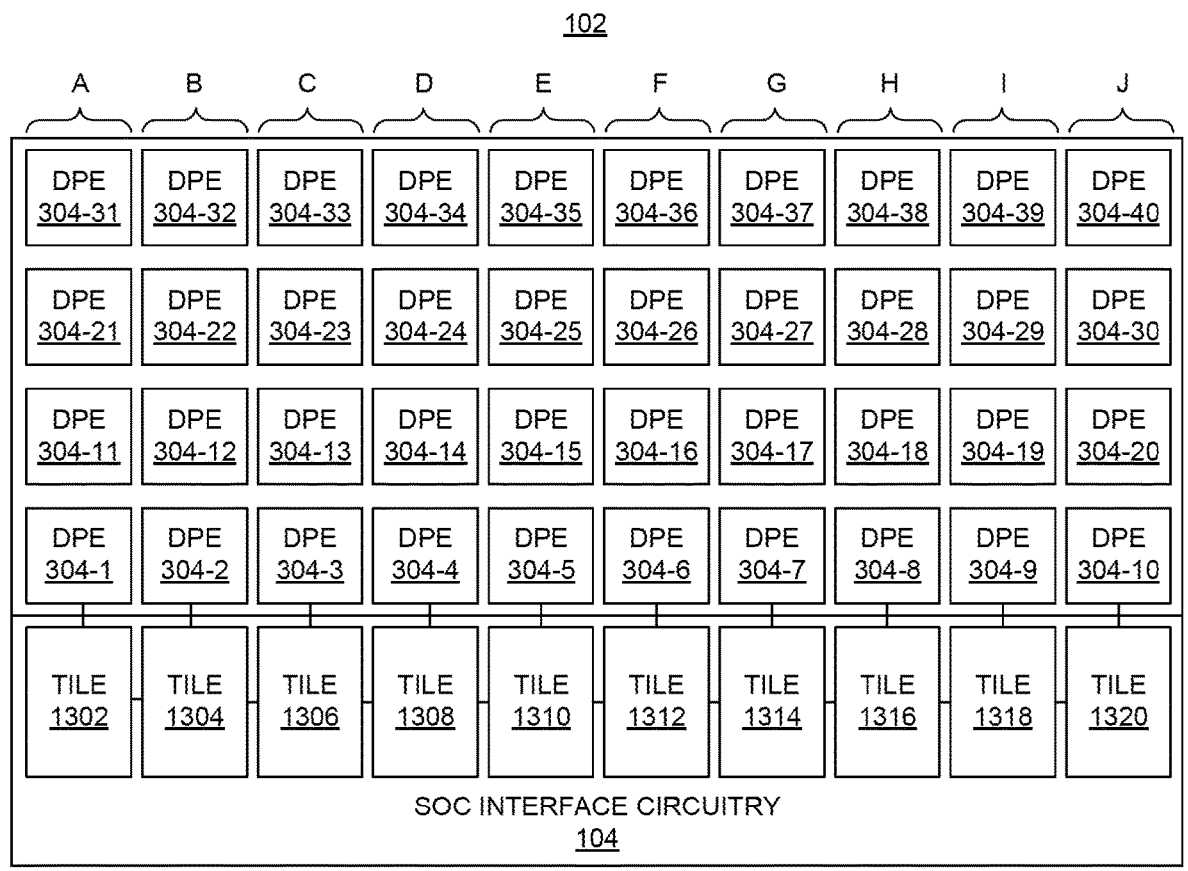
FIG. 13 illustrates an example architecture for a DPE array.

FIG. 13 illustrates an example architecture for DPE array 102 of FIG. 1. In the example of FIG. 13, SoC interface block 104 provides an interface between DPEs 304 and other subsystems of device 100. SoC interface block 104 integrates DPEs into the device. SoC interface block 104 is capable of conveying configuration data to DPEs 304, conveying events from DPEs 304 to other subsystems, conveying events from other subsystems to DPEs 304, generating and conveying interrupts to entities external to DPE array 102, conveying application data between other subsystems and DPEs 304, and/or conveying trace and/or debug data between other subsystems and DPEs 304.

In the example of FIG. 13, SoC interface block 104 includes a plurality of interconnected tiles. For example, SoC interface block 104 includes tiles 1302, 1304, 1306, 1308, 1310, 1312, 1314, 1316, 1318, and 1320. In the example of FIG. 13, tiles 1302-1320 are organized in a row. In other embodiments, tiles may be arranged in a column, in a grid, or in another layout. For example, SoC interface block 104 may be implemented as a column of tiles on the left of DPEs 304, on the right of DPEs 304, between columns of DPEs 304, or the like. In another embodiment, SoC interface block 104 may be located above DPE array 102. SoC interface block 104 may be implemented so that tiles are located in any combination of below DPE array 102, to the left of DPE array 102, to the right of DPE array 102, and/or above DPE array 102. In this regard, FIG. 13 is provided for purposes of illustration and not limitation.

In one or more embodiments, tiles 1302-1320 have a same architecture. In one or more other embodiments, tiles 1302-1320 may be implemented with two or more different architectures. In particular embodiments, different architectures may be used to implement tiles within SoC interface block 104 where each different tile architecture supports communication with a different type of subsystem or combination of subsystems of device 100.

In the example of FIG. 13, tiles 1302-1320 are coupled so that data may be propagated from one tile to another. For example, data may be propagated from tile 1302 through tiles 1304, 1306, and on down the line of tiles to tile 1320. Similarly, data may be propagated in the reverse direction from tile 1320 to tile 1302. In one or more embodiments, each of tiles 1302-1320 is capable of operating as an interface for a plurality of DPEs. For example, each of tiles 1302-1320 is capable of operating as an interface for a subset of the DPEs 304 of DPE array 102. The subset of DPEs to which each tile provides an interface may be mutually exclusive such that no DPE is provided with an interface by more than one tile of SoC interface block 104.

In one example, each of tiles 1302-1320 provides an interface for a column of DPEs 304. For purposes of illustration, tile 1302 provides an interface to the DPEs of column A. Tile 1304 provides an interface to the DPEs of column B, etc. In each case, the tile includes a direct connection to an adjacent DPE in the column of DPEs, which is the bottom DPE in this example. Referring to column A, for example, tile 1302 is directly connected to DPE 304-1. Other DPEs within column A may communicate with tile 1302 but do so through the DPE interconnects of the intervening DPEs in the same column.

For example, tile 1302 is capable of receiving data from another source such as PS 312, PL 310, and/or another hardwired circuit block, e.g., an ASIC block. Tile 1302 is capable of providing those portions of the data addressed to DPEs in column A to such DPEs while sending data addressed to DPEs in other columns (e.g., DPEs for which tile 1302 is not an interface) on to tile 1304. Tile 1304 may perform the same or similar processing where data received from tile 1302 that is addressed to DPEs in column B is provided to such DPEs, while sending data addressed to DPEs in other columns on to tile 1306, and so on.

In this manner, data may propagate from tile to tile of SoC interface block 104 until reaching the tile that operates as an interface for the DPEs to which the data is addressed (e.g., the "target DPE(s)"). The tile that operates as an interface for the target DPE(s) is capable of directing the data to the target DPE(s) using the memory mapped switches of the DPEs and/or the stream switches of the DPEs.

As noted, the use of columns is an example implementation. In other embodiments, each tile of SoC interface block 104 is capable of providing an interface to a row of DPEs of DPE array 102. Such a configuration may be used in cases where SoC interface block 104 is implemented as a column of tiles, whether on the left, right, or between columns of DPEs 304. In other embodiments, the subset of DPEs to which each tile provides an interface may be any combination of fewer than all DPEs of DPE array 102. For example, DPEs 304 may be apportioned to tiles of SoC interface block 104. The particular physical layout of such DPEs may vary based upon connectivity of the DPEs as established by DPE interconnects. For example, tile 1302 may provide an interface to DPEs 304-1, 304-2, 304-11, and 304-12. Another tile of SoC interface block 104 may provide an interface to four other DPEs, and so forth.

Figure 14A:
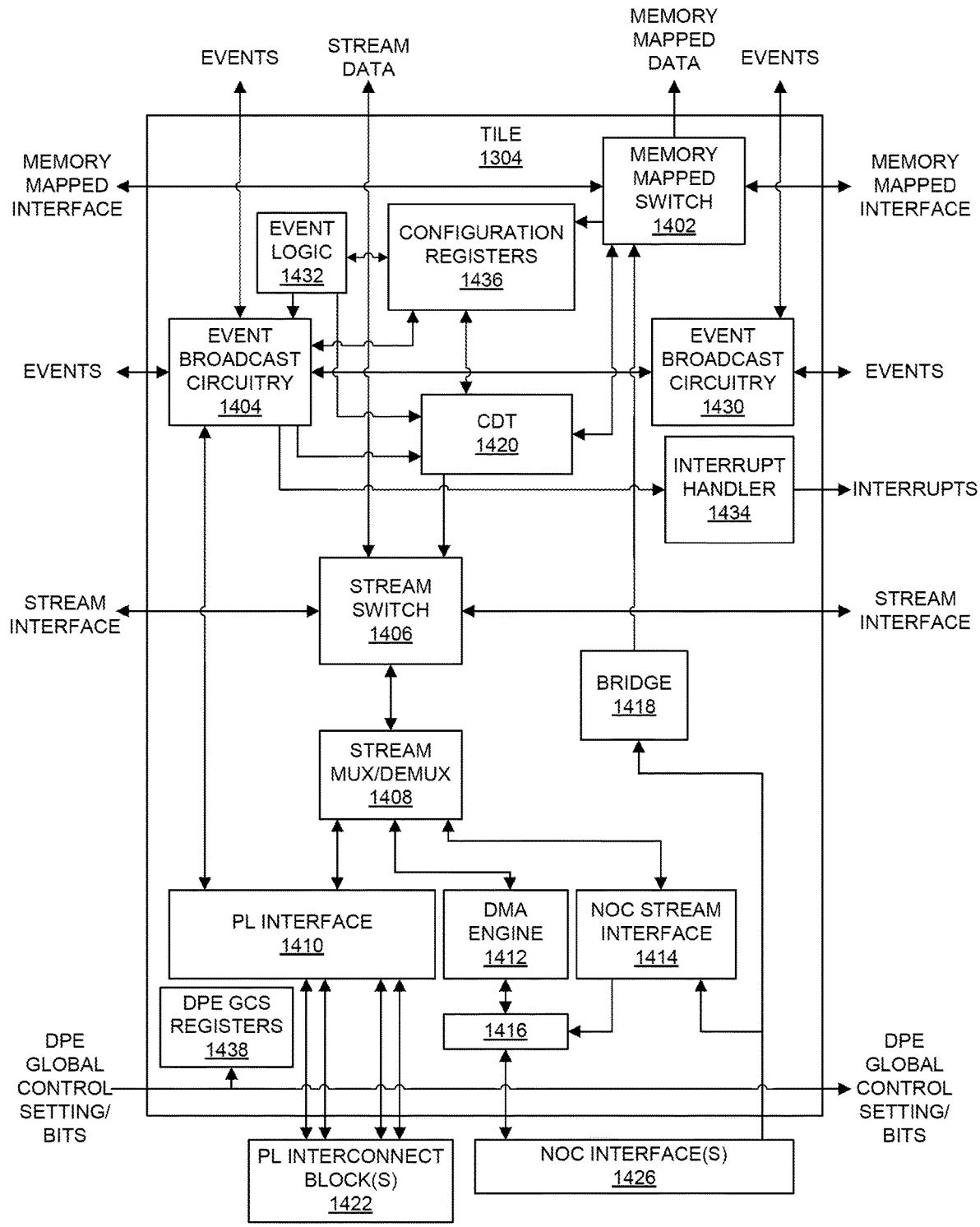
FIGS. 14A, 14B, and 14C illustrate example architectures for implementing tiles of a System-on-Chip (SoC) interface block.
Figure 14B:
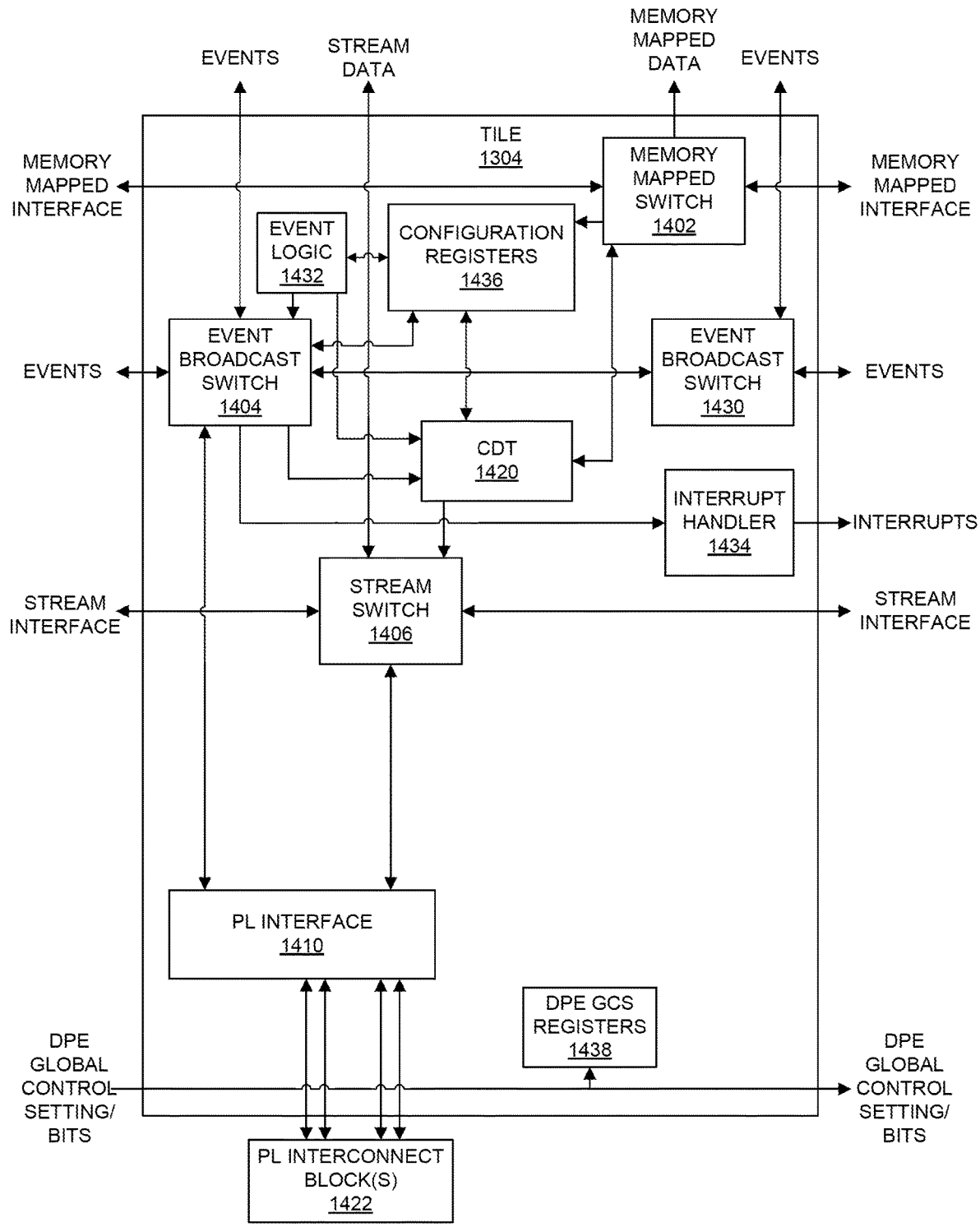
Figure 14C:
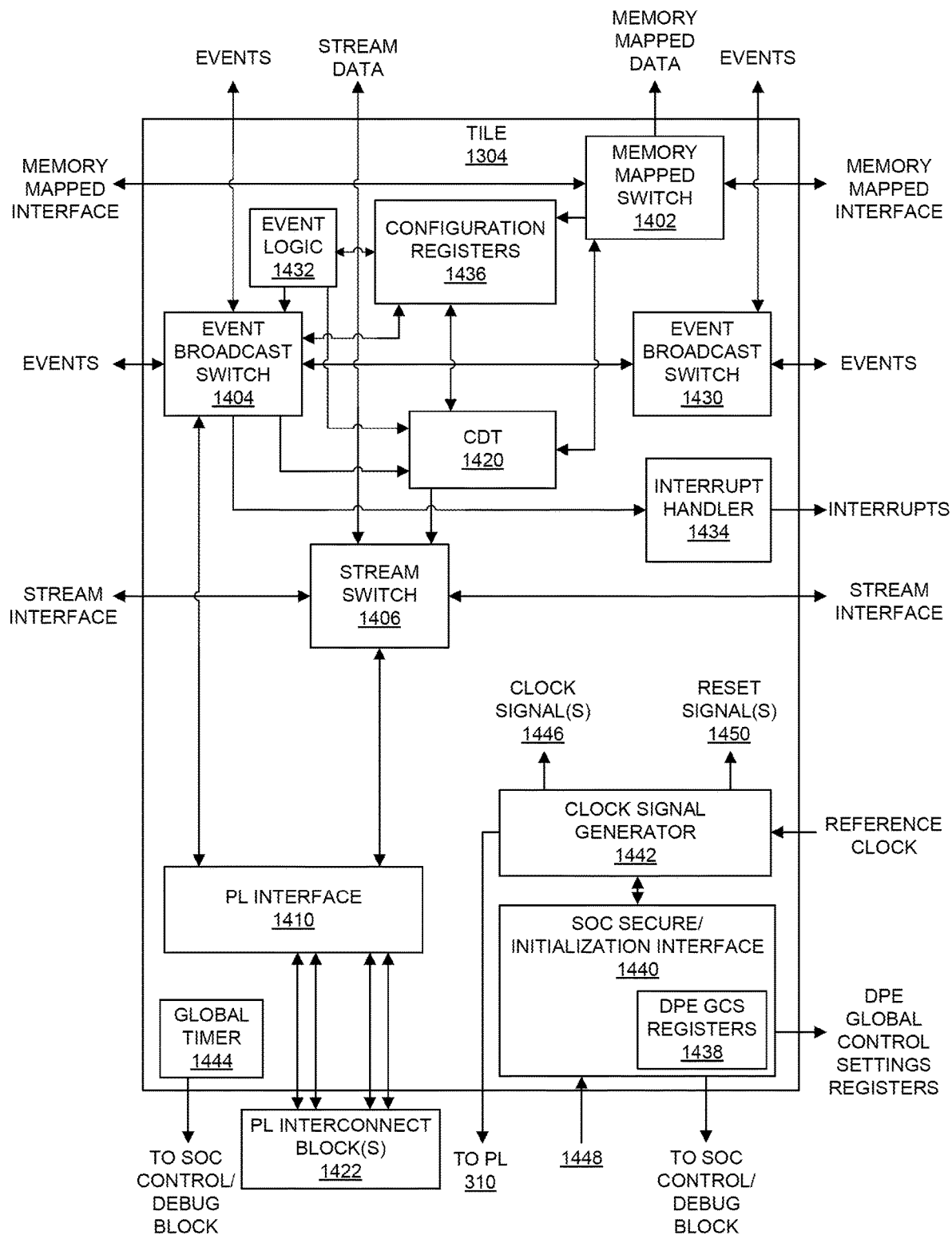

FIGS. 14A, 14B, and 14C illustrate example architectures for implementing tiles of SoC interface block 104. FIG. 14A illustrates an example implementation of tile 1304. The architecture illustrated in FIG. 14A may also be used to implement any of the other tiles included in SoC interface block 104.

Tile 1304 includes a memory mapped switch 1402. Memory mapped switch 1402 may include a plurality of memory mapped interfaces for communicating in each of a plurality of different directions. As an illustrative and non-limiting example, memory mapped switch 1402 may include one or more memory mapped interfaces where a memory mapped interface has a master that connects vertically to the memory mapped interface of the DPE immediately above. As such, memory mapped switch 1402 is capable of operating as a master to the memory mapped interfaces of one or more of the DPEs. In a particular example, memory mapped switch 1402 may operate as a master for a subset of DPEs. For example, memory mapped switch 1402 may operate as a master for the column of DPEs above tile 1304, e.g., column B of FIG. 13. It should be appreciated that memory mapped switch 1402 may include additional memory mapped interfaces to connect to a plurality of different circuits (e.g., DPEs) within DPE array 102. The memory mapped interfaces of memory mapped switch 1402 may also include one or more slaves capable of communicating with circuitry (e.g., one or more DPE(s)) located above tile 1304.

In the example of FIG. 14A, memory mapped switch 1402 may include one or more memory mapped interfaces that facilitate communication in the horizontal direction to memory mapped switches in neighboring tiles (e.g., tiles 1302 and 1306). For purposes of illustration, memory mapped switch 1402 may be connected to neighboring tiles in the horizontal direction via memory mapped interfaces, where each such memory mapped interface includes one or more masters and/or one or more slaves. Accordingly, memory mapped switch 1402 is capable of moving data (e.g., configuration, control, and/or debug data) from one tile to another to reach a correct DPE and/or subset of a plurality of DPEs and direct the data to the target DPEs, whether such DPEs are in the column above tile 1304 or in another subset for which another tile of SoC interface block 104 operates as an interface. If memory mapped transactions are received from NoC 308, for example, memory mapped switch 1402 is capable of distributing the transaction(s) horizontally, e.g., to other tiles within SoC interface block 104.

Memory mapped switch 1402 may also include a memory mapped interface having one or more masters and/or slaves coupled to configuration registers 1436 within tile 1304. Through memory mapped switch 1402, configuration data may be loaded into configuration registers 1436 to control various functions and operations performed by components within tile 1304. FIGS. 14A, 14B, and 14C illustrate connections between configuration registers 1436 and one or more elements of tile 1304. It should be appreciated, however, that configuration registers 1436 may control other elements of tile 1304 and, as such, have connections to such other elements though such connections are not illustrated in FIGS. 14A, 14B, and/or 14C.

Memory mapped switch 1402 may include a memory mapped interface coupled to NoC interface(s) 1426 via bridge 1418. The memory mapped interface may include one or more masters and/or slaves. Bridge 1418 is capable of converting memory mapped data transfers from NoC 308 (e.g., configuration, control, and/or debug data) into memory mapped data that may be received by memory mapped switch 1402.

Tile 1304 may also include event processing circuitry. For example, tile 1304 includes event logic 1432. Event logic 1432 may be configured by configuration registers 1436. In the example of FIG. 14A, event logic 1432 is coupled to Control, debug, and trace (CDT) circuit 1420. The configuration data loaded into configuration registers 1436 defines the particular events that may be detected locally within tile 1304. Event logic 1432 is capable of detecting a variety of different events, per configuration registers 1436, originating from and/or relating to, DMA engine 1412, memory mapped switch 1402, stream switch 1406, first-in-first-out (FIFO) memories located within PL interface 1410, and/or NoC stream interface 1414. Examples of events may include, but are not limited to, DMA finished transfer, lock being released, lock being acquired, end of PL transfer, or other events relating to the start or end of data flow through tile 1304. Event logic 1432 may provide such events to event broadcast circuitry 1404 and/or to CDT circuit 1420. For example, in another embodiment, event logic 1432 may not have a direct connection to CDT circuit 1420, but rather connect to CDT circuit 1420 via event broadcast circuitry 1404.

Tile 1304 includes event broadcast circuitry 1404 and event broadcast circuitry 1430. Each of event broadcast circuitry 1404 and event broadcast circuitry 1430 provide an interface between the event broadcast network of DPE array 102, other tiles of SoC interface block 104, and PL 310 of device 100. Event broadcast circuitry 1404 is coupled to event broadcast circuitry in adjacent or neighboring tile 1302 and to event broadcast circuitry 1430. Event broadcast circuitry 1430 is coupled to event broadcast circuitry in adjacent or neighboring tile 1306. In one or more other embodiments, where tiles of SoC interface block 104 are arranged in a grid or array, event broadcast circuitry 1404 and/or event broadcast circuitry 1430 may be connected to event broadcast circuitry located in other tiles above and/or below tile 1304.

In the example of FIG. 14A, event broadcast circuitry 1404 is coupled to the event broadcast circuitry in the core of the DPE immediately adjacent to tile 1304, e.g., DPE 304-2 immediately above tile 1304 in column B. Event broadcast circuitry 1404 is also coupled to PL interface 1410. Event broadcast circuitry 1430 is coupled to the event broadcast circuitry in the memory module of the DPE immediately adjacent tile 1304, e.g., DPE 304-2 immediately above tile 1304 in column B. Though not illustrated, in another embodiment, event broadcast circuitry 1430 may also be coupled to PL interface 1410.

Event broadcast circuitry 1404 and event broadcast circuitry 1430 are capable of sending events generated internally by event logic 1432, events received from other tiles of SoC interface block 104, and/or events received from DPEs in column B (or other DPEs of DPE array 102) on to other tiles. Event broadcast circuitry 1404 is further capable of sending such events to PL 310 via PL interface 1410. In another example, events may be sent from event broadcast circuitry 1404 to other blocks and/or subsystems in device 100 such as an ASIC and/or PL circuit blocks located outside of DPE array 102 using PL interface block 1410. Further, PL interface 1410 may receive events from PL 310 and provide such events to event broadcast switch 1404 and/or stream switch 1406. In an aspect, event broadcast circuitry 1404 is capable of sending any events received from PL 310 via PL interface 1410 to other tiles of SoC interface block 104 and/or to DPEs in column B and/or other DPEs of DPE array 102. In another example, events received from PL 310 may be sent from event broadcast circuitry 1404 to other blocks and/or subsystems in device 100 such as an ASIC. Because events may be broadcast among the tiles in SoC interface block 104, events may reach any DPE in DPE array 102 by traversing through tiles in SoC interface block 104 and the event broadcast circuitry to the target (e.g., intended) DPEs. For example, the event broadcast circuitry in the tile of SoC interface block 104 beneath the column (or subset) of DPEs managed by the tile including a target DPE may propagate the events to the target DPEs.

In the example of FIG. 14A, event broadcast circuitry 1404 and event logic 1432 are coupled to CDT circuit 1420. Event broadcast circuitry 1404 and event logic 1432 are capable of sending events to CDT circuit 1420. CDT circuit 1420 is capable of packetizing the received events and sending the events from event broadcast circuitry 1404 and/or event logic 1432 to stream switch 1406. In particular embodiments, event broadcast circuitry 1430 may be connected to stream switch 1406 and/or to CDT circuit 1420 as well.

In one or more embodiments, event broadcast circuitry 1404 and event broadcast circuitry 1430 are capable of gathering broadcast events from one or more or all directions as illustrated in FIG. 14A (e.g., via any of the connections shown in FIG. 14A). In particular embodiments, event broadcast circuitry 1404 and/or event broadcast circuitry 1430 are capable of performing a logical "OR" of the signals and forwarding the results in one or more or all directions (e.g., including to CDT circuit 1420). Each output from event broadcast circuitry 1404 and event broadcast circuitry 1430 may include a bitmask that is configurable by configuration data loaded into configuration registers 1436. The bitmask determines which events are broadcast in each direction on an individual basis. Such bitmasks, for example, may eliminate unwanted or duplicative propagation of events.

Interrupt handler 1434 is coupled to event broadcast circuitry 1404 and is capable of receiving events that are broadcast from event broadcast circuitry 1404. In one or more embodiments, interrupt handler 1434 may be configured by configuration data loaded into configuration registers 1436 to generate interrupts in response to selected events and/or combinations of events from event broadcast circuitry 1404 (e.g., DPE generated events, events generated within tile 1304, and/or PL 310 generated events). Interrupt handler 1434 is capable of generating interrupts, based upon the configuration data, to PS 312 and/or to other device-level management blocks within device 100. As such, interrupt handler 1434 is capable of informing PS 312 and/or such other device-level management blocks of events occurring in DPE array 102, of events occurring in tiles of SoC interface block 104, and/or of events occurring in PL 310 based upon the interrupt(s) that are generated by interrupt handler 1434.

In particular embodiments, interrupt handler 1434 may be coupled to an interrupt handler or an interrupt port of PS 312 and/or of other device-level management blocks by a direct connection. In one or more other embodiments, interrupt handler 1434 may be coupled to PS 312 and/or other device-level management blocks by another interface.

PL interface 1410 couples to PL 310 of device 100 and provides an interface thereto. In one or more embodiments, PL interface 1410 provides an asynchronous clock-domain crossing between the DPE array clock(s) and the PL clock. PL interface 1410 may also provide level shifters and/or isolation cells for integration with PL power rails. In particular embodiments, PL interface 1410 may be configured to provide 32-bit, 64-bit, and/or a 128-bit interface with FIFO support to handle back-pressure. The particular width of PL interface 1410 may be controlled by configuration data loaded into configuration registers 1436. In the example of FIG. 14A, PL interface 1410 couples directly to one or more PL interconnect blocks 1422. In particular embodiments, PL interconnect blocks 1422 are implemented as hardwired circuit blocks that couple to interconnect circuitry located in PL 310.

In one or more other embodiments, PL interface 1410 is coupled to other types of circuit blocks and/or subsystems. For example, PL interface 1410 may be coupled to an ASIC, analog/mixed signal circuitry, and/or other subsystem. As such, PL interface 1410 is capable of transferring data between tile 1304 and such other subsystems and/or blocks.

In the example of FIG. 14A, tile 1304 includes a stream switch 1406. Stream switch 1406 is coupled to a stream switch in adjacent or neighboring tile 1302 and to a stream switch in adjacent or neighboring tile 1306 through one or more stream interfaces. Each stream interface may include one or more masters and/or one or more slaves. In particular embodiments, each pair of neighboring stream switches is capable of exchanging data via one or more streams in each direction. Stream switch 1406 is also coupled to the stream switch in the DPE immediately above tile 1304 in column B, i.e., DPE 304-2, by one or more stream interfaces. As discussed, a stream interface may include one or more stream slaves and/or stream masters. Stream switch 1406 is also coupled to PL interface 1410, DMA engine 1412, and/or to NoC stream interface 1414 via stream multiplexer/demultiplexer 1408 (abbreviated as stream mux/demux in FIG. 14A). Steam switch 1406, for example, may include one or more stream interfaces used to communicate with each of PL interface 1410, DMA engine 1412, and/or NoC stream interface 1414 through stream multiplexer/demultiplexer 1408.

In one or more other embodiments, stream switch 1406 may be coupled to other circuit blocks in other directions and/or in diagonal directions depending upon the number of stream interfaces included and/or the arrangement of tiles and/or DPEs and/or other circuit blocks around tile 1304.

In one or more embodiments, stream switch 1406 is configurable by configuration data loaded into configuration registers 1436. Stream switch 1406, for example, may be configured to support packet-switched and/or circuit-switched operation based upon the configuration data. Further, the configuration data defines the particular DPE and/or DPEs within DPE array 102 to which stream switch 1406 communicates. In one or more embodiments, the configuration data defines the particular DPE and/or subset of DPEs (e.g., DPEs within column B) of DPE array 102 to which stream switch 1406 communicates.

Stream multiplexer/demultiplexer 1408 is capable of directing data received from PL interface 1410, DMA engine 1412, and/or NoC stream interface 1414 to stream switch 1406. Similarly, stream multiplexer/demultiplexer 1408 is capable of directing data received from stream switch 1406 to PL interface 1410, DMA engine 1412, and/or to NoC stream interface 1414. For example, stream multiplexer/demultiplexer 1408 may be programmed by configuration data stored in configuration registers 1436 to route selected data to PL interface 1410, to route selected data to DMA engine 1412 where such data are sent over NoC 308 as memory mapped transactions, and/or to route selected data to NoC stream interface 1414 where the data are sent over NoC 308 as a data stream or streams.

DMA engine 1412 is capable of operating as a master to direct data into NoC 308 through selector block 1416 and on to NoC interface(s) 1426. DMA engine 1412 is capable of receiving data from DPEs and providing such data to NoC 308 as memory mapped data transactions. In one or more embodiments, DMA engine 1412 includes hardware synchronization circuitry that may be used to synchronize multiple channels included in DMA engine 1412 and/or a channel within DMA engine 1412 with a master that polls and drives the lock requests. For example, the master may be PS 312 or a device implemented within PL 310. The master may also receive an interrupt generated by the hardware synchronization circuitry within DMA engine 1412.

In one or more embodiments, DMA engine 1412 is capable of accessing an external memory. For example, DMA engine 1412 is capable of receiving data streams from DPEs and sending the data stream to external memory through NoC 308 to a memory controller located within the SoC. The memory controller then directs the data received as data streams to the external memory (e.g., initiates reads and/or writes of the external memory as requested by DMA engine 1412). Similarly, DMA engine 1412 is capable of receiving data from external memory where the data may be distributed to other tile(s) of SoC interface block 104 and/or up into target DPEs.

In particular embodiments, DMA engine 1412 includes security bits that may be set using DPE global control settings registers (DPE GCS registers) 1438. The External memory may be divided into different regions or partitions where DPE array 102 is only permitted to access particular regions of the external memory. The security bits within DMA engine 1412 may be set so that DPE array 102, by way of DMA engine 1412, is only able to access the particular region(s) of external memory that are allowed per the security bits. For example, an application implemented by DPE array 102 may be restricted to access only particular regions of external memory, restricted to only reading from particular regions of external memory, and/or restricted from writing to the external memory entirely using this mechanism.

The security bits within DMA engine 1412 that control access to the external memory may be implemented to control DPE array 102 as a whole or may be implemented in a more granular way where access to external memory may be specified and/or controlled on a per DPE basis, e.g., core by core, or for groups of cores that are configured to operate in a coordinated manner, e.g., to implement a kernel and/or other application.

NoC stream interface 1414 is capable of receiving data from NoC 308 via NoC interface(s) 1426 and forwarding the data to stream to multiplexer/demultiplexer 1408. NoC stream interface 1414 is further capable of receiving data from stream multiplexer/demultiplexer 1408 and forwarding the data to NoC interface 1426 through selector block 1416. Selector block 1416 is configurable to pass data from DMA engine 1412 or from NoC stream interface 1414 on to NoC interface(s) 1426.

CDT circuit 1420 is capable of performing control, debug, and trace operations within tile 1304. Regarding debug, each of the registers located in tile 1304 is mapped onto the memory map accessible via memory mapped switch 1402. CDT circuit 1420 may include circuitry such as, for example, trace hardware, trace buffers, performance counters, and/or stall logic. Trace hardware of CDT circuit 1420 is capable of collecting trace data. Trace buffers of CDT circuit 1420 are capable of buffering trace data. CDT circuit 1420 is further capable of outputting the trace data to stream switch 1406.

In one or more embodiments, CDT circuit 1420 is capable of collecting data, e.g., trace and/or debug data, packetizing such data, and then outputting the packetized data through stream switch 1406. For example, CDT circuit 1420 is capable of outputting packetized data and providing such data to stream switch 1406. Additionally, configuration registers 1436 or others can be read or written during debugging via memory mapped transactions through the memory mapped switch 1402 of the respective tile. Similarly, performance counters within CDT circuit 1420 can be read or written during profiling via memory mapped transactions through the memory mapped switch 1402 of the respective tile.

In one or more embodiments, CDT circuit 1420 is capable of receiving any events propagated by event broadcast circuitry 1404 (or event broadcast circuitry 1430) or selected events per the bitmask utilized by the interface of event broadcast circuitry 1404 that is coupled to CDT circuit 1420. CDT circuit 1420 is further capable of receiving events generated by event logic 1432. For example, CDT circuit 1420 is capable of receiving broadcast events, whether from PL 310, DPEs 304, tile 1304 (e.g., event logic 1432 and/or event broadcast switch 1404), and/or or other tiles of SoC interface block 104. CDT circuit 1420 is capable of packing, e.g., packetizing, a plurality of such events together in a packet and associating the packetized events with timestamp(s). CDT circuit 1420 is further capable of sending the packetized events over stream switch 1406 to destinations external to tile 1304. Events may be sent by way of stream switch 1406 and stream multiplexer/demultiplexer 1408 through PL interface 1410, DMA engine 1412, and/or NoC stream interface 1414.

DPE GCS registers 1438 may store DPE global control settings/bits (also referred to herein as "security bits") that are used to enable or disable secure access to and/or from DPE array 102. DPE GCS registers 1438 may be programmed via a SoC secure/initialization interface to be described in greater detail below in connection with FIG. 14C. The security bit(s) received from the SoC secure/initialization interface may propagate from one tile to the next of SoC interface block 104 via a bus as illustrated in FIG. 14A.

In one or more embodiments, external memory mapped data transfers into DPE array 102 (e.g., using NoC 308) are not secure or trusted. Without setting the security bits within DPE GCS registers 1438, any entity in device 100 that is capable of communicating by way of memory mapped data transfers (e.g., over NoC 308) is capable of communicating with DPE array 102. By setting the security bits within DPE GCS registers 1438, the particular entities that are permitted to communicate with DPE array 102 may be defined such that only the specified entities capable of generating secure traffic may communicate with DPE array 102.

For example, the memory mapped interfaces of memory mapped switch 1402 are capable of communicating with NoC 308. Memory mapped data transfers may include additional sideband signals, e.g., bits, that specify whether a transaction is secure or not secure. When the security bits within DPE GCS registers 1438 are set, then memory mapped transactions entering into SoC interface block 104 must have the sideband signals set to indicate that the memory mapped transaction arriving at SoC interface block 104 from NoC 308 is secure. When a memory mapped transaction arriving at SoC interface block 104 does not have the sideband bits set and the security bits are set within DPE GCS registers 1438, then SoC interface block 104 does not allow the transaction to enter or pass to DPEs 304.

In one or more embodiments, the SoC includes a secure agent (e.g., circuit) that operates as a root of trust. The secure agent is capable of configuring the different entities (e.g., circuits) within the SoC with the permissions needed to set the sideband bits within memory mapped transactions in order to access DPE array 102 when the security bits of DPE GCS registers 1438 are set. The secure agent, at the time the SoC is configured, gives permissions to the different masters that may be implemented in PL 310 or PS 312 thereby giving such masters the capability of issuing secure transactions over NoC 308 (or not) to DPE array 102.

FIG. 14B illustrates another example implementation of tile 1304. The example architecture illustrated in FIG. 14B may also be used to implement any of the other tiles included in SoC interface block 104. The example of FIG. 14B illustrates a simplified version of the architecture illustrated in FIG. 14A. The tile architecture of FIG. 14B provides connectivity among DPEs and other subsystems and/or blocks within device 100. For example, tile 1304 of FIG. 14B may provide an interface between DPEs and PL 310, analog/mixed signal circuit blocks, ASICs, or other subsystems as described herein. The tile architecture of FIG. 14B does not provide connectivity to NoC 308. As such, DMA engine 1412, NoC interface 1414, selector block 1416, bridge 1418, and stream multiplexer/demultiplexer 1408 are omitted. As such, tile 1304 of FIG. 14B may be implemented using less area of the SoC. Further, as pictured, stream switch 1406 is directly coupled to PL interface 1410.

The example architecture of FIG. 14B is unable to receive memory mapped data, e.g., configuration data, for purposes of configuring DPEs from NoC 308. Such configuration data may be received from neighboring tiles via memory mapped switch 1402 and directed to the subset of DPEs that tile 1304 manages (e.g., up into the column of DPEs above tile 1304 of FIG. 14B).

FIG. 14C illustrates another example implementation of tile 1304. In particular embodiments, the architecture illustrated in FIG. 14C may be used to implement only one tile within SoC interface block 104. For example, the architecture illustrated in FIG. 14C may be used to implement tile 1302 within SoC interface block 104. The architecture illustrated in FIG. 14C is similar to the architecture shown in FIG. 14B. In FIG. 14C, additional components such as a SoC secure/initialization interface 1440, a clock signal generator 1442, and a global timer 1444 are included.

In the example of FIG. 14C, SoC secure/initialization interface 1440 provides a further interface for SoC interface block 104. In one or more embodiments, SoC secure/initialization interface 1440 is implemented as a NoC peripheral interconnect. SoC secure/initialization interface 1440 is capable of providing access to global reset registers for DPE array 102 (not shown) and to DPE GCS registers 1438. In particular embodiments, DPE GCS registers 1438 include the configuration registers for clock signal generator 1442. As pictured, SoC secure/initialization interface 1440 is capable of providing the security bits to DPE GCS registers 1438 and propagating the security bits to other DPE GCS registers 1438 in other tiles of SoC interface block 104. In particular embodiments, SoC secure/initialization interface 1440 implements a single slave endpoint for SoC interface block 104.

In the example of FIG. 14C, clock signal generator 1442 is capable of generating one or more clock signal(s) 1446 and/or one or more reset signal 1450. Clock signal(s) 1446 and/or reset signals 1450 may be distributed to each of DPEs 304 and/or to other tiles of SoC interface block 104 of DPE array 102. In one or more embodiments, clock signal generator 1442 may include one or more phase lock loop circuits (PLLs). As illustrated, clock signal generator 1442 is capable of receiving a reference clock signal generated by another circuit external to DPE array 102 and located on the SoC. Clock signal generator 1442 is capable of generating the clock signal(s) 1446 based upon the received reference clock signal.

In the example of FIG. 14C, clock signal generator 1442 is configured through SoC secure/initialization interface 1440. For example, clock signal generator 1442 may be configured by loading data into DPE GCS registers 1438. As such, the clock frequency or clock frequencies of DPE array 102 and the generation of reset signals 1450 may be set by writing appropriate configuration data to DPE GCS registers 1438 through SoC secure/initialization interface 1440. For test purposes, clock signal(s) 1446 and/or reset signals 1450 may also be routed directly to PL 310.

SoC secure/initialization interface 1440 may be coupled to an SoC control/debug (circuit) block (e.g., a control and/or debug subsystem of device 100 not shown). In one or more embodiments, SoC secure/initialization interface 1440 is capable of providing status signals to the SOC control/debug block. As an illustrative and non-limiting example, SoC secure/initialization interface 1440 is capable of providing a "PLL lock" signal generated from inside of clock signal generator 1440 to the SoC control/debug block. The PLL lock signal may indicate when the PLL acquires lock on the reference clock signal.

SoC secure/initialization interface 1440 is capable of receiving instructions and/or data via an interface 1448. The data may include the security bits described herein, clock signal generator configuration data, and/or other data that may be written to DPE GCS registers 1438.

Global timer 1444 is capable of interfacing to CDT circuit 1420. For example, global timer 1444 may be coupled to CDT circuit 1420. Global timer 1444 is capable of providing a signal that is used by CDT circuit 1420 for time-stamping events used for tracing. In one or more embodiments, global timer 1444 may be coupled to CDT circuit 1420 within other ones of the tiles of SoC interface circuitry 104. For example, global timer 1444 may be coupled to CDT circuit 1420 in the example tiles of FIGS. 14A, 14B, and/or 14C. Global timer 1444 may also be coupled to the SoC control/debug block.

Referring to the architectures of FIGS. 14A, 14B, and 14C collectively, tile 1304 is capable of communicating with DPEs 304 using a variety of different data paths. In an example, tile 1304 is capable of communicating with DPEs 304 using DMA engine 1412. For example, tile 1304 is capable of communicating using DMA engine 1412 to the DMA engine (e.g., DMA engine 816) of one or more DPEs of DPE array 102. Communication may flow from a DPE to a tile of SoC interface block 104 or from a tile of SoC interface block 104 to a DPE. In another example, DMA engine 1412 is capable of communicating with a core(s) of one or more DPEs of DPE array 102 by way of the stream switches within the respective DPEs. Communication may flow from core(s) to a tile of SoC interface block 104 and/or from a tile of SoC interface block 104 to core(s) of one or more DPEs of DPE array 102.

Figure 15:
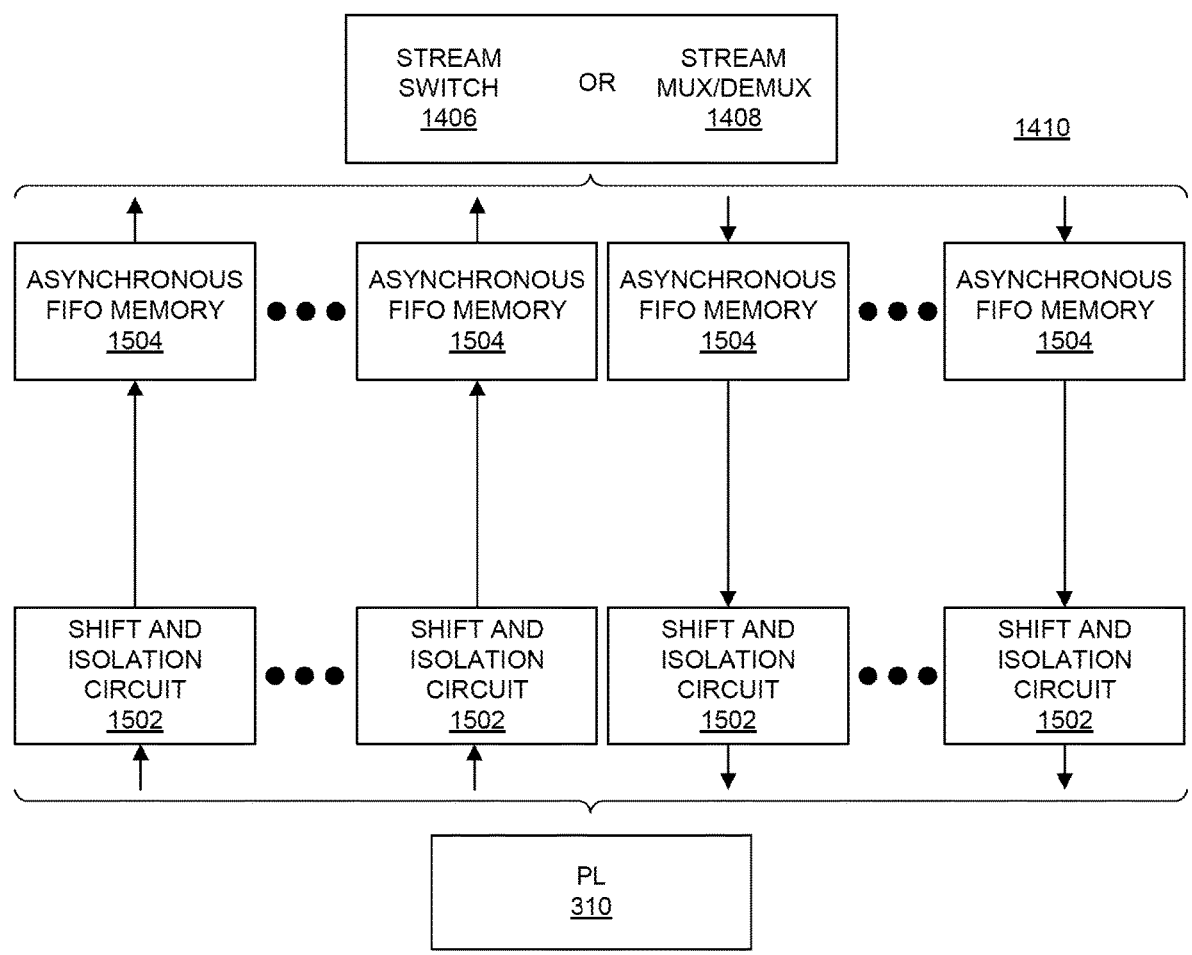
FIG. 15 illustrates an example implementation of a programmable logic interface of a tile of the SoC interface block.

FIG. 15 illustrates an example implementation of PL interface 1410. In the example of FIG. 15, PL interface 1410 includes a plurality of channels that couple PL 310 to stream switch 1406 and/or stream multiplexer/demultiplexer 1408 depending upon the particular tile architecture that is used. The particular number of channels illustrated in FIG. 15 within PL interface 1410 is for purposes of illustration and not limitation. In other embodiments, PL interface 1410 may include fewer or more channels than shown in FIG. 15. Further, while PL interface 1410 is illustrated as connecting to PL 310, in one or more other embodiments, PL interface 1410 is capable of coupling to one or more other subsystems and/or circuit blocks. For example, PL interface 1410 may also couple to an ASIC, analog/mixed signal circuitry, and/or other circuitry or subsystem.

In one or more embodiments, PL 310 operates at a different reference voltage and a different clock speed than DPEs 304. Accordingly, in the example of FIG. 15, PL interface 1410 includes a plurality of shift and isolation circuits 1502 and a plurality of asynchronous FIFO memories 1504. Each of the channels includes a shift isolation circuit 1502 and an asynchronous FIFO memory 1504. A first subset of the channels convey data from PL 310 (and/or other circuitry) to stream switch 1406 and/or stream multiplexer/demultiplexer 1408. A second subset of the channels convey data from stream switch 1406 and/or stream multiplexer/demultiplexer 1408 to PL 310 and/or other circuitry.

Shift and isolation circuits 1502 are capable of interfacing between domains of different voltage. In this case, shift and isolation circuits 1502 are capable of providing an interface that transitions between the operating voltage of PL 310 and/or other circuitry and the operating voltage of DPEs 304. Asynchronous FIFO memories 1504 are capable of interfacing between two different clock domains. In this case, asynchronous FIFO memories 1504 are capable of providing an interface that transitions between the clock rate of PL 310 and/or other circuitry and the clock rate of DPEs 304.

In one or more embodiments, asynchronous FIFO memories 1504 have 32-bit interfaces to DPE array 102. Connections between asynchronous FIFO memories 1504 and shift and isolation circuits 1502 and connections between shift and isolation circuits 1502 and PL 310 may be programmable (e.g., configurable) in width. For example, the connections between asynchronous FIFO memories 1504 and shift and isolation circuits 1502 and the connections between shift and isolation circuits 1502 and PL 310 may be configured to be 32-bits, 64-bits, or 128-bits in width. As discussed, PL interface 1410 is configurable by way of memory mapped switch 1402 writing configuration data to configuration registers 1436 to achieve the bit-widths described. Using memory mapped switch 1402, the side of asynchronous FIFO memories 1504 on the side of PL 310 may be configurable to use either 32-bits, 64-bits, or 128-bits. The bit widths provided herein are for purposes of illustration. In other embodiments, other bit widths may be used. In any case, the widths described for the various components may be varied based upon configuration data loaded into configuration registers 1436.

Figure 16:
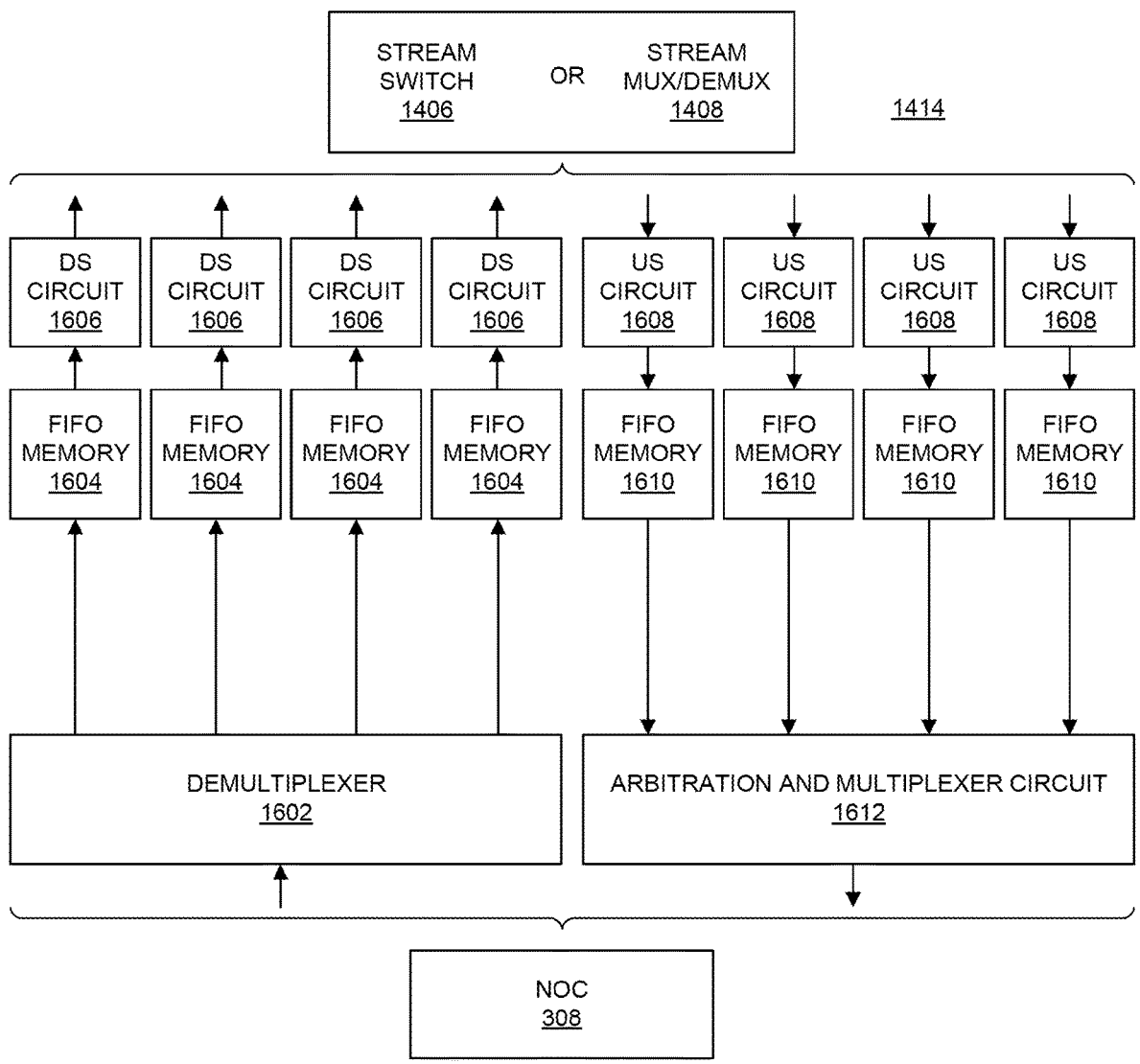
FIG. 16 illustrates an example implementation of a Network-On-Chip (NoC) stream interface of a tile of the SoC interface block.

FIG. 16 illustrates an example implementation of NoC stream interface 1414. DPE array 102 has two general ways of communicating via NoC 308 using the stream interfaces in the DPEs. In one aspect, DPEs are capable of accessing DMA engine 1412 using stream switch 1406. DMA engine 1412 is capable of converting memory mapped transactions from NoC 308 to data streams for sending to the DPEs and converting data streams from the DPEs to memory mapped transactions for sending over NoC 308. In another aspect, the data streams may be directed to NoC stream interface 1414.

In the example of FIG. 16, NoC stream interface 1414 includes a plurality of channels that couple NoC 308 to stream switch 1406 and/or stream multiplexer/demultiplex. Each channel may include a FIFO memory and either an upsize circuit or a downsize circuit. A first subset of the channels convey data from NoC 308 to stream switch 1406 and/or stream multiplexer/demultiplexer 1408. A second subset of the channels convey data from stream switch 1406 and/or stream multiplexer/demultiplexer 1408 to NoC 308. The particular number of channels illustrated in FIG. 16 within NoC stream interface 1414 is for purposes of illustration and not limitation. In other embodiments, NoC stream interface 1414 may include fewer or more channels than shown in FIG. 16.

In one or more embodiments, each of upsize circuits 1608 (abbreviated as "US circuit" in FIG. 16) is capable of receiving a data stream and increasing the width of the received data stream. For example, each upsize circuit 1608 may receive a 32-bit data stream and output a 128-bit data stream to a corresponding FIFO memory 1610. Each of FIFO memories 1610 is coupled to arbitration and multiplexer circuit 1612. Arbitration and multiplexer circuit 1612 is capable of arbitrating between the received data streams using a particular arbitration scheme or priority (e.g., round-robin or other style) for providing a resulting output data stream to NoC interfaces 1426. Arbitration and multiplexer circuit 1612 is capable of handling and accepting a new request every clock cycle. Clock domain crossing between DPEs 304 and NoC 308 may be handled within NoC 308 itself. In one or more other embodiments, clock domain crossing between DPEs 304 and NoC 308 may be handled within SoC interface block 104. For example, clock domain crossing may be handled in NoC stream interface 1414.

Demultiplexer 1602 is capable of receiving a data stream from NoC 308. For example, demultiplexer 1602 may be coupled to NoC interface(s) 1426. For purposes of illustration, the data stream from NoC interface(s) 1426 may be 128-bits in width. Clock domain crossing between DPEs 304 and NoC 308 may be handled within NoC 308 and/or within NoC stream interface 1414 as previously described. Demultiplexer 1602 is capable of forwarding the received data stream to one of FIFO memories 1604. The particular FIFO memory 1604 to which demultiplexer 1602 provides the data stream may be encoded within the data stream itself. FIFO memories 1604 are coupled to downsize circuits 1606 (abbreviated as "DS circuit" in FIG. 16). Downsize circuits 1606 are capable of downsizing the received streams to a lesser width after buffering using time-division multiplexing. For example, downsize circuits 1606 may downsize a stream from 128 bits in width to 32-bits in width.

As illustrated, downsize circuits 1606 and upsize circuits 1608 are coupled to stream switch 1406 or stream multiplexer/demultiplexer 1408 depending upon the particular architecture of the tile of SoC interface block 104 that is used. FIG. 16 is provided for purposes of illustration and is not intended as a limitation. The order and/or connectivity of components in the channels (e.g., upsize/downsize circuit and FIFO memory may vary).

In one or more other embodiments, PL interface 1410, as described in connection with FIG. 15, may include upsize circuits and/or downsize circuits as described in connection with FIG. 16. For example, downsize circuits may be included in each channel that conveys data from PL 310 (or other circuitry) to stream switch 1406 and/or to stream multiplexer/demultiplexer 1408. Upsize circuits may be included in each channel that conveys data from stream switch 1406 and/or stream multiplexer/demultiplexer 1408 to PL 310 (or other circuitry).

In one or more other embodiments, though shown as independent elements, each downsize circuit 1606 may be combined with the corresponding FIFO memory 1604, e.g., as a single block or circuit. Similarly, each upsize circuit 1608 may be combined with the corresponding FIFO memory 1610, e.g., as a single block or circuit.

Figure 17:
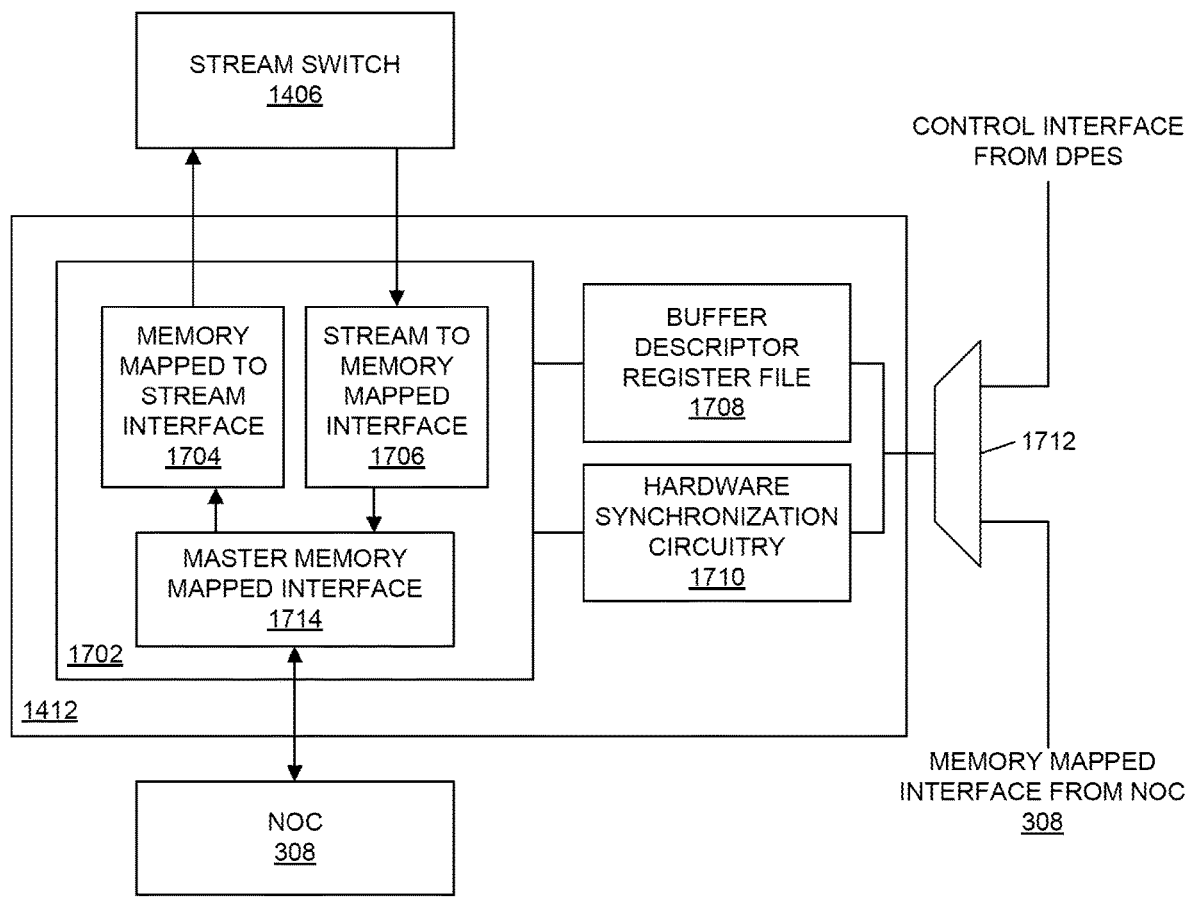
FIG. 17 illustrates an example implementation of a direct memory access (DMA) engine of a tile of the SoC interface block.

FIG. 17 illustrates an example implementation of DMA engine 1412. In the example of FIG. 17, DMA engine 1412 includes a DMA controller 1702. DMA controller 1702 may be divided into two separate modules or interfaces. Each module is capable of operating independently of the other. DMA controller 1702 may include a memory mapped to stream interface (interface) 1704 and a stream to memory mapped interface (interface) 1706. Each of interface 1704 and interface 1706 may include two or more separate channels. Accordingly, DMA engine 1412 is capable of receiving two or more incoming streams from stream switch 1406 via interface 1706 and sending two or more outgoing streams to stream switch 1406 via interface 1704. DMA controller 1702 further may include a master memory mapped interface 1714. Master memory mapped interface 1714 couples NoC 308 to interface 1704 and to interface 1706.

DMA engine 1412 may also include hardware synchronization circuitry 1710 and a buffer descriptor register file 1708. Hardware synchronization circuitry 1710 and buffer descriptor register file 1708 may be accessed via multiplexer 1712. As such, both hardware synchronization circuitry 1710 and buffer descriptor register file 1708 may be accessed externally via control interfaces. Examples of such control interfaces include, but are not limited to, a memory mapped interface or a control stream interface from the DPEs. An example of a control stream interface of a DPE is a streaming interface output from a core of a DPE.

Hardware synchronization circuitry 1710 may be used to synchronize the multiple channels included in DMA engine 1412 and/or a channel within DMA engine 1412 with a master that polls and drives the lock requests. For example, the master may be PS 312 or a device implemented within PL 310. In another example, the master may also receive an interrupt generated by hardware synchronization circuitry 1710 within DMA engine 1412 when a lock is available.

DMA transfers may be defined by buffer descriptors stored within buffer descriptor register file 1708. Interface 1706 is capable of requesting read transfers to NoC 308 based on the information in the buffer descriptors. Outgoing streams to stream switch 1406 from interface 1704 can be configured as packet-switched or circuit-switched based upon the configuration registers for stream switches.

Figure 18:
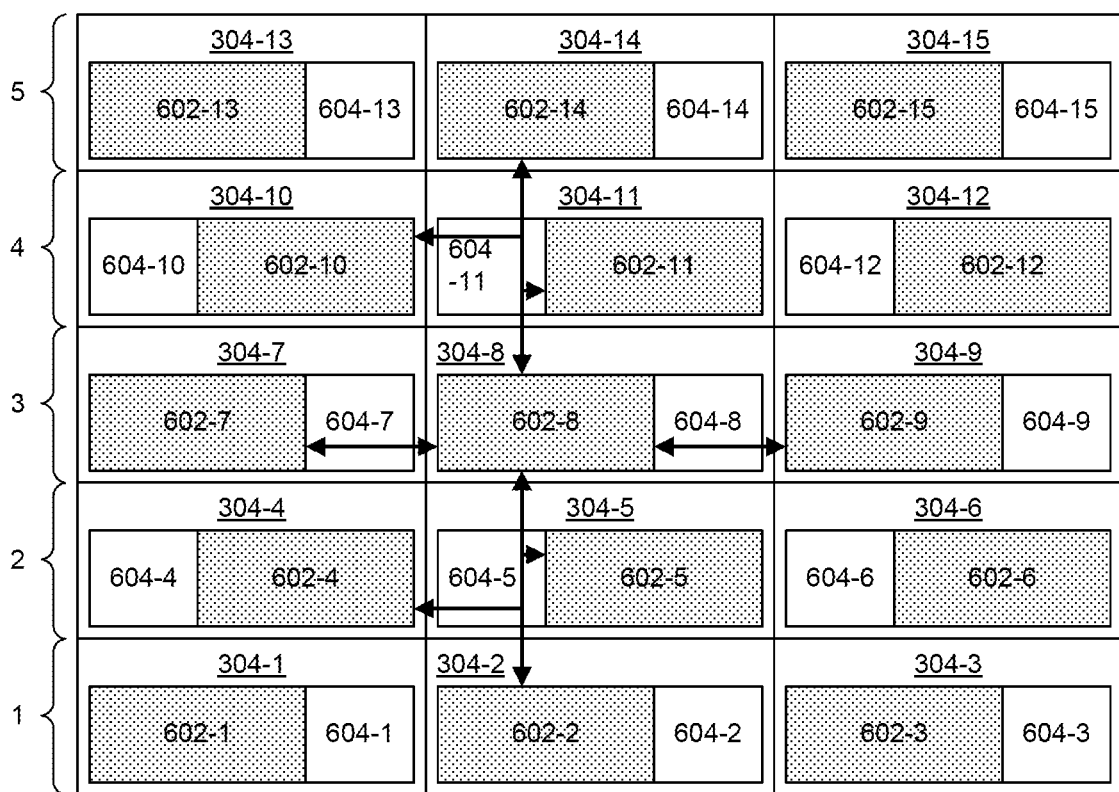
FIG. 18 illustrates an example architecture for a plurality of DPEs.

FIG. 18 illustrates an example architecture for a plurality of DPEs. The example architecture illustrates DPEs 304 that may be included in DPE array 102. The example architecture of FIG. 18 may be referred to as a checkerboard architecture. The example architecture of FIG. 18 allows the core of a DPE to communicate with up to eight other cores of other DPEs using shared memory (e.g., nine cores communicating via shared memory in total). In the example of FIG. 18, each DPE 304 may be implemented as described in connection with FIGS. 6, 7, and 8. As such, each core 602 is capable of accessing four different memory modules 604. Each memory module 604 may be accessed by up to four different cores 602.

As pictured, DPE array 102 includes rows 1, 2, 3, 4, and 5. Each of rows 1-5 includes three DPEs 304. The particular number of DPEs 304 in each row and the number of rows shown in FIG. 18 are for purposes of illustration and not limitation. Referring to rows 1, 3, and 5, the core of each DPE in these rows is located to the left of the memory module. Referring to rows 2 and 4, the core of each DPE in these rows is located to the right of the memory module. In effect, the orientation of DPEs in rows 2 and 4 is horizontally inverted or horizontally flipped compared to the orientation of DPEs in rows 1, 3, and 5. The orientation of DPEs inverts as shown in each alternating row.

In the example of FIG. 18, DPEs 304 are aligned in columns. Cores and memory modules in adjacent rows, however, are not aligned in columns. The architecture of FIG. 18 is an example of a heterogeneous architecture where DPEs are implemented differently based upon the particular row in which the DPE is located. Due to the horizontal inversion of DPEs 304, cores in adjacent rows are not aligned. Cores in adjacent rows are offset from one another. Similarly, memory modules in adjacent rows are not aligned. Memory modules in adjacent rows are offset from one another. Cores in alternating rows, however, are aligned as are memory modules in alternating rows. For example, the cores and memory modules of rows 1, 3, and 5 are vertically aligned (e.g., in columns). Similarly, the cores and memory modules of rows 2 and 4 are vertically aligned (e.g., in columns).

For purposes of illustration, the cores of DPEs 304-2, 304-4, 304-5, 304-7, 304-8, 304-9, 304-10, 304-11, and 304-14 are considered part of a group and able to communicate via shared memory. The arrows illustrate how the example architecture of FIG. 18 supports a core communicating with up to eight other cores in different DPEs using shared memory. Referring to DPE 304-8, for example, core 602-8 is capable of accessing memory modules 604-11, 604-7, 604-8, and 604-5. Through memory module 604-11, core 602-8 is capable of communicating with cores 602-14, 602-10, and 602-11. Through memory module 604-7, core 602-8 is capable of communicating with cores 602-7, 602-4, and 602-10. Through memory module 604-8, core 602-8 is capable of communicating with core 602-9, 602-11, and 602-5. Through memory module 604-5, core 602-8 is capable of communicating with cores 602-4, 602-5, and 602-2.

In the example of FIG. 18, excluding core 602-8, there are four different cores in the group that are able to access two different memory modules of the shared memory modules of the group. The remaining other four cores share only one memory module of the shared memory modules of the group. The shared memory modules of the group include memory modules 604-5, 604-7, 604-8, and 604-11. For example, each of cores 602-10, 602-11, 602-4, and 602-5 is able to access two different memory modules. Core 602-10 is able to access memory modules 604-11 and 604-7. Core 602-11 is able to access memory modules 604-11 and 604-8. Core 602-4 is able to access memory modules 604-5 and 604-7. Core 602-5 is able to access memory modules 604-5 and 604-8.

In the example of FIG. 18, up to nine cores of nine DPEs in total are capable of communicating through shared memory without utilizing the DPE interconnect network of DPE array 102. As discussed, core 602-8 is able to view memory modules 604-11, 604-7, 604-5, and 604-8 as a unified memory space.

Cores 602-14, 602-7, 602-9, and 602-2 are only able to access one memory module of the shared memory modules of the group. Core 602-14 is able to access memory module 604-11. Core 602-7 is able to access memory module 604-7. Core 602-9 is able to access memory module 604-8. Core 602-2 is able to access memory module 604-5.

As previously discussed, in other embodiments, where more than four memory interfaces are provided for each memory module, a core may be able to communicate with more than 8 other cores via shared memory using the architecture of FIG. 18.

In one or more other embodiments, certain rows and/or columns of DPEs may be offset relative to other rows. For example, rows 2 and 4 may begin from a location that is not aligned with the start of rows 1, 3, and/or 5. Rows 2 and 4, for example, may be shifted to the right relative to the start of rows 1, 3, and/or 5.

Figure 19:
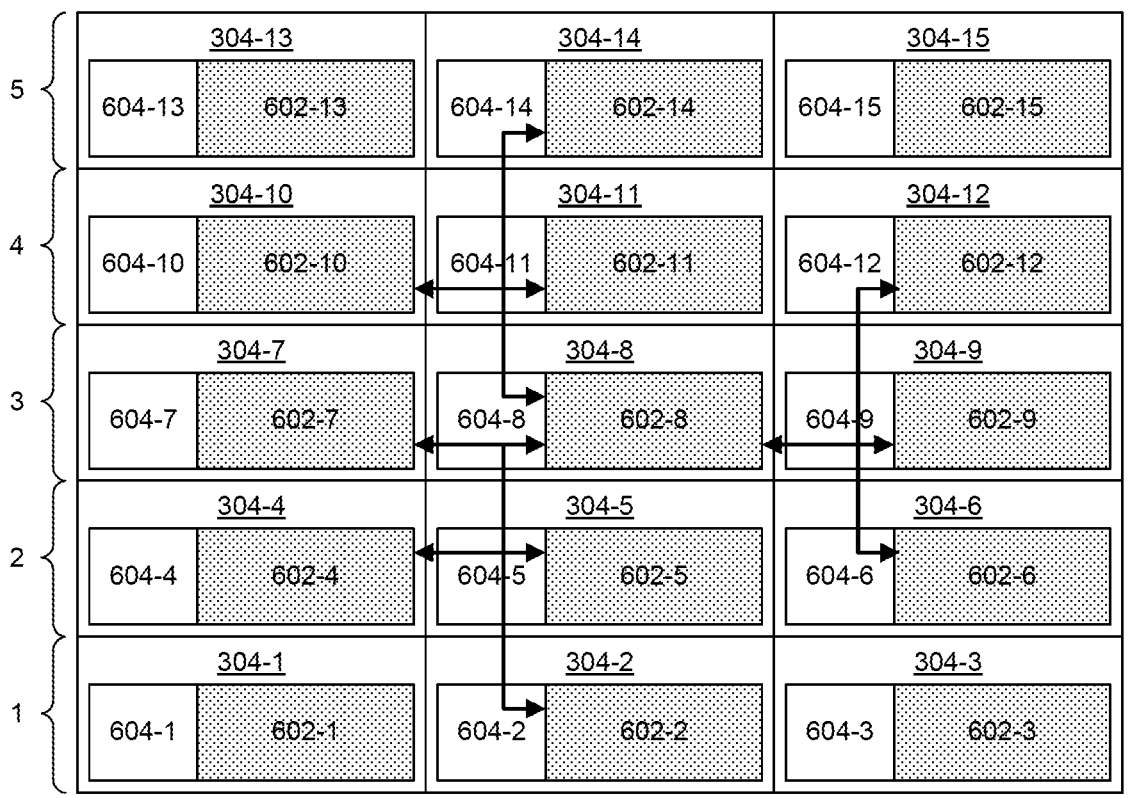
FIG. 19 illustrates another example architecture for a plurality of DPEs.

FIG. 19 illustrates another example architecture for a plurality of DPEs. The example architecture illustrates DPEs 304 that may be included in DPE array 102. The example architecture of illustrated in FIG. 19 may be referred to as a grid architecture. The example architecture of FIG. 19 allows the core of a DPE to communicate with up to ten other cores of other DPEs using shared memory (e.g., 11 cores communicating via shared memory in total). In the example of FIG. 19, each DPE 304 may be implemented as described in connection with FIGS. 6, 7, and 8. As such, each core 602 is capable of accessing four different memory modules 604. Each memory module 604 may be accessed by up to four different cores 602.

As pictured, DPE array 102 includes rows 1, 2, 3, 4, and 5. Each of rows 1-5 includes three DPEs 304. The particular number of DPEs 304 in each row and the number of rows shown in FIG. 19 are for purposes of illustration and not limitation. In the example of FIG. 19, DPEs 304 are vertically aligned in columns. Each of rows 1, 2, 3, 4, and 5 has a same starting point that is aligned with each other row of DPEs. Further, the placement of cores 602 and memory modules 604 within each respective DPE 304 is the same. In other words, cores 602 are vertically aligned. Similarly, memory modules 604 are vertically aligned.

For purposes of illustration, the cores of DPEs 304-2, 304-4, 304-5, 304-6, 304-7, 304-8, 304-9, 304-10, 304-11, 304-12, and 304-14 are considered part of a group and able to communicate via shared memory. The arrows illustrate how the example architecture of FIG. 19 supports a core communicating with up to ten other cores in different DPEs using shared memory. Referring to DPE 304-8, for example, core 602-8 is capable of accessing memory modules 604-11, 604-8, 604-5, and 604-9. Through memory module 604-11, core 602-8 is capable of communicating with cores 602-14, 602-10, and 602-11. Through memory module 604-8, core 602-8 is capable of communicating with cores 602-7, 602-11, and 602-5. Through memory module 604-5, core 602-8 is capable of communicating with cores 602-4, 602-5, and 602-2. Through memory module 604-9, core 602-8 is capable of communicating with cores 602-12, 602-9, and 602-6.

In the example of FIG. 19, excluding core 602-8, there are two different cores in the group cores that are capable of accessing two memory modules of the shared memory modules of the group. The shared memory modules of the group include memory modules 604-5, 604-8, 604-9, and 604-11. The remaining eight cores of the group share only one memory module. For example, each of cores 602-11 and 602-5 is able to access two different memory modules. Core 602-11 is able to access memory modules 604-11 and 604-8. Memory module 604-14 is not considered part of the group of shared memories since memory module 604-14 is not accessible by core 604-8. Core 602-5 is able to access memory modules 604-5 and 604-8. Memory module 604-2 is not considered part of the group of shared memory modules since memory module 604-2 is not accessible by core 602-8.

Cores 602-14, 602-10, 602-12, 602-7, 602-9, 602-4, 602-6, and 602-2 are only able to access one memory module of the shared memory modules of the group. Core 602-14 is able to access memory module 604-11. Core 602-10 is able to access memory module 604-11. Core 602-12 is able to access memory module 604-9. Core 602-7 is able to access memory module 604-8. Core 602-9 is able to access memory module 604-9. Core 602-4 is able to access memory module 604-5. Core 602-6 is able to access memory module 604-9. Core 602-2 is able to access memory module 604-5.

In the example of FIG. 19, up to 11 cores of 11 DPEs are capable of communicating through shared memory without utilizing the DPE interconnect network of DPE array 102. As discussed, core 602-8 is capable of viewing memory modules 604-11, 604-9, 604-5, and 604-8 as a unified memory space.

As previously discussed, in other embodiments, where more than four memory interfaces are provided for each memory module, a core may be able to communicate with more than 10 other cores via shared memory using the architecture of FIG. 19.

FIG. 20 illustrates an example method 2000 of configuring a DPE array. Method 2000 is provided for purposes of illustration and is not intended as a limitation of the inventive arrangements described within this disclosure.

In block 2002, configuration data for the DPE array is loaded into the device. The configuration data may be provided from any of a variety of different sources, whether a computer system (e.g., a host), an off-chip memory, or other suitable source.

In block 2004, the configuration data is provided to the SoC interface block. In particular embodiments, the configuration data is provided via the NoC. A tile of the SoC interface block is capable of receiving the configuration data and converting the configuration data to memory mapped data, which may be provided to the memory mapped switch contained within the tile.

In block 2006, the configuration data propagates between the tile(s) of the SoC interface block to the particular tile(s) that operate as, or provide, interfaces to the target DPE(s). The target DPE(s) are the DPE(s) to which the configuration data is addressed. For example, the configuration data includes addresses specifying the particular DPEs to which the different portions of configuration data should be directed. The memory mapped switches within the tiles of the SoC interface block are capable of propagating the different portions of configuration data to the particular tiles that operate as interfaces for the target DPE(s) (e.g., the subset of DPEs that include the target DPEs).

In block 2008, the tile(s) of the SoC interface block that operate as interfaces for the target DPE(s) are capable of directing the portions of configuration data for the target DPE(s) to the target DPE(s). For example, a tile that provides an interface to one or more target DPE(s) is capable of directing the portion(s) of configuration data into the subset of DPEs to which the tile provides an interface. As noted, the subset of DPEs includes the one or more target DPE(s). As each tile receives configuration data, the tile is capable of determining whether any portions of the configuration data are addressed to other DPEs in the same subset of DPEs to which the tile provides an interface. The tile directs any configuration data addressed to DPEs in the subset of DPEs to such DPE(s).

In block 2010, the configuration data is loaded into the target DPEs to program the elements of the DPEs included therein. For example, the configuration data is loaded into configuration registers to program elements of the target DPE(s) such as the stream interfaces, the core (e.g., stream interface(s), cascade interfaces, core interfaces), the memory module (e.g., DMA engines, memory interfaces, arbiters, etc.), the broadcast event switch, and/or the broadcast logic. The configuration data may also include executable program code that may be loaded into the program memory of the core and/or data to be loaded into memory banks of the memory module.

It should be appreciated that the received configuration data may also include portions that are addressed to one or more or all of the tiles of SoC interface block 104. In that case, the memory mapped switches within the respective tiles are capable of conveying the configuration data to the appropriate (e.g., target) tiles, extracting such data, and writing such data to the appropriate configuration registers within the respective tiles.

FIG. 21 illustrates an example method 2100 of operation of a DPE array. Method 2100 is provided for purposes of illustration and is not intended as a limitation of the inventive arrangements described within this disclosure. Method 2100 begins in a state where the DPEs and/or SoC interface block have been loaded with configuration data. For purposes of illustration, reference is made to FIG. 3.

In block 2102, core 602-15 (e.g., the "first core") of DPE 304-15 (e.g., the "first DPE") generates data. The generated data may be application data. For example, core 602-15 may operate on data stored in a memory module accessible by the core. The memory module may be in DPE 304-15 or a different DPE as described herein. The data may have been received from another DPE and/or another subsystem of the device, e.g., using SoC interface block 104.

In block 2104, core 602-15 stores the data in memory module 604-15 of DPE 304-15. In block 2106, one or more cores in neighboring DPEs (e.g., DPE 304-25, 304-16, and/or 304-5) read the data from memory module 604-15 of the DPE 304-15. The core(s) in the neighboring DPE(s) may utilize the data read from memory module 604-15 in further computations.

In block 2108, DPE 304-15 optionally sends data to one or more other DPEs via stream interfaces. The DPE(s) to which the data is sent may be non-neighboring DPE(s). For example, DPE 304-15 is capable of sending data from memory module 604-15 to one or more other DPEs such as DPE 304-35, 304-36, or the like. As discussed, in one or more embodiments, DPE 304-15 is capable of broadcasting and/or multi-casting the application data via the stream interfaces in the DPE interconnect network of DPE array 102. In another example, the data sent to the different DPEs may be different portions of data, where each different portion of data is intended for a different target DPE. Though not illustrated in FIG. 21, core 602-15 is also capable of sending the data to another core and/or DPE of DPE array 102 using the cascade interfaces and/or directly from the core using the stream switches.

In block 2110, core 602-15 optionally sends data to and/or receives data from a neighboring core via the cascade interface. The data may be application data. For example, core 602-15 is capable of receiving data directly from core 602-14 of DPE 304-14 and/or sending data directly to core 602-16 of DPE 304-16 via the cascade interfaces.

In block 2112, DPE 304-15 optionally sends data to and/or receives data from one or more subsystem(s) via the SoC interface block. The data may be application data. For example, DPE 304-15 is capable of sending data to PS 312 via NoC 308, to circuits implemented in PL 310, to selected hardwired circuit blocks via NoC 308, to selected hardwired circuit blocks via PL 310, and/or to other external subsystems such as an external memory. Similarly, DPE 304-15 is capable of receiving application data from such other subsystems via the SoC interface block.

Figure 22:
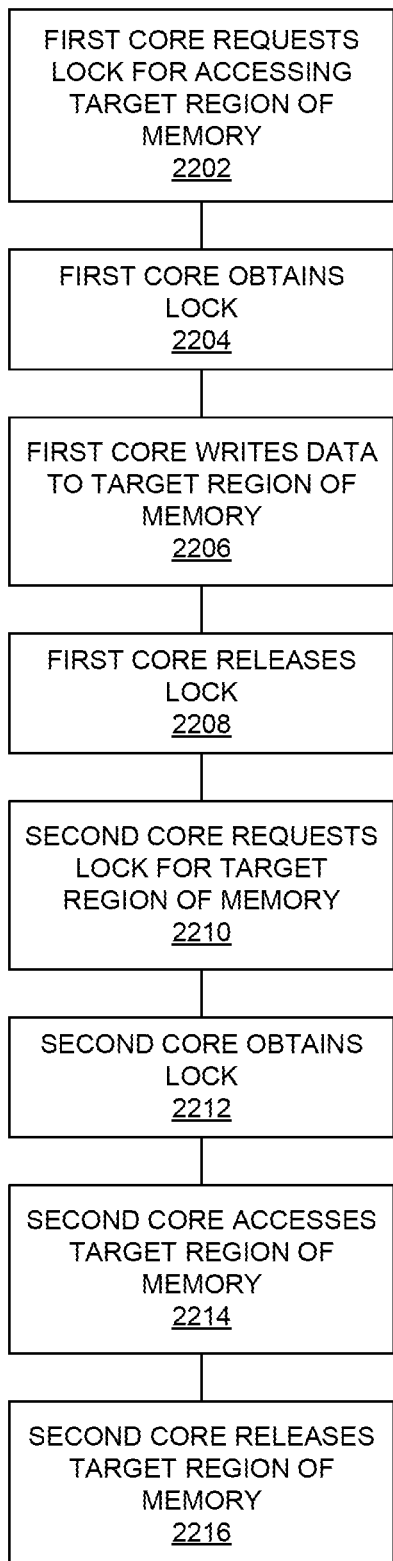
FIG. 22 illustrates another example method of operation of a DPE array.

FIG. 22 illustrates another example method 2200 of operation of a DPE array. Method 2200 is provided for purposes of illustration and is not intended as a limitation of the inventive arrangements described within this disclosure. Method 2200 begins in a state where the DPE array has been loaded with configuration data.

In block 2202, a first core, e.g., a core within a first DPE, requests a lock for a target region of memory from the hardware synchronization circuitry. The first core, for example, is capable of requesting a lock from the hardware synchronization circuitry for a target region of memory within the memory module located in the first DPE, e.g., the same DPE as the first core, or for a target region of memory within a memory module located in a different DPE than the first core. The first core is capable of requesting the lock from the particular hardware synchronization circuitry located in the same DPE as the target region of memory to be accessed.

In block 2204, the first core obtains the requested lock. The hardware synchronization circuitry, for example, grants the requested lock for the target region of memory to the first core.

In block 2206, in response to obtaining the lock, the first core writes data to the target region in memory. For example, if the target region of memory is in the first DPE, the first core is able to write the data to the target region in memory via the memory interface located within the memory module within the first DPE. In another example, where the target region of memory is located in a different DPE than the first core, the first core is capable of writing the data to the target region of memory using any variety of the techniques described herein. For example, the first core can write the data to the target region of memory via any of the mechanisms described in connection with FIG. 10.

In block 2208, the first core releases the lock on the target region of memory. In block 2210, a second core requests a lock on the target region of memory containing the data written by the first core. Second core may be located in the same DPE as the target region of memory or within a different DPE than the target region of memory. The second core requests the lock from the same hardware synchronization circuitry that granted the lock to the first core. In block 2212, the second core obtains the lock from the hardware synchronization circuitry. The hardware synchronization circuitry grants the lock to the second core. In block 2214, the second core is capable of accessing the data from the target region of memory and utilizing the data for processing. In block 2216, the second core releases the lock on the target region of memory, e.g., when access to the target region of memory is no longer needed.

The example of FIG. 22 is described in connection with accessing a region of memory. In particular embodiments, the first core is capable of writing data directly to the target region of memory. In other embodiments, the first core is capable of moving data from a source region of memory (e.g., in a first DPE) to the target region of memory (e.g., located in a second or different DPE). In that case, the first core obtains locks on the source region of memory and the target region of memory in order to perform the data transfer.

In other embodiments, the first core is capable of obtaining a lock for the second core in order to stall operation of the second core and then release the lock to allow operation of the second core to continue. For example, the first core may obtain a lock on a second core in addition to locks on the target region of memory in order to stall operation of the second core while data is written to the target region of memory for use by the second core. Once the first core is finished writing the data, the first core may release the lock on the target region of memory and the lock on the second core, thereby allowing the second core to operate on the data once the second core obtains a lock on the target region of memory.

In still other embodiments, the first core is capable of initiating a data transfer from a memory module in the same DPE, e.g., via the DMA engine in the memory module, directly to another core as illustrated in FIG. 10C.

Figure 23:
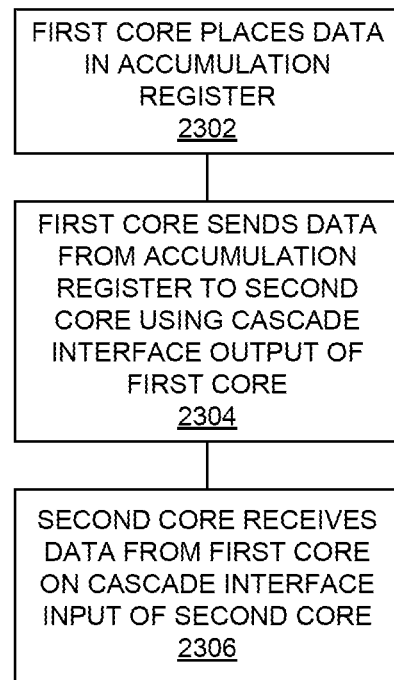
FIG. 23 illustrates another example method of operation of a DPE array.

FIG. 23 illustrates another example method of operation of a DPE array. Method 2300 is provided for purposes of illustration and is not intended as a limitation of the inventive arrangements described within this disclosure. Method 2300 begins in a state where the DPE array has been loaded with configuration data.

In block 2302, a first core places data into the accumulation register contained therein. For example, the first core may be performing calculations where some portion of the calculation, whether an intermediate result or a final result is to be provided directly to another core. In that case, the first core is capable of loading the data to be sent to the second core within the accumulation register contained therein.

In block 2304, the first core sends the data from the accumulation register contained therein to the second core from the cascade interface output of the first core. In block 2306, the second core receives the data from the first core on the cascade interface input of the second core. The second core may then process the data or store the data in memory.

In one or more embodiments, utilization of the cascade interfaces by the cores may be controlled by the loading of configuration data. For example, the cascade interfaces may be enabled or disabled between consecutive pairs of cores as required for a particular application based upon the configuration data. In particular embodiments, with the cascade interfaces enabled, the use of the cascade interfaces may be controlled based upon program code loaded into the program memory of the core. In other cases, the use of the cascade interfaces may be controlled by way of dedicated circuitry and configuration registers contained in the cores.

Figure 24:
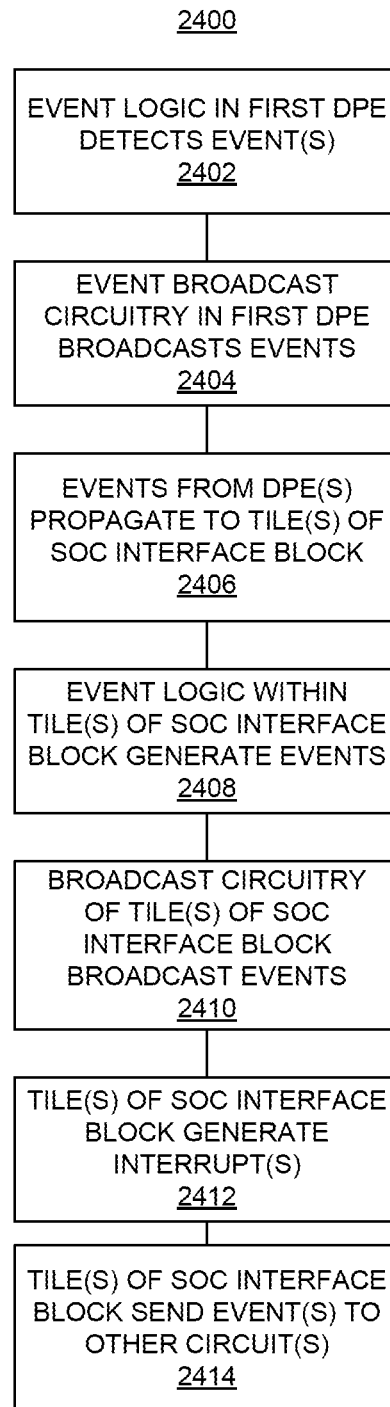
FIG. 24 illustrates another example method of operation of a DPE array.

FIG. 24 illustrates another example method of operation of a DPE array. Method 2400 is provided for purposes of illustration and is not intended as a limitation of the inventive arrangements described within this disclosure. Method 2400 begins in a state where the DPE array has been loaded with configuration data.

In block 2402, event logic within a first DPE detects one or more events locally within the first DPE. The events may be detected from the core, from the memory module, or from both the core and the memory module. In block 2404, the event broadcast circuitry within the first DPE broadcasts events based upon the configuration data loaded into the first DPE. The broadcast circuitry is capable of broadcasting selected ones of the events generated in block 2402. The event broadcast circuitry is also capable of broadcasting selected events that may be received from one or more other DPEs within DPE array 102.

In block 2406, the events from the DPEs are propagated to tiles within the SoC interface block. For example, events may be propagated in each of the four cardinal directions through the DPEs in patterns and/or routes determined by the configuration data. Broadcast circuitry within particular DPEs may be configured to propagate events down to the tile(s) in the SoC interface block.

In block 2408, the event logic within the tile(s) of the SoC interface block optionally generate events. In block 2410, the tile(s) of the SoC interface block optionally broadcast events to other tiles within the SoC interface block. The broadcast circuitry within the tile(s) of the SoC interface block is capable of broadcasting selected ones of the events generated with the tiles themselves and/or events received from other sources (e.g., whether other tiles of the SoC interface block or DPEs) to other tiles of the SoC interface block.

In block 2412, the tile(s) of the SoC interface block optionally generate one or more interrupts. The interrupt(s) may be generated by interrupt handler 1434, for example. The interrupt handler is capable of generating one or more interrupts in response to receiving particular events, combinations of events, and/or sequences of events over time. The interrupt handler may send the interrupt(s) generated to other circuitry such as PS 312 and/or to circuits implemented within PL 310.

In block 2414, the tile(s) of the SoC interface block optionally send the events to one or more other circuits. For example, CDT circuit 1420 is capable of packetizing events and sending the events from the tile(s) of the SoC interface block to the PS 312, to circuits within the PL 310, to external memory, or to another destination with the SoC.

In one or more embodiments, PS 312 is capable of responding to interrupts generated by the tile(s) of SoC interface block 104. For example, PS 312 is capable of resetting DPE array 102 in response to receiving particular interrupts. In another example, PS 312 is capable of reconfiguring DPE array 102 or a portion of DPE array 102 (e.g., performing partial reconfiguration) in response to particular interrupts. In another example, PS 312 is capable of taking other actions such as loading new data into different memory modules of DPEs for use by the cores within such DPEs.

In the example of FIG. 24, PS 312 performs operations in response to interrupts. In other embodiments, PS 312 may operate as a global controller for DPE array 102. PS 312 is capable of controlling application parameters stored in the memory modules and used by one or more DPEs of DPE array 102 (e.g., the cores) during runtime. As an illustrative and non-limiting example, one or more DPEs may be operative as a kernel that implements a filter. In that case, PS 312 is capable of executing program code that allows PS 312 to calculate and/or modify coefficients of the filter during runtime of DPE array 102, e.g., dynamically at runtime. PS 312 may calculate and/or update the coefficients in response to particular conditions and/or signals detected within the SoC. For example, PS 312 is capable of computing new coefficients for the filter and/or writing such coefficients to application memory (e.g., to one or more memory modules) in response to some detected condition. Examples of conditions that may cause PS 312 to write data such as coefficients to the memory module(s) may include, but are not limited to, receiving particular data from DPE array 102, receiving interrupts from the SoC interface block, receiving event data from DPE array 102, receiving a signal from a source external to the SoC, receiving another signal from within the SoC, and/or receiving new and/or updated coefficients from a source within the SoC or from external to the SoC. PS 312 is capable of computing the new coefficients and/or writing the new coefficients to the application data, e.g., the memory module utilized by the core and/or cores.

In another example, PS 312 is capable of executing a debugger application that is capable of performing actions such as starting, stopping, and/or single-stepping execution of DPEs. PS 312 may control the starting, stopping, and/or single-stepping of DPEs via NoC 308. In other examples, circuits implemented in PL 310 may also be capable of controlling operation of DPEs using debugging operations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems, devices, and/or methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

The corresponding structures, materials, acts, and equivalents of all means or step plus function elements that may be found in the claims below are intended to include any structure, material, or act for performing the function in combination with other claimed elements as specifically claimed.

In one or more embodiments, a device may include a plurality of DPEs. Each DPE may include a core and a memory module. Each core may be configured to access the memory module in the same DPE and a memory module within at least one other DPE of the plurality of DPEs.

In an aspect, each core may be configured to access the memory modules of a plurality of neighboring DPEs.

In another aspect, the cores of the plurality of DPEs may be directly coupled.

In another aspect, each of the plurality of DPEs is a hardwired and programmable circuit block.

In another aspect, each DPE may include interconnect circuitry including a stream switch configured to communicate with one or more DPEs selected from the plurality of DPEs. The stream switch may be programmable to communicate with the one or more selected DPEs, e.g., other DPEs.

The device may also include a subsystem and an SoC interface block configured to couple the plurality of DPEs to the subsystem of the device. In one aspect, the subsystem includes programmable logic. In another aspect, the subsystem includes a processor configured to execute program code. In still another aspect, the subsystem includes an application-specific integrated circuit and/or analog/mixed signal circuitry.

In another aspect, the stream switch is coupled to the SoC interface block and configured to communicate with the subsystem of the device.

In another aspect, the interconnect circuitry of each DPE may include a memory mapped switch coupled to the SoC interface block, wherein the memory mapped switch is configured to communicate configuration data for programming the DPE from the SoC interface block. The memory mapped switch may be configured to communicate at least one of control data or debugging data with the SoC interface block.

In another aspect, the plurality of DPEs may be interconnected by an event broadcast network.

In another aspect, the SoC interface block may be configured to exchange events between the subsystem and the event broadcast network of the plurality of DPEs.

In one or more embodiments, a method may include a first core of a first data processing engine generating data, the first core writing the data to a first memory module within the first data processing engine, and a second core of a second data processing engine reading the data from the first memory module.

In one aspect, the method may include the first DPE and the second DPE are neighboring DPEs.

In another aspect, the method may include the first core is capable of providing further application data directly to the second core through a cascade interface.

In another aspect, the method may include the first core is capable of providing further application data to a third DPE through a stream switch.

In another aspect, the method may include programming the first DPE to communicate with selected other DPEs including the second DPE.

In one or more embodiments, a device may include a plurality of data processing engines, a subsystem, and an SoC interface block coupled to the plurality of data processing engines and the subsystem. The SoC interface block may be configured to exchange data between the subsystem and the plurality of data processing engines.

In one aspect, the subsystem includes programmable logic. In another aspect, the subsystem includes a processor configured to execute program code. In another aspect, the subsystem includes application-specific integrated circuit and/or analog/mixed signal circuitry.

In another aspect, the SoC interface block includes a plurality of tiles, where each tile is configured to communicate with a subset of the plurality of DPEs.

In another aspect, each tile may include a memory mapped switch configured to provide a first portion of configuration data to at least one neighboring tile and to provide a second portion of the configuration data to at least one of the subset of the plurality of DPEs.

In another aspect, each tile may include a stream switch configured to provide first data to at least one neighboring tile and to provide second data to at least one of the plurality of DPEs.

In another aspect, each tile may include event broadcast circuitry configured to receive events generated within the tile and events from circuitry external to the tile, wherein the event broadcast circuitry is programmable to provide selected ones of the events to selected destinations.

In another aspect, the SoC interface block may include a control, debug, and trace circuit configured to packetize the selected events and provide the packetized selected events to the subsystem.

In another aspect, the SoC interface block may include an interface that couples the event broadcast circuitry to the subsystem.

In one or more embodiments, a tile for an SoC interface block may include a memory mapped switch configured to provide a first portion of configuration data to a neighboring tile and to provide a second portion of the configuration data to a data processing engine of a plurality of data processing engines. The tile may include a stream switch configured to provide first data to at least one neighboring tile and to provide second data to the data processing engine of the plurality of data processing engines. The tile may include event broadcast circuitry configured to receive events generated within the tile and events from circuitry external to the tile, wherein the event broadcast circuitry is programmable to provide selected ones of the events to selected destinations. The tile may include interface circuitry that couples the memory mapped switch, the stream switch, and the event broadcast circuitry to a subsystem of a device including the tile.

In one aspect, the subsystem includes programmable logic. In another aspect, the subsystem includes a processor configured to execute program code. In another aspect, the subsystem includes an application-specific integrated circuit and/or analog/mixed signal circuitry.

In another aspect, the event broadcast circuitry is programmable to provide an event generated within the tile or an event received from at least one of the plurality of DPEs to the subsystem.

In another aspect, the event broadcast circuitry is programmable to provide an event generated within the subsystem to at least one neighboring tile or to at least one of the plurality of DPEs.

In another aspect, the tile may include an interrupt handler configured to selectively generate interrupts to a processor of the device based upon events received from the event broadcast circuitry.

In another aspect, the tile may include a clock generation circuit configured to generate a clock signal that is distributed to the plurality of DPEs.

In another aspect, the interface circuitry may include a stream multiplexer/demultiplexer, a programmable logic interface, a direct memory access engine, and a NoC stream interface. The stream multiplexer/demultiplexer may couple the stream switch to the programmable logic interface, the direct memory access engine, and the Network-On-Chip stream interface. The stream multiplexer/demultiplexer may be programmable to route data between the stream switch, the programmable logic interface, the direct memory access engine, and the NoC stream interface.

In another aspect, the tile may include a switch coupled to the DMA engine and the NoC stream interface, wherein the switch selectively couples the DMA engine or the NoC stream interface to a NoC. The tile may also include a bridge circuit coupling the NoC with the memory mapped switch. The bridge circuit is configured to convert data from the NoC to a format usable by the memory mapped switch.

In one or more embodiments, a device may include a plurality of data processing engines. Each of the data processing engines may include a core and a memory module. The plurality of data processing engines may be organized in a plurality of rows. Each core may be configured to communicate with other neighboring data processing engines of the plurality of data processing engines by shared access to the memory modules of the neighboring data processing engines.

In an aspect, the memory module of each DPE includes a memory and a plurality of memory interfaces to the memory. A first of the plurality of memory interfaces may be coupled to the core within the same DPE and each other one of the plurality of memory interfaces may be coupled to a core of a different one of the plurality of DPEs.

In another aspect, the plurality of DPEs may be further organized in a plurality of columns, wherein the cores of the plurality of DPEs in the columns are aligned and the memory modules of the plurality of DPEs in the columns are aligned.

In another aspect, a memory module of a selected DPE may include a first memory interface coupled to a core of a DPE immediately above the selected DPE, a second memory interface coupled to a core within the selected DPE, a third memory interface coupled to a core of a DPE immediately adjacent the selected DPE, and a fourth memory interface coupled to a core of a DPE immediately below the selected DPE.

In another aspect, a selected DPE is configured to communicate, via shared access to memory modules, with a group of at least ten of the plurality of DPEs.

In another aspect, at least two DPEs of the group are configured to access more than one memory module of the group of at least ten of the plurality of DPEs.

In another aspect, the plurality of rows of DPEs may include a first row including a first subset of the plurality of DPEs and a second row including a second subset of the DPEs, wherein an orientation of each DPE of the second row is horizontally inverted relative to an orientation of each DPE of the first row.

In another aspect, a memory module of a selected DPE may include a first memory interface coupled to a core of a DPE immediately above the selected DPE, a second memory interface coupled to a core within the selected DPE, a third memory interface coupled to a core of a DPE immediately adjacent the selected DPE, and a fourth memory interface coupled to a core of a DPE immediately below the selected DPE.

In another aspect, a selected DPE may be configured to communicate, via shared access to memory modules, with a group of at least eight of the plurality of DPEs.

In another aspect, at least four DPEs of the group are configured to access more than one memory module of the group of at least eight of the plurality of DPEs.

In one or more embodiments, a device may include a plurality of data processing engines. Each of the data processing engines may include a memory pool having a plurality of memory banks, a plurality of cores each coupled to the memory pool and configured to access the plurality of memory banks, a memory mapped switch coupled to the memory pool and a memory mapped switch of at least one neighboring data processing engine, and a stream switch coupled to each of the plurality of cores and to a stream switch of the at least one neighboring data processing engine.

In an aspect, the memory pool may include a crossbar coupled to each of the plurality of memory banks and an interface coupled to each of the plurality of cores and to the crossbar.

In another aspect, each DPE may include a direct memory access engine coupled to the memory pool and to the stream switch, wherein the direct memory access engine is configured to provide data from the memory pool to the stream switch and write data from the stream switch to the memory pool.

In another aspect, the memory pool may include a further interface coupled the crossbar and to the direct memory access engine.

In another aspect, each of the plurality of cores has shared access to the plurality of memory banks.

In another aspect, within each DPE, the memory mapped switch may be configured to receive configuration data for programming the DPE.

In another aspect, the stream switch is programmable to establish connections with different ones of the plurality of DPEs based upon the configuration data.

In another aspect, the plurality of cores within each tile may be directly coupled.

In another aspect, within each DPE, a first of the plurality of cores may be directly coupled to a core in a first neighboring DPE and a last of the plurality of cores is directly coupled to a core in a second neighboring DPE.

In another aspect, each of the plurality of cores may be programmable to deactivate.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A device, comprising:
    a data processing engine array having a plurality of data processing engines organized in a grid having a plurality of rows and a plurality of columns;
    wherein each data processing engine includes a core, a memory module including a memory, and a direct memory access engine;
    wherein each data processing engine includes a stream switch, wherein the stream switch of each data processing engine is connected to the core and the direct memory access engine in a same data processing engine, and to the stream switch of one or more adjacent data processing engines;
    wherein each memory module includes a plurality of memory interfaces including a first memory interface directly coupled to the core in the same data processing engine and one or more second memory interfaces directly coupled to the core of each of the one or more adjacent data processing engines; and
    wherein each core coupled to a selected memory interface of the plurality of memory interfaces of a selected memory module is configured to access the memory of the selected memory module via the selected memory interface independently of the stream switch.

2. The device of claim 1, wherein a memory module of a first data processing engine is configured to receive data streamed via the stream switch and the direct memory access engine included therein from at least one of a non-adjacent data processing engine or an adjacent data processing engine.

3. The device of claim 1, wherein a memory module of a first data processing engine is configured to receive data streamed via the stream switch and the direct memory access engine included therein from a non-adjacent data processing engine; and
    wherein a core of the first data processing engine is configured to directly access data from the memory module included therein and directly access data from a memory module of an adjacent data processing engine.

4. The device of claim 1, wherein each data processing engine comprises:
    a hardware synchronization circuit including a plurality of hardware locks configured to control access to the memory module in the same data processing engine; and
    wherein the hardware synchronization circuit arbitrates access to the memory module between cores of the one or more adjacent data processing engines with direct access and one or more non-adjacent data processing engines coupled via the stream switch and the direct memory access engine.

5. The device of claim 1, further comprising:
    a processor coupled to the data processing engine array, wherein the processor is configured to control operation of the data processing engine array.

6. The device of claim 5, wherein the processor is configured to reconfigure at least a portion of the data processing engine array in response to a detected condition in the device.

7. The device of claim 5, wherein the processor, in response to a detected condition in the device, is configured to load new data into one or more selected memory modules of the data processing engine array.

8. The device of claim 5, wherein the processor is configured to control application parameters stored in the memory module of one or more of the plurality of data processing engines in response to a detected condition in the device.

9. The device of claim 5, wherein one or more of the plurality of data processing engines is operative as a kernel that uses parameters stored in a selected memory module at runtime; and
    wherein the processor, in response to a detected condition in the device, is configured to calculate new parameters dynamically at runtime of the data processing engine array and store the new parameters in the selected memory module.

10. A device, comprising:
    a data processing engine array having a plurality of data processing engines organized in a grid having a plurality of rows and a plurality of columns;
    wherein each data processing engine includes a core, a memory module including a memory, and a direct memory access engine;
    wherein each data processing engine includes a stream switch, wherein the stream switch of each data processing engine is connected to the core and the direct memory access engine in a same data processing engine, and the stream switch of one or more adjacent data processing engines;
    wherein each memory module includes a first memory interface directly coupled to the core in the same data processing engine and one or more second memory interfaces directly coupled to the core of each of the one or more adjacent data processing engines;
    wherein each data processing engine further comprises a hardware synchronization circuit including a plurality of hardware locks configured to control access to the memory module in the same data processing engine; and
    wherein the hardware synchronization circuit is configured to arbitrate access to the memory module between cores of the one or more adjacent data processing engines with direct access and one or more non-adjacent data processing engines coupled via the stream switch and the direct memory access engine.

11. The device of claim 10, wherein a memory module of a first data processing engine is configured to receive data streamed via the stream switch and the direct memory access engine included therein from a non-adjacent data processing engine.

12. The device of claim 10, wherein a second data processing engine is configured to directly access data from the memory module included therein and directly access data from a memory module of an adjacent data processing engine.

13. The device of claim 10, wherein a memory module of a first data processing engine is configured to receive data streamed via the stream switch and the direct memory access engine included therein from a non-adjacent data processing engine; and wherein a core of the first data processing engine is configured to directly access data from the memory module included therein and directly access data from a memory module of an adjacent data processing engine.

14. The device of claim 10, further comprising:

a processor coupled to the data processing engine array, wherein the processor is configured to control operation of the data processing engine array.

15. The device of claim 14, wherein the processor is configured to reconfigure at least a portion of the data processing engine array in response to a detected condition in the device.

16. The device of claim 14, wherein the processor, in response to a detected condition in the device, is configured to load new data into one or more selected memory modules of the data processing engine array.

17. The device of claim 14, wherein the processor is configured to control application parameters stored in the memory module of one or more of the plurality of data processing engines in response to a detected condition in the device.

18. The device of claim 14, wherein one or more of the plurality of data processing engines is operative as a kernel that uses parameters stored in a selected memory module at runtime; and wherein the processor, in response to a detected condition in the device, is configured to calculate new parameters dynamically at runtime of the data processing engine array and store the new parameters in the selected memory module.

19. The device of claim 1, wherein, within each memory module, the direct memory access engine, the first memory interface, and the one or more second memory interfaces are coupled to a plurality of arbiter circuits within the memory module, the plurality of arbiter circuits configured to arbitrate among memory accesses received over a plurality of different data paths corresponding to the direct memory access engine, the first memory interface and the one or more second memory interfaces.

* * * * *